(12) United States Patent
Mushiake et al.

(10) Patent No.: US 12,122,715 B2
(45) Date of Patent: Oct. 22, 2024

(54) ALKALI-FREE GLASS PLATE

(71) Applicant: Nippon Electric Glass Co., Ltd., Shiga (JP)

(72) Inventors: Atsushi Mushiake, Shiga (JP); Atsuki Saito, Shiga (JP); Masahiro Hayashi, Shiga (JP); Takashi Murata, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 17/283,108

(22) PCT Filed: Oct. 7, 2019

(86) PCT No.: PCT/JP2019/039491
§ 371 (c)(1),
(2) Date: Apr. 6, 2021

(87) PCT Pub. No.: WO2020/080164
PCT Pub. Date: Apr. 23, 2020

(65) Prior Publication Data
US 2021/0380469 A1    Dec. 9, 2021

(30) Foreign Application Priority Data
Oct. 17, 2018    (JP) ................................. 2018-195522

(51) Int. Cl.
  *C03C 3/091*    (2006.01)
  *C03C 3/087*    (2006.01)
  *C03C 3/095*    (2006.01)

(52) U.S. Cl.
  CPC ............. *C03C 3/091* (2013.01); *C03C 3/087* (2013.01); *C03C 3/095* (2013.01)

(58) Field of Classification Search
  CPC .................................. C03C 3/091; C03C 3/087
  See application file for complete search history.

(56) References Cited

U.S. PATENT DOCUMENTS

| | | |
|---|---|---|
| 6,329,310 B1 | 12/2001 | Peuchert et al. |
| 2009/0286091 A1 | 11/2009 | Danielson et al. |
| 2012/0282450 A1 | 11/2012 | Kawaguchi et al. |
| 2013/0225390 A1 | 8/2013 | Ellison et al. |
| 2013/0274086 A1 | 10/2013 | Tsujimura et al. |
| 2013/0296157 A1 | 11/2013 | Ellison et al. |
| 2014/0049708 A1 | 2/2014 | Murata et al. |
| 2014/0179510 A1 | 6/2014 | Allan et al. |
| 2014/0377525 A1 | 12/2014 | Kawaguchi et al. |
| 2015/0072130 A1 | 3/2015 | Tokunaga et al. |
| 2015/0087494 A1 | 3/2015 | Tokunaga et al. |
| 2015/0315065 A1 | 11/2015 | Miwa et al. |
| 2016/0122229 A1 | 5/2016 | Bowden et al. |
| 2016/0368815 A1 | 12/2016 | Hayashi et al. |
| 2017/0217826 A1 | 8/2017 | Ono et al. |
| 2017/0329192 A1 | 11/2017 | Ono et al. |
| 2018/0190675 A1 | 7/2018 | Ichikawa |
| 2019/0161387 A1* | 5/2019 | Nomura ............ H01L 29/78654 |
| 2019/0337835 A1 | 11/2019 | Borrelli et al. |

FOREIGN PATENT DOCUMENTS

| | | | |
|---|---|---|---|
| CN | 104039727 | 9/2014 | |
| JP | 61-236631 | 10/1986 | |
| JP | 2000-302475 | 10/2000 | |
| JP | 2012-184146 | 9/2012 | |
| JP | 2012-236759 | 12/2012 | |
| JP | 2013-151407 | 8/2013 | |
| JP | 2014-503465 | 2/2014 | |
| JP | 2014-118313 | 6/2014 | |
| JP | 2015-34122 | 2/2015 | |
| JP | 2015-512849 | 4/2015 | |
| JP | 5769617 | 8/2015 | |
| JP | 2016-5999 | 1/2016 | |
| JP | 2016-505502 | 2/2016 | |
| JP | 2016-47794 | 4/2016 | |
| JP | 2016-117641 | 6/2016 | |
| JP | 2016-188148 | 11/2016 | |
| JP | 2017-533171 | 11/2017 | |
| WO | 2009/139861 | 11/2009 | |
| WO | WO-2011001920 A1 * | 1/2011 | ............... C03C 1/00 |
| WO | 2012/077609 | 6/2012 | |
| WO | WO-2013161902 A1 * | 10/2013 | ............ C03C 3/087 |
| WO | 2013/180220 | 12/2013 | |
| WO | 2013/183625 | 12/2013 | |

(Continued)

OTHER PUBLICATIONS

International Preliminary Report on Patentability and Written Opinion of the International Searching Authority issued Apr. 14, 2021 in International (PCT) Application No. PCT/JP2019/039491.
International Search Report (ISR) issued Dec. 17, 2019 in International (PCT) Application No. PCT/JP2019/039491.
Japanese Office Action dated Mar. 8, 2023 in corresponding Japanese Patent Application No. 2018-195522, with English translation.
Office Action issued Jul. 26, 2023 in corresponding Japanese Patent Application No. 2018-195522, with English language translation.
Office Action issued Apr. 8, 2024 in corresponding Taiwanese Patent Application No. 108136307, with English language translation of the Search Report, 7 pages.
Office Action issued Nov. 15, 2023 in corresponding Japanese Patent Application No. 2018-195522, with English machine translation, 6 pages.

*Primary Examiner* — Elizabeth A. Bolden
(74) *Attorney, Agent, or Firm* — WENDEROTH, LIND & PONACK, L.L.P.

(57) ABSTRACT

The present invention provides an alkali-free glass sheet, including as a glass composition, in terms of mol %, 60% to 74% of $SiO_2$, 6% to 20% of $Al_2O_3$, 0% to 9% of $B_2O_3$, 1% to 13% of MgO, 1% to 13% of CaO, 0% to 7% of SrO, 0% to 8% of BaO, and 0% to less than 1.0% of $Y_2O_3+La_2O_3$, being substantially free of an alkali metal oxide, and having a strain point of 650° C. or more.

7 Claims, No Drawings

(56) References Cited

FOREIGN PATENT DOCUMENTS

| WO | WO-2013183539 A1 | * | 12/2013 | ............. | C03C 3/087 |
|---|---|---|---|---|---|
| WO | WO-2013183626 A1 | * | 12/2013 | ............. | C03C 3/091 |
| WO | WO-2013183681 A1 | * | 12/2013 | ............. | C03C 15/00 |
| WO | 2016/063981 | | 4/2016 | | |
| WO | 2016/084952 | | 6/2016 | | |
| WO | 2017/002808 | | 1/2017 | | |
| WO | WO-2018025883 A1 | * | 2/2018 | ............. | C03C 3/091 |
| WO | WO-2018038059 A1 | * | 3/2018 | ............. | C03C 17/06 |
| WO | 2018/125625 | | 7/2018 | | |

* cited by examiner

ALKALI-FREE GLASS PLATE

TECHNICAL FIELD

The present invention relates to an alkali-free glass sheet, and more particularly, to an alkali-free glass sheet suitable as a substrate for forming a TFT circuit in a flat panel display, such as a liquid crystal display or an OLED display, or as a carrier glass for holding a resin substrate for forming the TFT circuit.

BACKGROUND ART

As is well known, a liquid crystal panel or an OLED panel includes a thin film transistor (TFT) for driving control.

As a thin film transistor configured to drive a display, amorphous silicon, low-temperature polysilicon, high-temperature polysilicon, and the like have been known. In recent years, along with the spread of large liquid crystal displays, smartphones, tablet PCs, and the like, there is an increasing need for higher resolution of a display. A low-temperature polysilicon TFT can meet this need, but a high-temperature film forming process of from 500° C. to 600° C. is involved. However, a related-art glass sheet has large thermal shrinkage before and after the high-temperature film forming process, and hence pattern deviation of the thin film transistor is caused. Accordingly, in order to increase the resolution of the display, a glass sheet with low thermal shrinkage is required. In recent years, a further increase in definition of the display has been investigated. In this case, a further reduction in thermal shrinkage of the glass sheet is required.

CITATION LIST

Patent Literature 1: JP 5769617 B2

SUMMARY OF INVENTION

Technical Problem

As a main method of reducing the thermal shrinkage of the glass sheet, two methods are given. A first method is a method involving holding the glass sheet in advance at a temperature around a heat treatment temperature of the film forming process to anneal the glass sheet. In this method, glass undergoes structural relaxation and shrinks at the time of annealing, and hence a thermal shrinkage amount in the subsequent film forming process at high temperature can be suppressed. However, this method entails an increase in number of manufacturing steps and a longer manufacturing time, resulting in a rise in manufacturing cost of the glass sheet.

A second method is a method involving increasing the strain point of the glass sheet. In an overflow down-draw method, glass is generally cooled from a melting temperature to a forming temperature in a relatively short time. Under the influence of this, the fictive temperature of the glass sheet is increased, and the thermal shrinkage of the glass sheet is increased. In view of the foregoing, when the strain point of the glass sheet is increased, the viscosity of the glass sheet at a heat treatment temperature of the film forming process is increased, with the result that structural relaxation hardly proceeds. As a result, the thermal shrinkage of the glass sheet can be suppressed. Moreover, as the heat treatment temperature of the film forming process becomes higher, an increase in strain point has a higher effect on a reduction in thermal shrinkage. Accordingly, in the case of the low-temperature polysilicon TFT, it is desired that the strain point of the glass sheet be increased to the extent possible.

For example, in Patent Literature 1, there is disclosed that the strain point of a glass sheet is increased by reducing the content of $B_2O_3$ in a glass composition. Further, in Patent Literature 1, there is disclosed that a reduction in denitrification resistance caused by a low $B_2O_3$ content is avoided by introducing $Y_2O_3$ and/or $La_2O_3$ into the glass composition. However, $Y_2O_3$ and $La_2O_3$ are rare earth elements, and hence raw material cost is high, resulting in a rise in manufacturing cost of the glass sheet.

The present invention has been made in view of the above-mentioned circumstances, and a technical object of the present invention is to provide an alkali-free glass sheet which has a high strain point and enables a reduction in manufacturing cost.

Solution to Problem

The inventors of the present invention have made extensive investigations, and as a result, have found that the above-mentioned technical object can be achieved by strictly restricting the contents of components and restricting a strain point to a predetermined value or more. The finding is proposed as the present invention. That is, according to one embodiment of the present invention, there is provided an alkali-free glass sheet, comprising as a glass composition, in terms of mol %, 60% to 74% of $SiO_2$, 6% to 20% of $Al_2O_3$, 0% to 9% of $B_2O_3$, 1% to 13% of MgO, 1% to 13% of CaO, 0% to 7% of SrO, 0% to 8% of BaO, and 0% to less than 1.0% of $Y_2O_3+La_2O_3$, being substantially free of an alkali metal oxide, and having a strain point of 650° C. or more. Herein, the "$Y_2O_3+La_2O_3$" refers to the total content of $Y_2O_3$ and $La_2O_3$. The "substantially free of an alkali metal oxide" refers to a case in which the content of an alkali metal oxide ($Li_2O$, $Na_2O$, $K_2O$) in the glass composition is less than 0.5 mol % (desirably less than 0.1 mol %). The "strain point" refers to a value measured based on a method of ASTM C336.

In addition, it is preferred that the alkali-free glass sheet according to the one embodiment of the present invention have a content of SrO+BaO of from 0 mol % to 3 mol %. Herein, the "SrO+BaO" refers to the total content of SrO and BaO.

In addition, it is preferred that the alkali-free glass sheet according to the one embodiment of the present invention have a strain point of 700° C. or more.

In addition, it is preferred that the alkali-free glass sheet according to the one embodiment of the present invention have a Young's modulus of 79 GPa or more. Herein, the "Young's modulus" may be measured by a flexural resonance method.

In addition, it is preferred that the alkali-free glass sheet according to the one embodiment of the present invention have a thermal expansion coefficient of from $30 \times 10^{-7}$/° C. to $45 \times 10^{-7}$/° C. With this configuration, a situation in which the glass sheet has a local dimensional change owing to temperature variations in a film forming process at high temperature can be suppressed.

In addition, it is preferred that the alkali-free glass sheet according to the one embodiment of the present invention have a temperature at a viscosity at high temperature of $10^{2.5}$ dPa·s of 1,600° C. or less. With this configuration, a reduction in melting cost can be achieved.

DESCRIPTION OF EMBODIMENTS

An alkali-free glass sheet of the present invention comprises as a glass composition, in terms of mol %, 60% to 74% of $SiO_2$, 6% to 20% of $Al_2O_3$, 0% to 9% of $B_2O_3$, 1% to 13% of MgO, 1% to 13% of CaO, 0% to 7% of SrO, 0% to 8% of BaO, and 0% to less than 1.0% of $Y_2O_3+La_2O_3$, and is substantially free of an alkali metal oxide. The reasons why the contents of the components are limited as described above are described below. In the descriptions of the contents of the components, the expression "%" represents "mold", unless otherwise specified.

$SiO_2$ is a component which forms a glass skeleton, and is also a component which increases a strain point. Accordingly, the content of $SiO_2$ is preferably 60% or more, 62% or more, 64% or more, or 64% or more, particularly preferably 66% or more. Meanwhile, when the content of $SiO_2$ is too large, a viscosity at high temperature is increased, and thus meltability is liable to be reduced. Accordingly, the content of $SiO_2$ is preferably 74% or less, 72% or less, or 70% or less, particularly preferably 68% or less.

$Al_2O_3$ is a component which forms the glass skeleton, and is also a component which increases the strain point. Further, $Al_2O_3$ is a component which suppresses phase separation. Accordingly, the content of $Al_2O_3$ is preferably 6% or more, 8% or more, or 10% or more, particularly preferably 12% or more. Meanwhile, when the content of $Al_2O_3$ is too large, the viscosity at high temperature is increased, and thus the meltability is liable to be reduced. Accordingly, the content of $Al_2O_3$ is 20% or less, 18% or less, or 16% or less, particularly preferably 14% or less.

$B_2O_3$, which is an optional component, is a component which remarkably improves the meltability. Accordingly, the content of $B_2O_3$ is preferably 0% or more, 0.01% or more, 0.1% or more, 0.2% or more, 0.3% or more, or 0.4% or more, particularly preferably 0.5% or more. Meanwhile, when the content of $B_2O_3$ is too large, the strain point is significantly reduced, or a β-OH value is significantly increased. While the details are described later, when the β-OH value is increased, thermal shrinkage in a temperature range equal to or lower than the strain point is increased. Accordingly, the content of $B_2O_3$ is preferably 9% or less, 7% or less, or 5% or less, particularly preferably 4% or less.

The molar ratio $SiO_2/B_2O_3$ is preferably 50 or less, 40 or less, 30 or less, or 25 or less, particularly preferably 20 or less. When the molar ratio $SiO_2/B_2O_3$ is too high, it becomes difficult to achieve both a high strain point and high meltability. The "$SiO_2/B_2O_3$" refers to a value obtained by dividing the content of $SiO_2$ by the content of $B_2O_3$.

MgO is a component which reduces the viscosity at high temperature to improve the meltability, and is also a component which improves devitrification resistance through balance with other components. Further, from the viewpoint of mechanical characteristics, MgO is a component which remarkably increases a Young's modulus. Accordingly, the content of MgO is preferably 1% or more, 3% or more, 5% or more, or 6% or more, particularly preferably 7% or more. Meanwhile, when the content of MgO is too large, the strain point is liable to be reduced, or the balance with other components is lost, resulting in a higher devitrification tendency. Accordingly, the content of MgO is preferably 15% or less, 13% or less, or 10% or less, particularly preferably 8% or less.

CaO is a component which reduces the viscosity at high temperature to improve the meltability, and is also a component which improves the devitrification resistance through balance with other components. Accordingly, the content of CaO is preferably 1% or more or 3% or more, particularly preferably 5% or more. Meanwhile, when the content of CaO is too large, the strain point is liable to be reduced. Accordingly, the content of CaO is preferably 15% or less, 13% or less, 10% or less, or 8% or less, particularly preferably 7% or less.

SrO is a component which reduces the viscosity at high temperature to improve the meltability, and is also a component which improves the devitrification resistance through balance with other components. Accordingly, the content of SrO is preferably 0% or more, 0.5% or more, or 1% or more, particularly preferably 1.5% or more. Meanwhile, when the content of SrO is too large, the strain point is liable to be reduced. Accordingly, the content of SrO is preferably 7% or less, 5% or less, or 3% or less, particularly preferably 2% or less.

BaO is a component which reduces the viscosity at high temperature to improve the meltability, and is also a component which improves the devitrification resistance through balance with other components. Accordingly, the content of BaO is preferably 0% or more, 0.5% or more, or 1% or more, particularly preferably 1.5% or more. Meanwhile, when the content of BaO is too large, the strain point is liable to be reduced. Accordingly, the content of BaO is preferably 8% or less, 6% or less, 4% or less, or 3% or less, particularly preferably 2% or less.

The total content of SrO and BaO is preferably 0% or more, 0.5% or more, 1% or more, 1.2% or more, or 1.4% or more, particularly preferably 1.6% or more. When the total content of SrO and BaO is too small, the meltability is liable to be reduced. Meanwhile, when the total content of SrO and BaO is too large, the glass composition loses its component balance, and the devitrification resistance is liable to be reduced. Accordingly, the total content of SrO and BaO is preferably 6% or less, 4% or less, 3% or less, 2.5% or less, or 2.2% or less, particularly preferably 2% or less.

The molar ratio $B_2O_3/BaO$ is preferably 1 or more, 2 or more, 5 or more, or 8 or more, particularly preferably 10 or more. When the molar ratio $B_2O_3/BaO$ is too low, the balance between the glass components is lost in a glass system according to the present invention, and the devitrification resistance is liable to be reduced. The "$B_2O_3/BaO$" refers to a value obtained by dividing the content of $B_2O_3$ by the content of BaO.

The molar ratio BaO/(SrO+BaO) is preferably 1 or less, 0.8 or less, 0.6 or less, or 0.4 or less, particularly preferably 0.2 or less. When the molar ratio BaO/(SrO+BaO) is too large, the balance between the glass components is lost in a glass system according to the present invention, and the devitrification resistance is liable to be reduced. The "BaO/(SrO+BaO)" refers to a value obtained by dividing the content of BaO by the total content of SrO and BaO.

The molar ratio $(SiO_2+Al_2O_3+B_2O_3)/(SrO+BaO)$ is preferably 10 or more, 15 or more, 20 or more, or 25 or more, particularly preferably 30 or more. When the molar ratio $(SiO_2+Al_2O_3+B_2O_3)/(SrO+BaO)$ is too low, it becomes difficult to achieve both a high strain point and a high Young's modulus. The "$(SiO_2+Al_2O_3+B_2O_3)/(SrO+BaO)$" refers to a value obtained by dividing the total content of $SiO_2$, $Al_2O_3$, and $B_2O_3$ by the total content of SrO and BaO.

When $(CaO+SrO+BaO)-(Al_2O_3+B_2O_3)$ is too large, the amount of non-bridging oxygen in the glass is increased, and a thermal shrinkage rate is increased. Accordingly, (CaO+

SrO+BaO)—(Al$_2$O$_3$+B$_2$O$_3$) is preferably 5% or less, 3% or less, 1% or less, 0% or less, −1% or less, or −3% or less, particularly preferably −4% or less. Meanwhile, when (CaO+SrO+BaO)—(Al$_2$O$_3$+B$_2$O$_3$) is too small, the strain point is reduced, and the thermal shrinkage rate is increased contrarily. Accordingly, (CaO+SrO+BaO)—(Al$_2$O$_3$+B$_2$O$_3$) is preferably −20% or more, −15% or more, −10% or more, or −7% or more, particularly preferably −6% or more. The "(CaO+SrO+BaO)—(Al$_2$O$_3$+B$_2$O$_3$)" refers to a value obtained by subtracting the total content of Al$_2$O$_3$ and B$_2$O$_3$ from the total content of CaO, SrO, and BaO.

Y$_2$O$_3$ is a component which increases the strain point and the Young's modulus. However, when the content thereof is too large, a density and raw material cost are liable to be increased. Accordingly, the content of Y$_2$O$_3$ is preferably from 0% to 0.8%, from 0% to 0.7%, from 0% to 0.5%, or from 0% to 0.2%, particularly preferably from 0% to less than 0.1%.

La$_2$O$_3$ is a component which increases the strain point and the Young's modulus. However, when the content thereof is too large, the density and the raw material cost are liable to be increased. Accordingly, the content of La$_2$O$_3$ is preferably from 0% to 0.8%, from 0% to 0.7%, from 0% to 0.5%, or from 0% to 0.2%, particularly preferably from 0% to less than 0.1%.

The total content of Y$_2$O$_3$ and La$_2$O$_3$ is preferably from 0% to less than 1.0%, from 0% to 0.8%, from 0% to 0.7%, from 0% to 0.5%, or from 0% to 0.2%, particularly preferably from 0% to less than 0.1%. However, when the total content of Y$_2$O$_3$ and La$_2$O$_3$ is too large, the density and the raw material cost are liable to be increased.

The alkali-free glass sheet of the present invention may comprise the following components in the glass composition in addition to the above-mentioned components.

ZnO is a component which increases the meltability. However, when ZnO is contained in a large amount, the glass is liable to devitrify, and in addition, the strain point is liable to be reduced. The content of ZnO is preferably from 0% to 5%, from 0% to 3%, from 0% to 0.5%, or from 0% to 0.3%, particularly preferably from 0% to 0.2%.

P$_2$O$_5$ is a component which remarkably reduces the liquidus temperature of an Al-based devitrified crystal while maintaining the strain point. However, when P$_2$O$_5$ is contained in a large amount, the Young's modulus is reduced, or the glass undergoes phase separation. In addition, there is a risk in that P may be diffused from the glass and affect the performance of a TFT. Accordingly, the content of P$_2$O$_3$ is preferably from 0% to 5%, from 0% to 3%, or from 0% to 1%, particularly preferably from 0% to 0.5%.

TiO$_2$ is a component which reduces the viscosity at high temperature and thus increases the meltability, and is also a component which suppresses solarization. However, when TiO$_2$ is contained in a large amount, the glass is colored, and thus a transmittance is liable to be reduced. Accordingly, the content of TiO$_2$ is preferably from 0% to 3%, from 0% to 1%, or from 0% to 0.1%, particularly preferably from 0% to 0.02%.

SnO$_2$ is a component which exhibits a satisfactory fining action in a high temperature region. In addition, SnO$_2$ is a component which increases the strain point, and is also a component which reduces the viscosity at high temperature. The content of SnO$_2$ is preferably from 0% to 1%, from 0.001% to 1%, or from 0.05% to 0.5%, particularly preferably from 0.08% to 0.2%. When the content of SnO$_2$ is too large, a devitrified crystal of SnO$_2$ is liable to precipitate. When the content of SnO$_2$ is less than 0.001%, it becomes difficult to exhibit the above-mentioned effects.

SnO$_2$ is suitable as a fining agent, but any other fining agent than SnO$_2$ may be used as long as the characteristics of the glass are not significantly impaired. Specifically, As$_2$O$_3$, Sb$_2$O$_3$, CeO$_2$, F$_2$, Cl$_2$, SO$_3$, and C may be added at a total content of, for example, up to 0.5%, and metal powders, such as Al and Si, may be added at a total content of, for example, up to 0.5%.

As$_2$O$_3$ and Sb$_2$O$_3$ are excellent in fining property, but from an environmental viewpoint, it is preferred to introduce As$_2$O$_3$ and Sb$_2$O$_3$ in as small amounts as possible. Further, when As$_2$O$_3$ is contained in a large amount in the glass, solarization resistance tends to be reduced, and hence the content thereof is preferably 0.5% or less, particularly preferably 0.1% or less. It is desired that the alkali-free glass sheet be substantially free of As$_2$O$_3$. Herein, the "substantially free of As$_2$O$_3$" refers to a case in which the content of As$_2$O$_3$ in the glass composition is less than 0.05%. In addition, the content of Sb$_2$O$_3$ is preferably 1% or less, particularly preferably 0.5% or less. It is desired that the alkali-free glass sheet be substantially free of Sb$_2$O$_3$. Herein, the "substantially free of Sb$_2$O$_3$" refers to a case in which the content of Sb$_2$O$_3$ in the glass composition is less than 0.05%.

Cl has an effect of promoting the melting of alkali-free glass. When Cl is added, a reduction in melting temperature can be achieved, and the action of the fining agent is promoted. As a result, while melting cost is reduced, the lifetime of a glass production kiln can be prolonged. However, when the content of Cl is too large, the strain point is liable to be reduced. Accordingly, the content of Cl is preferably 0.5% or less, particularly preferably 0.1% or less. An alkaline earth metal chloride, such as strontium chloride, aluminum chloride, or the like may be used as a raw material for introducing Cl.

The alkali-free glass sheet of the present invention preferably has the following characteristics.

The thermal expansion coefficient is preferably from $30\times10^{-7}/°$ C. to $45\times10^{-7}/°$ C., from $30\times10^{-7}/°$ C. to $42\times10^{-7}/°$ C., from $30\times10^{-7}/°$ C. to $40\times10^{-7}/°$ C., or from $30\times10^{-7}/°$ C. to $38\times10^{-7}/°$ C., particularly preferably from $30\times10^{-7}/°$ C. to $36\times10^{-7}/°$ C. When the thermal expansion coefficient is too high, the glass sheet is liable to have a local dimensional change owing to temperature variations in the film forming process at high temperature.

The density is preferably 2.80 g/cm$^3$ or less, 2.75 g/cm$^3$ or less, 2.70 g/cm$^3$ or less, 2.65 g/cm$^3$ or less, 2.60 g/cm$^3$ or less, or 2.55 g/cm$^3$ or less, particularly preferably from 2.45 g/cm$^3$ to 2.50 g/cm$^3$. When the density is too high, the deflection amount of the glass sheet is liable to be increased, and hence pattern deviation caused by stress is liable to be promoted in, for example, manufacturing steps for a display.

The strain point is preferably 650° C. or more, 680° C. or more, 700° C. or more, 710° C. or more, 720° C. or more, or 730° C. or more, particularly preferably 740° C. or more. When the strain point is too low, thermal shrinkage is liable to occur in the glass sheet in the film forming process at high temperature.

The annealing point is preferably 720° C. or more, 750° C. or more, or 780° C. or more, particularly preferably 800° C. or more. When the annealing point is too low, thermal shrinkage is liable to occur in the glass sheet in the film forming process at high temperature.

The softening point is preferably 940° C. or more, 960° C. or more, or 980° C. or more, particularly preferably 1,000° C. or more. When the softening point is too low, thermal shrinkage is liable to occur in the glass sheet in the film forming process at high temperature.

The temperature at a viscosity at high temperature of $10^{2.5}$ dPa·s is preferably 1,656° C. or less, 1,620° C. or less, 1,600° C. or less, 1,590° C. or less, or 1,580° C. or less, particularly preferably 1,570° C. or less. When the temperature at $10^{2.5}$ dPa·s is high, the meltability and the fining property are liable to be reduced, resulting in a rise in manufacturing cost of the glass sheet.

The Young's modulus is preferably 76 GPa or more, 78 GPa or more, 79 GPa or more, 80 GPa or more, 81 GPa or more, or 82 GPa or more, particularly preferably 83 GPa or more. When the Young's modulus is too low, the deflection amount of the glass sheet is liable to be increased, and hence pattern deviation caused by stress is liable to be promoted in, for example, manufacturing steps for a display.

The specific Young's modulus is preferably 29 GPa/g·cm$^{-3}$ or more, 30 GPa/g·cm$^{-3}$ or more, 31 GPa/g·cm$^{-3}$ or more, or 32 GPa/g·cm$^{-3}$ or more, particularly preferably 33 GPa/g·cm$^{-3}$ or more. When the specific Young's modulus is too low, the deflection amount of the glass sheet is liable to be increased, and hence pattern deviation caused by stress is liable to be promoted in, for example, manufacturing steps for a display.

The liquidus temperature is preferably 1,450° C. or less, 1,300° C. or less, or 1,200° C. or less, particularly preferably 1,150° C. or less. With this configuration, a devitrified crystal is less liable to be generated at the time of forming. Further, the glass sheet is easily formed by an overflow down-draw method, and hence the surface quality of the glass sheet is easily improved. Besides, the manufacturing cost of the glass sheet can be reduced. The "liquidus temperature" is a temperature at which a crystal precipitates after glass powder that has passed through a standard 30-mesh sieve (500 μm) and remains on a 50-mesh sieve (300 μm) is placed in a platinum boat and kept for 24 hours in a gradient heating furnace.

The liquidus viscosity is preferably $10^{4.6}$ dPa·s or more, $10^{5.0}$ dPa·s or more, or $10^{5.2}$ dPa·s or more, particularly preferably $10^{5.5}$ dPa·s or more. With this configuration, devitrification is less liable to occur at the time of forming, and hence the glass sheet is easily formed by an overflow down-draw method. As a result, the surface quality of the glass sheet can be improved. Besides, the manufacturing cost of the glass sheet can be reduced. Herein, the "liquidus viscosity" refers to a glass viscosity at the liquidus temperature, and may be measured by a platinum sphere pull up method.

The β-OH value is an indicator of the amount of water in the glass. When the β-OH value is reduced, the strain point can be increased. In addition, even with the same glass composition, a glass sheet having a lower β-OH value has lower thermal shrinkage in a temperature range equal to or lower than the strain point. The β-OH value is preferably 0.30/mm or less, 0.25/mm or less, 0.20/mm or less, or 0.15/mm or less, particularly preferably 0.10/mm or less. When the β-OH value is too low, the meltability is liable to be reduced. Accordingly, the β-OH value is preferably 0.01/mm or more, particularly preferably 0.03/mm or more. Herein, the "β-OH value" refers to a value determined using the following mathematical formula by measuring the transmittances of the glass with an FT-IR.

β-OH value=$(1/X)\log(T_1/T_2)$

X: Thickness (mm)
$T_1$: Transmittance (%) at a reference wavelength of 3,846 cm$^{-1}$
$T_2$: Minimum transmittance (%) at a wavelength around a hydroxyl group absorption wavelength of 3,600 cm$^{-1}$ It is preferred that the alkali-free glass sheet of the present invention have overflow-joined surfaces in a middle portion thereof in a sheet thickness direction. That is, it is preferred that the alkali-free glass sheet of the present invention be formed by an overflow down-draw method. The overflow down-draw method refers to a method in which molten glass is caused to overflow from both sides of a wedge-shaped refractory, and the overflowing molten glasses are subjected to down-draw downward at the lower end of the wedge-shaped refractory while being joined, to thereby form the glass into a flat sheet shape. By the overflow down-draw method, surfaces which are to serve as the surfaces of the glass sheet are formed in a state of free surfaces without being brought into contact with the refractory. As a result, a glass sheet having good surface quality can be manufactured without polishing at low cost. Further, an increase in area and a reduction in thickness are easily achieved as well.

The forming may be performed by, for example, a slot-down method, a redraw method, a float method, or a roll-out method as well as the overflow down-draw method.

The sheet thickness of the alkali-free glass sheet of the present invention is not particularly limited, but is preferably 1.0 mm or less, 0.7 mm or less, or 0.5 mm or less, particularly preferably from 0.05 mm to 0.4 mm. As the sheet thickness becomes smaller, weight saving of a liquid crystal panel or an OLED panel is more easily achieved. The sheet thickness may be adjusted based on, for example, a flow rate and a forming speed (sheet-drawing speed) at the time of glass production.

A method of manufacturing the alkali-free glass sheet of the present invention on an industrial scale preferably comprises a melting step of loading a glass batch to a melting furnace and heating the glass batch through application of a current with a heating electrode to obtain molten glass, the glass batch having been blended so as to comprise the above-mentioned glass composition, and a forming step of forming the obtained molten glass into an alkali-free glass sheet by an overflow down-draw method.

In general, a manufacturing process for the glass sheet comprises a melting step, a fining step, a supplying step, a stirring step, and a forming step. The melting step is a step of melting a glass batch obtained by blending glass raw materials to provide molten glass. The fining step is a step of fining the molten glass obtained in the melting step by an action of a fining agent or the like. The supplying step is a step of transferring the molten glass from one step to another. The stirring step is a step of stirring the molten glass to homogenize the molten glass. The forming step is a step of forming the molten glass into a glass sheet. A step other than the above-mentioned steps, for example, a state adjusting step of adjusting the molten glass to be in a state suitable for forming may be introduced after the stirring step as required.

When the alkali-free glass sheet is manufactured on an industrial scale, the glass is generally melted by heating with a combustion flame of a burner. The burner is generally arranged at an upper portion of a melting kiln, and uses fossil fuel as its fuel, specifically, for example, liquid fuel, such as heavy oil, or gas fuel, such as LPG. The combustion flame may be obtained by mixing the fossil fuel and oxygen gas. However, such method is liable to entail an increase in β-OH value because a large amount of water is mixed in the molten glass during the melting. Accordingly, in manufacturing the alkali-free glass sheet, it is preferred to perform heating through application of a current with a heating electrode, and it is more preferred to melt the glass by heating through application of a current with a heating electrode without heating with the combustion flame of the burner, that is, perform full electric melting. With this configuration, water is less liable to be mixed in the molten glass during the melting, and hence the β-OH value is easily controlled to 0.30/mm or less, 0.25/mm or less, 0.20/mm or less, or 0.15/mm or less, particularly 0.10/mm or less. Further, when the heating through application of a current with a heating electrode is performed, the amount of energy required for obtaining the molten glass per unit mass is reduced, and the amount of a melt volatile is reduced. As a result, an environmental load can be reduced.

Further, with regard to the heating through application of a current, as the amount of water in the glass batch becomes smaller, the β-OH value in the glass sheet is reduced more easily. Moreover, a raw material for introducing $B_2O_3$ is liable to be a maximum water mixing source. Accordingly, from the viewpoint of manufacturing an alkali-free glass sheet having a low β-OH value, it is preferred to reduce the content of $B_2O_3$ to the extent possible. In addition, as the amount of water in the glass batch becomes smaller, the glass batch spreads in a melting kiln more uniformly, and hence a homogeneous glass sheet with high quality is easily manufactured.

The heating through application of a current with a heating electrode is preferably performed by applying an alternating voltage to a heating electrode arranged at a bottom portion or a side portion of a melting kiln so as to be brought into contact with the molten glass in the melting kiln. A material having heat resistance and corrosion resistance to the molten glass is preferably used as a material for the heating electrode, and for example, tin oxide, molybdenum, platinum, or rhodium may be used. In particular, molybdenum is preferred from the viewpoint of the degree of freedom of installation in a furnace.

EXAMPLES

The present invention is hereinafter described by way of Examples. However, Examples below are merely examples, and the present invention is by no means limited to Examples below.

Examples (Sample Nos. 1 to 391) of the present invention are shown in Tables 1 to 28.

TABLE 1

| (mol %) | No. 1 | No. 2 | No. 3 | No. 4 | No. 5 | No. 6 | No. 7 | No. 8 |
|---|---|---|---|---|---|---|---|---|
| $SiO_2$ | 62.3 | 62.8 | 63.3 | 63.8 | 64.3 | 64.8 | 65.3 | 65.8 |
| $Al_2O_3$ | 14.0 | 13.8 | 13.7 | 13.5 | 13.3 | 13.1 | 12.9 | 12.7 |
| $B_2O_3$ | 3.3 | 3.3 | 3.2 | 3.2 | 3.1 | 3.1 | 3.0 | 3.0 |
| MgO | 9.1 | 9.0 | 8.9 | 8.8 | 8.6 | 8.5 | 84 | 8.3 |
| CaO | 7.1 | 7.0 | 6.9 | 6.8 | 6.7 | 6.6 | 6.5 | 6.4 |
| SrO | 1.5 | 1.5 | 1.4 | 1.4 | 1.4 | 1.4 | 1.4 | 1.3 |
| BaO | 2.5 | 2.5 | 2.4 | 2.4 | 2.4 | 2.3 | 2.3 | 2.3 |
| ZnO | 0.0 | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 | 0.1 |
| $SiO_2/B_2O_3$ | 18.88 | 19.03 | 19.78 | 19.94 | 20.74 | 20.90 | 21.77 | 21.93 |
| SrO + BaO | 4.0 | 4.0 | 3.8 | 3.8 | 3.8 | 3.7 | 3.7 | 3.6 |
| $B_2O_3$/BaO | 1.3 | 1.3 | 1.3 | 1.3 | 1.3 | 1.3 | 1.3 | 1.3 |
| BaO/(SrO + BaO) | 0.6 | 0.6 | 0.6 | 0.6 | 0.6 | 0.6 | 0.6 | 0.6 |
| $(SiO_2 + Al_2O_3 + B_2O_3)/(SrO + BaO)$ | 19.9 | 20.0 | 21.1 | 21.2 | 21.2 | 21.9 | 21.9 | 22.6 |
| $(CaO + SrO + BaO) - (Al_2O_3 + B_2O_3)$ | −6.2 | −6.1 | −6.2 | −6.1 | −5.9 | −5.9 | −5.7 | −5.7 |
| Thermal expansion coefficient ($10^{-7}/°$ C.) | 43.0 | 42.6 | 42.1 | 41.7 | 41.5 | 41.1 | 40.8 | 40.3 |
| Density (g/cm³) | 2.64 | 2.63 | 2.63 | 2.62 | 2.62 | 2.61 | 2.61 | 2.60 |
| Strain point (° C.) | 699 | 699 | 702 | 702 | 704 | 704 | 705 | 706 |
| Annealing point (° C.) | 763 | 763 | 766 | 766 | 767 | 768 | 769 | 770 |
| Softening point (° C.) | 965 | 966 | 970 | 971 | 973 | 975 | 978 | 980 |
| $10^{4.0}$ dPa · s (° C.) | 1,218 | 1,225 | 1,232 | 1,238 | 1,246 | 1,252 | 1,259 | 1,265 |
| $10^{3.0}$ dPa · s (° C.) | 1,400 | 1,405 | 1,411 | 1,416 | 1,422 | 1,427 | 1,433 | 1,439 |
| $10^{2.5}$ dPa · s (° C.) | 1,455 | 1,463 | 1,472 | 1,480 | 1,490 | 1,499 | 1,508 | 1,517 |
| Young's modulus (GPa) | 85.1 | 85.0 | 84.8 | 84.7 | 84.3 | 84.1 | 84.0 | 83.7 |
| Specific Young's modulus (GPa/g · cm⁻³) | 32.3 | 32.3 | 32.3 | 32.3 | 32.2 | 32.3 | 32.2 | 32.2 |

| (mol %) | No. 9 | No. 10 | No. 11 | No. 12 | No. 13 | No. 14 |
|---|---|---|---|---|---|---|
| $SiO_2$ | 66.3 | 66.8 | 67.8 | 68.3 | 68.8 | 69.3 |
| $Al_2O_3$ | 12.5 | 12.4 | 12.0 | 11.8 | 11.6 | 11.4 |
| $B_2O_3$ | 2.9 | 2.9 | 2.8 | 2.8 | 2.7 | 2.7 |
| MgO | 8.1 | 8.0 | 7.8 | 7.7 | 7.5 | 7.4 |
| CaO | 6.3 | 6.2 | 6.1 | 6.0 | 5.9 | 5.8 |
| SrO | 1.3 | 1.3 | 1.3 | 1.2 | 1.2 | 1.2 |
| BaO | 2.2 | 2.2 | 2.1 | 2.1 | 2.1 | 2.0 |
| ZnO | 0.0 | 0.0 | 0.0 | 0.0 | 0.0 | 0.0 |
| $P_2O_5$ | 0.0 | 0.0 | 0.0 | 0.0 | 0.0 | 0.0 |
| $SnO_2$ | 0.1 | 0.1 | 0.1 | 0.1 | 0.1 | 0.1 |
| $SiO_2/B_2O_3$ | 22.86 | 23.03 | 24.21 | 24.39 | 25.48 | 25.67 |
| SrO + BaO | 3.5 | 3.5 | 3.4 | 3.3 | 3.3 | 3.2 |
| $B_2O_3$/BaO | 1.3 | 1.3 | 1.3 | 1.3 | 1.3 | 1.4 |

TABLE 1-continued

|  |  |  |  |  |  |  |
|---|---|---|---|---|---|---|
| BaO/(SrO + BaO) | 0.6 | 0.6 | 0.6 | 0.6 | 0.6 | 0.6 |
| (SiO$_2$ + Al$_2$O$_3$ + B$_2$O$_3$)/(SrO + BaO) | 23.3 | 23.5 | 24.3 | 25.1 | 25.2 | 26.1 |
| (CaO + SrO + BaO) − (Al$_2$O$_3$ + B$_2$O$_3$) | −5.6 | −5.6 | −5.3 | −5.3 | −5.1 | −5.1 |
| Thermal expansion coefficient (10$^{-7}$/° C.) | 40.0 | 39.4 | 38.7 | 38.2 | 38.0 | 37.6 |
| Density (g/cm$^3$) | 2.59 | 2.59 | 2.58 | 2.57 | 2.57 | 2.56 |
| Strain point (° C.) | 708 | 709 | 711 | 711 | 713 | 714 |
| Annealing point (° C.) | 772 | 773 | 775 | 775 | 777 | 778 |
| Softening point (° C.) | 982 | 985 | 990 | 992 | 994 | 996 |
| 10$^{4.0}$ dPa · s (° C.) | 1,273 | 1,280 | 1,293 | 1,300 | 1,307 | 1,313 |
| 10$^{3.0}$ dPa · s (° C.) | 1,447 | 1,452 | 1,464 | 1,471 | 1,479 | 1,485 |
| 10$^{2.5}$ dPa · s (° C.) | 1,529 | 1,536 | 1,552 | 1,561 | 1,572 | 1,581 |
| Young's modulus (GPa) | 83.3 | 83.4 | 83.2 | 82.9 | 82.6 | 82.4 |
| Specific Young's modulus (GPa/g · cm$^{-3}$) | 32.1 | 32.2 | 32.3 | 32.3 | 32.2 | 32.2 |

TABLE 2

| (mol %) | No. 15 | No. 16 | No. 17 | No. 18 | No. 19 | No. 20 | No. 21 |
|---|---|---|---|---|---|---|---|
| SiO$_2$ | 69.8 | 70.3 | 70.8 | 71.3 | 71.8 | 72.3 | 71.2 |
| Al$_2$O$_3$ | 11.2 | 11.0 | 10.9 | 10.7 | 10.5 | 10.3 | 7.2 |
| B$_2$O$_3$ | 2.6 | 2.6 | 2.6 | 2.5 | 2.5 | 2.4 | 3.0 |
| MgO | 7.3 | 7.2 | 7.1 | 6.9 | 6.8 | 6.7 | 8.4 |
| CaO | 5.7 | 5.6 | 5.5 | 5.4 | 5.3 | 5.2 | 6.5 |
| SrO | 1.2 | 1.2 | 1.1 | 1.1 | 1.1 | 1.1 | 1.4 |
| BaO | 2.0 | 2.0 | 1.9 | 1.9 | 1.9 | 1.8 | 2.3 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 26.85 | 27.04 | 27.23 | 28.52 | 28.72 | 30.13 | 23.73 |
| SrO + BaO | 3.2 | 3.2 | 3.0 | 3.0 | 3.0 | 2.9 | 3.7 |
| B$_2$O$_3$/BaO | 1.3 | 1.3 | 1.4 | 1.3 | 1.3 | 1.3 | 1.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 26.1 | 26.2 | 28.1 | 28.2 | 28.3 | 29.3 | 22.0 |
| (CaO + SrO + BaO) − (Al$_2$O$_3$ + B$_2$O$_3$) | −4.9 | −4.8 | −5.0 | −4.8 | −4.7 | −4.6 | 0.0 |
| Thermal expansion coefficient (10$^{-7}$/° C.) | 37.3 | 37.0 | 36.3 | 36.2 | 35.9 | 35.6 | 40.9 |
| Density (g/cm$^3$) | 2.56 | 2.55 | 2.54 | 2.54 | 2.53 | 2.53 | 2.56 |
| Strain point (° C.) | 715 | 715 | 717 | 719 | 719 | 721 | 703 |
| Annealing point (° C.) | 779 | 780 | 782 | 784 | 784 | 786 | 763 |
| Softening point (° C.) | 999 | 1,000 | 1,004 | 1,007 | 1,009 | 1,011 | 976 |
| 10$^{4.0}$ dPa · s (° C.) | 1,320 | 1,326 | 1,333 | 1,340 | 1,346 | 1,352 | 1,302 |
| 10$^{3.0}$ dPa · s (° C.) | 1,493 | 1,499 | 1,507 | 1,516 | 1,523 | 1,531 | 1,473 |
| 10$^{2.5}$ dPa · s (° C.) | 1,590 | 1,597 | 1,606 | 1,617 | 1,624 | 1,634 | 1,578 |
| Young's modulus (GPa) | 82.2 | 82.1 | 82.0 | 81.6 | 81.5 | 81.3 | 79.6 |
| Specific Young's modulus (GPa/g · cm$^{-3}$) | 32.2 | 32.2 | 32.3 | 32.2 | 32.2 | 32.2 | 31.1 |

| (mol %) | No. 22 | No. 23 | No. 24 | No. 25 | No. 26 | No. 27 | No. 28 |
|---|---|---|---|---|---|---|---|
| SiO$_2$ | 70.8 | 70.4 | 70.0 | 69.7 | 69.3 | 68.9 | 68.5 |
| Al$_2$O$_3$ | 7.7 | 8.2 | 8.7 | 9.2 | 9.7 | 10.2 | 10.7 |
| B$_2$O$_3$ | 3.0 | 3.0 | 3.0 | 3.0 | 2.9 | 2.9 | 2.9 |
| MgO | 8.3 | 8.3 | 8.2 | 8.2 | 8.1 | 8.1 | 8.0 |
| CaO | 6.5 | 6.4 | 6.4 | 6.4 | 6.3 | 6.3 | 6.3 |
| SrO | 1.3 | 1.3 | 1.3 | 1.3 | 1.3 | 1.3 | 1.3 |
| BaO | 2.3 | 2.3 | 2.2 | 2.2 | 2.2 | 2.2 | 2.2 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.60 | 23.47 | 23.33 | 23.23 | 23.90 | 23.76 | 23.62 |
| SrO + BaO | 3.6 | 3.6 | 3.5 | 3.5 | 3.5 | 3.5 | 3.5 |
| B$_2$O$_3$/BaO | 1.3 | 1.3 | 1.4 | 1.4 | 1.3 | 1.3 | 1.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 22.6 | 22.7 | 23.3 | 23.4 | 23.4 | 23.4 | 23.5 |
| (CaO + SrO + BaO) − (Al$_2$O$_3$ + B$_2$O$_3$) | −0.6 | −1.2 | −1.8 | −2.3 | −2.8 | −3.3 | −3.8 |

TABLE 2-continued

|  |  |  |  |  |  |  |  |
|---|---|---|---|---|---|---|---|
| Thermal expansion coefficient ($10^{-7}$/° C.) | 40.7 | 40.4 | 40.2 | 39.8 | 39.8 | 39.6 | 39.5 |
| Density (g/cm$^3$) | 2.56 | 2.56 | 2.56 | 2.56 | 2.57 | 2.57 | 2.57 |
| Strain point (° C.) | 700 | 698 | 696 | 696 | 697 | 698 | 700 |
| Annealing point (° C.) | 761 | 760 | 759 | 759 | 761 | 762 | 764 |
| Softening point (° C.) | 976 | 976 | 976 | 976 | 978 | 979 | 981 |
| $10^{4.0}$ dPa · s (° C.) | 1,301 | 1,300 | 1,298 | 1,297 | 1,297 | 1,294 | 1,293 |
| $10^{3.0}$ dPa · s (° C.) | 1,474 | 1,473 | 1,473 | 1,472 | 1,472 | 1,469 | 1,467 |
| $10^{2.5}$ dPa · s (° C.) | 1,578 | 1,576 | 1,574 | 1,570 | 1,569 | 1,564 | 1,559 |
| Young's modulus (GPa) | 79.8 | 80.2 | 80.5 | 81.1 | 81.3 | 81.8 | 82.1 |
| Specific Young's modulus (GPa/g · cm$^{-3}$) | 31.2 | 31.3 | 31.4 | 31.7 | 31.7 | 31.8 | 31.9 |

TABLE 3

| (mol %) | No. 29 | No. 30 | No. 31 | No. 32 | No. 33 | No. 34 | No. 35 |
|---|---|---|---|---|---|---|---|
| SiO$_2$ | 68.1 | 67.7 | 67.0 | 66.6 | 66.2 | 65.8 | 65.4 |
| Al$_2$O$_3$ | 11.2 | 11.7 | 12.7 | 13.2 | 13.7 | 14.2 | 14.7 |
| B$_2$O$_3$ | 2.9 | 2.9 | 2.8 | 2.8 | 2.8 | 2.8 | 2.8 |
| MgO | 8.0 | 7.9 | 7.9 | 7.8 | 7.8 | 7.7 | 7.7 |
| CaO | 6.2 | 6.2 | 6.1 | 6.1 | 6.0 | 6.0 | 6.0 |
| SrO | 1.3 | 1.3 | 1.3 | 1.3 | 1.3 | 1.3 | 1.2 |
| BaO | 2.2 | 2.2 | 2.2 | 2.1 | 2.1 | 2.1 | 2.1 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.48 | 23.34 | 23.93 | 23.79 | 23.64 | 23.50 | 23.36 |
| SrO + BaO | 3.5 | 3.5 | 3.5 | 3.4 | 3.4 | 3.4 | 3.3 |
| B$_2$O$_3$/BaO | 1.3 | 1.3 | 1.3 | 1.3 | 1.3 | 1.3 | 1.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 23.5 | 23.5 | 23.6 | 24.3 | 24.3 | 24.4 | 25.1 |
| (CaO + SrO + BaO) − (Al$_2$O$_3$ + B$_2$O$_3$) | −4.4 | −4.9 | −5.9 | −6.5 | −7.1 | −7.6 | −8.2 |
| Thermal expansion coefficient ($10^{-7}$/° C.) | 39.3 | 39.2 | 38.9 | 38.7 | 38.5 | 38.4 | 38.2 |
| Density (g/cm$^3$) | 2.58 | 2.58 | 2.58 | 2.59 | 2.59 | 2.59 | 2.59 |
| Strain point (° C.) | 702 | 706 | 715 | 719 | 724 | 728 | 732 |
| Annealing point (° C.) | 767 | 770 | 777 | 781 | 784 | 787 | 789 |
| Softening point (° C.) | 983 | 985 | 991 | 993 | 995 | 997 | 999 |
| $10^{4.0}$ dPa · s (° C.) | 1,291 | 1,289 | 1,286 | 1,284 | 1,283 | 1,281 | 1,280 |
| $10^{3.0}$ dPa · s (° C.) | 1,464 | 1,461 | 1,455 | 1,451 | 1,446 | 1,441 | 1,436 |
| $10^{2.5}$ dPa · s (° C.) | 1,554 | 1,549 | 1,538 | 1,533 | 1,527 | 1,522 | 1,516 |
| Young's modulus (GPa) | 82.5 | 82.9 | 83.9 | 84.1 | 84.5 | 84.8 | 85.3 |
| Specific Young's modulus (GPa/g · cm$^{-3}$) | 32.0 | 32.1 | 32.4 | 32.5 | 32.7 | 32.7 | 32.9 |

| (mol %) | No. 36 | No. 37 | No. 38 | No. 39 | No. 40 | No. 41 | No. 42 |
|---|---|---|---|---|---|---|---|
| SiO$_2$ | 65.0 | 64.7 | 64.3 | 63.9 | 63.5 | 69.1 | 68.7 |
| Al$_2$O$_3$ | 15.2 | 15.7 | 16.2 | 16.7 | 17.2 | 12.5 | 12.4 |
| B$_2$O$_3$ | 2.8 | 2.7 | 2.7 | 2.7 | 2.7 | 0.4 | 0.9 |
| MgO | 7.6 | 7.6 | 7.5 | 7.5 | 7.4 | 8.1 | 8.1 |
| CaO | 5.9 | 5.9 | 5.9 | 5.8 | 5.8 | 6.3 | 6.3 |
| SrO | 1.2 | 1.2 | 1.2 | 1.2 | 1.2 | 1.3 | 1.3 |
| BaO | 2.1 | 2.1 | 2.1 | 2.1 | 2.0 | 2.2 | 2.2 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.21 | 23.96 | 23.81 | 23.67 | 23.52 | 172.75 | 76.33 |
| SrO + BaO | 3.3 | 3.3 | 3.3 | 3.3 | 3.2 | 3.5 | 3.5 |
| B$_2$O$_3$/BaO | 1.3 | 1.3 | 1.3 | 1.3 | 1.4 | 0.2 | 0.4 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 25.2 | 25.2 | 25.2 | 25.2 | 26.1 | 23.4 | 23.4 |

TABLE 3-continued

| | | | | | | | |
|---|---|---|---|---|---|---|---|
| (CaO + SrO + BaO) − (Al$_2$O$_3$ + B$_2$O$_3$) | −8.8 | −9.2 | −9.7 | −10.3 | −10.9 | −3.1 | −3.5 |
| Thermal expansion coefficient (10$^{-7}$/° C.) | 38.1 | 38.0 | 37.9 | 37.7 | 37.5 | 39.1 | 39.2 |
| Density (g/cm$^3$) | 2.60 | 2.60 | 2.60 | 2.60 | 2.60 | 2.61 | 2.60 |
| Strain point (° C.) | 735 | 739 | 741 | 743 | 745 | 744 | 736 |
| Annealing point (° C.) | 791 | 793 | 793 | 793 | 793 | 803 | 796 |
| Softening point (° C.) | 1,001 | 1,003 | 1,004 | 1,005 | 1,006 | 1,023 | 1,014 |
| 10$^{4.0}$ dPa · s (° C.) | 1,280 | 1,280 | 1,280 | 1,280 | 1,280 | 1,322 | 1,314 |
| 10$^{3.0}$ dPa · s (° C.) | 1,431 | 1,427 | 1,423 | 1,418 | 1,415 | 1,485 | 1,478 |
| 10$^{2.5}$ dPa · s (° C.) | 1,514 | 1,510 | 1,506 | 1,503 | 1,502 | 1,578 | 1,270 |
| Young's modulus (GPa) | 85.5 | 86.1 | 86.4 | 86.8 | 87.0 | 86.1 | 85.5 |
| Specific Young's modulus (GPa/g · cm$^{-3}$) | 32.9 | 33.1 | 33.2 | 33.3 | 33.4 | 33.0 | 32.9 |

TABLE 4

| (mol %) | No. 43 | No. 44 | No. 45 | No. 46 | No. 47 | No. 48 | No. 49 |
|---|---|---|---|---|---|---|---|
| SiO$_2$ | 68.4 | 68.0 | 67.7 | 67.0 | 66.7 | 66.3 | 66.0 |
| Al$_2$O$_3$ | 12.4 | 12.3 | 12.2 | 12.1 | 12.0 | 12.0 | 11.9 |
| B$_2$O$_3$ | 1.4 | 1.9 | 2.4 | 3.4 | 3.9 | 4.4 | 4.9 |
| MgO | 8.0 | 8.0 | 7.9 | 7.9 | 7.8 | 7.8 | 7.7 |
| CaO | 6.2 | 6.2 | 6.2 | 6.1 | 6.1 | 6.1 | 6.0 |
| SrO | 1.3 | 1.3 | 1.3 | 1.3 | 1.3 | 1.3 | 1.3 |
| BaO | 2.2 | 2.2 | 2.2 | 2.2 | 2.1 | 2.1 | 2.1 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 48.86 | 35.79 | 28.21 | 19.71 | 17.10 | 15.07 | 13.47 |
| SrO + BaO | 3.5 | 3.5 | 3.5 | 3.5 | 3.4 | 3.4 | 3.4 |
| B$_2$O$_3$/BaO | 0.6 | 0.9 | 1.1 | 1.5 | 1.9 | 2.1 | 2.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 23.5 | 23.5 | 23.5 | 23.6 | 24.3 | 24.3 | 24.4 |
| (CaO + SrO + BaO) − (Al$_2$O$_3$ + B$_2$O$_3$) | −4.1 | −4.5 | −4.9 | −5.9 | −6.4 | −6.9 | −7.4 |
| Thermal expansion coefficient (10$^{-7}$/° C.) | 39.0 | 39.1 | 39.1 | 39.0 | 38.9 | 38.8 | 38.8 |
| Density (g/cm$^3$) | 2.60 | 2.59 | 2.59 | 2.58 | 2.57 | 2.56 | 2.56 |
| Strain point (° C.) | 730 | 723 | 716 | 703 | 696 | 690 | 684 |
| Annealing point (° C.) | 791 | 785 | 778 | 767 | 762 | 757 | 751 |
| Softening point (° C.) | 1,008 | 999 | 993 | 981 | 976 | 971 | 966 |
| 10$^{4.0}$ dPa · s (° C.) | 1,309 | 1,300 | 1,294 | 1,280 | 1,274 | 1,266 | 1,261 |
| 10$^{3.0}$ dPa · s (° C.) | 1,475 | 1,468 | 1,464 | 1,452 | 1,447 | 1,440 | 1,436 |
| 10$^{2.5}$ dPa · s (° C.) | 1,564 | 1,556 | 1,551 | 1,537 | 1,534 | 1,527 | 1,525 |
| Young's modulus (GPa) | 84.9 | 84.4 | 83.7 | 82.8 | 82.1 | 81.7 | 81.0 |
| Specific Young's modulus (GPa/g · cm$^{-3}$) | 32.7 | 32.6 | 32.4 | 32.1 | 32.0 | 31.9 | 31.7 |

| (mol %) | No. 50 | No. 51 | No. 52 | No. 53 | No. 54 | No. 55 | No. 56 |
|---|---|---|---|---|---|---|---|
| SiO$_2$ | 65.6 | 65.3 | 64.9 | 64.6 | 64.2 | 63.9 | 71.0 |
| Al$_2$O$_3$ | 11.9 | 11.8 | 11.7 | 11.7 | 11.6 | 11.5 | 12.8 |
| B$_2$O$_3$ | 5.4 | 5.9 | 6.4 | 6.9 | 7.4 | 7.9 | 3.0 |
| MgO | 7.7 | 7.7 | 7.6 | 7.6 | 7.5 | 7.5 | 2.9 |
| CaO | 6.0 | 6.0 | 5.9 | 5.9 | 5.9 | 5.8 | 6.5 |
| SrO | 1.2 | 1.2 | 1.2 | 1.2 | 1.2 | 1.2 | 1.4 |
| BaO | 2.1 | 2.1 | 2.1 | 2.1 | 2.1 | 2.1 | 2.3 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 12.15 | 11.07 | 10.14 | 9.36 | 8.68 | 8.09 | 23.67 |
| SrO + BaO | 3.3 | 3.3 | 3.3 | 3.3 | 3.3 | 3.3 | 3.7 |
| B$_2$O$_3$/BaO | 2.6 | 2.8 | 3.0 | 3.3 | 3.5 | 3.8 | 1.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 25.1 | 25.2 | 25.2 | 25.2 | 25.2 | 25.2 | 23.5 |
| (CaO + SrO + BaO) − (Al$_2$O$_3$ + B$_2$O$_3$) | −8.0 | −8.4 | −8.9 | −9.4 | −9.8 | −10.3 | −5.6 |
| Thermal expansion | 38.7 | 38.6 | 38.7 | 38.5 | 38.7 | 38.6 | 35.7 |

TABLE 4-continued

| | | | | | | | |
|---|---|---|---|---|---|---|---|
| coefficient ($10^{-7}/°$ C.) | | | | | | | |
| Density (g/cm$^3$) | 2.55 | 2.55 | 2.54 | 2.54 | 2.53 | 2.53 | 2.54 |
| Strain point (° C.) | 679 | 672 | 666 | 661 | 655 | 650 | 735 |
| Annealing point (° C.) | 747 | 741 | 736 | 732 | 726 | 721 | 796 |
| Softening point (° C.) | 962 | 958 | 955 | 952 | 950 | 948 | 1,037 |
| $10^{4.0}$ dPa · s (° C.) | 1,254 | 1,248 | 1,243 | 1,238 | 1,232 | 1,228 | 1,368 |
| $10^{3.0}$ dPa · s (° C.) | 1,428 | 1,422 | 1,417 | 1,410 | 1,404 | 1,399 | 1,534 |
| $10^{2.5}$ dPa · s (° C.) | 1,520 | 1,517 | 1,516 | 1,512 | 1,511 | 1,511 | 1,641 |
| Young's modulus (GPa) | 80.5 | 80.0 | 79.2 | 78.9 | 78.2 | 77.6 | 80.3 |
| Specific Young's modulus (GPa/g · cm$^{-3}$) | 31.5 | 31.4 | 31.1 | 31.1 | 30.9 | 30.7 | 31.6 |

TABLE 5

| (mol %) | No. 57 | No. 58 | No. 59 | No. 60 | No. 61 | No. 62 | No. 63 |
|---|---|---|---|---|---|---|---|
| SiO$_2$ | 70.6 | 70.3 | 69.9 | 69.5 | 69.2 | 68.8 | 68.4 |
| Al$_2$O$_3$ | 12.8 | 12.7 | 12.6 | 12.6 | 12.5 | 12.4 | 12.4 |
| B$_2$O$_3$ | 3.0 | 3.0 | 3.0 | 3.0 | 2.9 | 2.9 | 2.9 |
| MgO | 3.4 | 3.9 | 4.4 | 4.9 | 5.4 | 5.9 | 6.4 |
| CaO | 6.5 | 6.4 | 6.4 | 6.4 | 6.3 | 6.3 | 6.3 |
| SrO | 1.3 | 1.3 | 1.3 | 1.3 | 1.3 | 1.3 | 1.3 |
| BaO | 2.3 | 2.3 | 2.2 | 2.2 | 2.2 | 2.2 | 2.2 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.53 | 23.43 | 23.30 | 23.17 | 23.86 | 23.72 | 23.59 |
| SrO + BaO | 3.6 | 3.6 | 3.5 | 3.5 | 3.5 | 3.5 | 3.5 |
| B$_2$O$_3$/BaO | 1.3 | 1.3 | 1.4 | 1.4 | 1.3 | 1.3 | 1.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 24.0 | 23.9 | 24.4 | 24.3 | 24.2 | 24.0 | 23.9 |
| (CaO + SrO + BaO) − (Al$_2$O$_3$ + B$_2$O$_3$) | −5.7 | −5.7 | −5.7 | −5.7 | −5.6 | −5.5 | −5.5 |
| Thermal expansion coefficient ($10^{-7}/°$ C.) | 35.9 | 36.2 | 36.5 | 36.8 | 37.2 | 37.7 | 38.0 |
| Density (g/cm$^3$) | 2.55 | 2.55 | 2.55 | 2.56 | 2.56 | 2.57 | 2.57 |
| Strain point (° C.) | 733 | 731 | 728 | 726 | 724 | 721 | 718 |
| Annealing point (° C.) | 794 | 791 | 788 | 785 | 784 | 781 | 779 |
| Softening point (° C.) | 1,032 | 1,027 | 1,021 | 1,016 | 1,012 | 1,006 | 1,001 |
| $10^{4.0}$ dPa · s (° C.) | 1,360 | 1,353 | 1,344 | 1,336 | 1,329 | 1,320 | 1,311 |
| $10^{3.0}$ dPa · s (° C.) | 1,525 | 1,517 | 1,509 | 1,500 | 1,494 | 1,487 | 1,478 |
| $10^{2.5}$ dPa · s (° C.) | 1,631 | 1,622 | 1,613 | 1,601 | 1,594 | 1,583 | 1,572 |
| Young's modulus (GPa) | 80.6 | 80.9 | 81.0 | 81.5 | 81.7 | 82.0 | 82.4 |
| Specific Young's modulus (GPa/g · cm$^{-3}$) | 31.7 | 31.7 | 31.8 | 31.9 | 31.9 | 31.9 | 32.1 |

| (mol %) | No. 64 | No. 65 | No. 66 | No. 67 | No. 68 | No. 69 | No. 70 |
|---|---|---|---|---|---|---|---|
| SiO$_2$ | 68.1 | 67.7 | 67.0 | 66.6 | 66.2 | 65.9 | 65.5 |
| Al$_2$O$_3$ | 12.3 | 12.2 | 12.1 | 12.0 | 12.0 | 11.9 | 11.8 |
| B$_2$O$_3$ | 2.9 | 2.9 | 2.8 | 2.8 | 2.8 | 2.8 | 2.8 |
| MgO | 6.9 | 7.4 | 8.4 | 8.9 | 9.4 | 9.9 | 10.4 |
| CaO | 6.2 | 6.2 | 6.1 | 6.1 | 6.1 | 6.0 | 6.0 |
| SrO | 1.3 | 1.3 | 1.3 | 1.3 | 1.3 | 1.3 | 1.2 |
| BaO | 2.2 | 2.2 | 2.2 | 2.1 | 2.1 | 2.1 | 2.1 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.48 | 23.34 | 23.93 | 23.79 | 23.64 | 23.54 | 23.39 |
| SrO + BaO | 3.5 | 3.5 | 3.5 | 3.4 | 3.4 | 3.4 | 3.3 |
| B$_2$O$_3$/BaO | 1.3 | 1.3 | 1.3 | 1.3 | 1.3 | 1.3 | 1.3 |
| BaO/(SrO + BaO) | 0.6 | 0.6 | 0.6 | 0.6 | 0.6 | 0.6 | 0.6 |
| (SiO$_2$ + Al$_2$O$_3$ + B$_2$O$_3$)/(SrO + BaO) | 23.8 | 23.7 | 23.4 | 23.9 | 23.8 | 23.7 | 24.3 |
| (CaO + SrO + BaO) − (Al$_2$O$_3$ + B$_2$O$_3$) | −5.5 | −5.4 | −5.3 | −5.3 | −5.3 | −5.3 | −5.3 |
| Thermal expansion coefficient ($10^{-7}/°$ C.) | 38.3 | 38.7 | 39.5 | 39.9 | 40.2 | 40.5 | 40.9 |

TABLE 5-continued

| | | | | | | | |
|---|---|---|---|---|---|---|---|
| Density (g/cm³) | 2.57 | 2.58 | 2.59 | 2.59 | 2.59 | 2.60 | 2.60 |
| Strain point (° C.) | 715 | 712 | 707 | 704 | 702 | 700 | 698 |
| Annealing point (° C.) | 777 | 775 | 772 | 770 | 768 | 766 | 764 |
| Softening point (° C.) | 997 | 991 | 983 | 979 | 975 | 972 | 969 |
| $10^{4.0}$ dPa · s (° C.) | 1,304 | 1,295 | 1,279 | 1,270 | 1,261 | 1,254 | 1,245 |
| $10^{3.0}$ dPa · s (° C.) | 1,472 | 1,465 | 1,452 | 1,445 | 1,437 | 1,431 | 1,424 |
| $10^{2.5}$ dPa · s (° C.) | 1,564 | 1,553 | 1,535 | 1,526 | 1,515 | 1,508 | 1,499 |
| Young's modulus (GPa) | 82.7 | 82.9 | 83.6 | 83.8 | 84.2 | 84.5 | 84.6 |
| Specific Young's modulus (GPa/g · cm⁻³) | 32.1 | 32.2 | 32.3 | 32.4 | 32.5 | 32.5 | 32.6 |

TABLE 6

| (mol %) | No. 71 | No. 72 | No. 73 | No. 74 | No. 75 | No. 76 | No. 77 |
|---|---|---|---|---|---|---|---|
| $SiO_2$ | 65.2 | 64.8 | 64.4 | 64.1 | 63.7 | 70.9 | 70.6 |
| $Al_2O_3$ | 11.8 | 11.7 | 11.6 | 11.6 | 11.5 | 12.8 | 12.8 |
| $B_2O_3$ | 2.8 | 2.7 | 2.7 | 2.7 | 2.7 | 3.0 | 3.0 |
| MgO | 10.9 | 11.4 | 11.9 | 12.4 | 12.9 | 8.3 | 8.3 |
| CaO | 6.0 | 5.9 | 5.9 | 5.9 | 5.8 | 1.2 | 1.7 |
| SrO | 1.2 | 1.2 | 1.2 | 1.2 | 1.2 | 1.3 | 1.3 |
| BaO | 2.1 | 2.1 | 2.1 | 2.1 | 2.0 | 2.3 | 2.3 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 23.29 | 24.00 | 23.85 | 23.74 | 23.59 | 23.63 | 23.53 |
| SrO + BaO | 3.3 | 3.3 | 3.3 | 3.3 | 3.2 | 3.6 | 3.6 |
| $B_2O_3$/BaO | 1.3 | 1.3 | 1.3 | 1.3 | 1.4 | 1.3 | 1.3 |
| BaO/(SrO + BaO) | 0.6 | 0.6 | 0.6 | 0.6 | 0.6 | 0.6 | 0.6 |
| $(SiO_2 + Al_2O_3 + B_2O_3)$/(SrO + BaO) | 24.2 | 24.0 | 23.8 | 23.8 | 24.3 | 24.1 | 24.0 |
| (CaO + SrO + BaO) − $(Al_2O_3 + B_2O_3)$ | −5.3 | −5.2 | −5.1 | −5.1 | −5.2 | −11.0 | −10.5 |
| Thermal expansion coefficient ($10^{-7}$/° C.) | 41.0 | 41.6 | 42.1 | 42.2 | 42.6 | 32.0 | 32.5 |
| Density (g/cm³) | 2.60 | 2.61 | 2.61 | 2.62 | 2.62 | 2.53 | 2.53 |
| Strain point (° C.) | 697 | 697 | 696 | 696 | 696 | 742 | 740 |
| Annealing point (° C.) | 762 | 761 | 759 | 757 | 756 | 803 | 800 |
| Softening point (° C.) | 966 | 964 | 962 | 960 | 958 | 1,021 | 1,018 |
| $10^{4.0}$ dPa · s (° C.) | 1,238 | 1,230 | 1,221 | 1,214 | 1,205 | 1,358 | 1,352 |
| $10^{3.0}$ dPa · s (° C.) | 1,418 | 1,412 | 1,405 | 1,399 | 1,393 | 1,521 | 1,512 |
| $10^{2.5}$ dPa · s (° C.) | 1,489 | 1,482 | 1,474 | 1,464 | 1,457 | 1,628 | 1,619 |
| Young's modulus (GPa) | 85.2 | 85.3 | 85.6 | 86.1 | 86.2 | 82.7 | 83.0 |
| Specific Young's modulus (GPa/g · cm⁻³) | 32.8 | 32.7 | 32.7 | 32.9 | 32.9 | 32.6 | 32.7 |

| (mol %) | No. 78 | No. 79 | No. 80 | No. 81 | No. 82 | No. 83 | No. 84 |
|---|---|---|---|---|---|---|---|
| $SiO_2$ | 70.2 | 69.9 | 69.5 | 69.1 | 68.8 | 68.4 | 68.1 |
| $Al_2O_3$ | 12.7 | 12.6 | 12.6 | 12.5 | 12.4 | 12.4 | 12.3 |
| $B_2O_3$ | 3.0 | 3.0 | 3.0 | 2.9 | 2.9 | 2.9 | 2.9 |
| MgO | 8.2 | 8.2 | 8.2 | 8.1 | 8.1 | 8.0 | 8.0 |
| CaO | 2.2 | 2.7 | 3.2 | 3.7 | 4.2 | 4.7 | 5.2 |
| SrO | 1.3 | 1.3 | 1.3 | 1.3 | 1.3 | 1.3 | 1.3 |
| BaO | 2.3 | 2.2 | 2.2 | 2.2 | 2.2 | 2.2 | 2.2 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 23.40 | 23.30 | 23.17 | 23.83 | 23.72 | 23.59 | 23.48 |
| SrO + BaO | 3.6 | 3.5 | 3.5 | 3.5 | 3.5 | 3.5 | 3.5 |
| $B_2O_3$/BaO | 1.3 | 1.4 | 1.4 | 1.3 | 1.3 | 1.3 | 1.3 |
| BaO/(SrO + BaO) | 0.6 | 0.6 | 0.6 | 0.6 | 0.6 | 0.6 | 0.6 |
| $(SiO_2 + Al_2O_3 + B_2O_3)$/(SrO + BaO) | 23.9 | 24.4 | 24.3 | 24.1 | 24.0 | 23.9 | 23.8 |
| (CaO + SrO + BaO) − $(Al_2O_3 + B_2O_3)$ | −9.9 | −9.4 | −8.9 | −8.2 | −7.6 | −7.1 | −6.5 |
| Thermal expansion coefficient ($10^{-7}$/° C.) | 33.2 | 33.8 | 34.4 | 35.4 | 36.0 | 36.8 | 37.4 |
| Density (g/cm³) | 2.54 | 2.54 | 2.55 | 2.56 | 2.56 | 2.57 | 2.57 |
| Strain point (° C.) | 736 | 733 | 730 | 728 | 724 | 721 | 717 |

TABLE 6-continued

| | | | | | | | |
|---|---|---|---|---|---|---|---|
| Annealing point (° C.) | 798 | 795 | 793 | 790 | 787 | 784 | 780 |
| Softening point (° C.) | 1,015 | 1,011 | 1,008 | 1,005 | 1,001 | 998 | 994 |
| $10^{4.0}$ dPa · s (° C.) | 1,344 | 1,337 | 1,330 | 1,322 | 1,315 | 1,308 | 1,301 |
| $10^{3.0}$ dPa · s (° C.) | 1,504 | 1,497 | 1,489 | 1,484 | 1,479 | 1,473 | 1,468 |
| $10^{2.5}$ dPa · s (° C.) | 1,611 | 1,603 | 1,592 | 1,585 | 1,576 | 1,568 | 1,559 |
| Young's modulus (GPa) | 82.8 | 82.9 | 83.1 | 83.0 | 83.1 | 83.2 | 83.3 |
| Specific Young's modulus (GPa/g · cm$^{-3}$) | 32.6 | 32.6 | 32.6 | 32.5 | 32.5 | 32.4 | 32.4 |

TABLE 7

| (mol %) | No. 85 | No. 86 | No. 87 | No. 88 | No. 89 | No. 90 | No. 91 |
|---|---|---|---|---|---|---|---|
| $SiO_2$ | 67.7 | 67.0 | 66.6 | 66.3 | 65.9 | 65.6 | 65.2 |
| $Al_2O_3$ | 12.2 | 12.1 | 12.0 | 12.0 | 11.9 | 11.8 | 11.8 |
| $B_2O_3$ | 2.9 | 2.8 | 2.8 | 2.8 | 2.8 | 2.8 | 2.8 |
| MgO | 7.9 | 7.9 | 7.8 | 7.8 | 7.7 | 7.7 | 7.6 |
| CaO | 5.7 | 6.7 | 7.2 | 7.7 | 8.2 | 8.7 | 9.2 |
| SrO | 1.3 | 1.3 | 1.3 | 1.3 | 1.3 | 1.2 | 1.2 |
| BaO | 2.2 | 2.2 | 2.1 | 2.1 | 2.1 | 2.1 | 2.1 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 23.34 | 23.93 | 23.79 | 23.68 | 23.54 | 23.43 | 23.29 |
| SrO + BaO | 3.5 | 3.5 | 3.4 | 3.4 | 3.4 | 3.3 | 3.3 |
| $B_2O_3$/BaO | 1.3 | 1.3 | 1.3 | 1.3 | 1.3 | 1.3 | 1.3 |
| BaO/(SrO + BaO) | 0.6 | 0.6 | 0.6 | 0.6 | 0.6 | 0.6 | 0.6 |
| $(SiO_2 + Al_2O_3 + B_2O_3)$/(SrO + BaO) | 23.7 | 23.4 | 23.9 | 23.9 | 23.7 | 24.3 | 24.2 |
| (CaO + SrO + BaO) − $(Al_2O_3 + B_2O_3)$ | −5.9 | −4.7 | −4.2 | −3.7 | −3.1 | −2.6 | −2.1 |
| Thermal expansion coefficient ($10^{-7}$/° C.) | 38.3 | 39.9 | 40.7 | 41.3 | 42.2 | 42.9 | 43.6 |
| Density (g/cm$^3$) | 2.58 | 2.59 | 2.59 | 2.59 | 2.60 | 2.60 | 2.61 |
| Strain point (° C.) | 713 | 706 | 702 | 699 | 695 | 691 | 688 |
| Annealing point (° C.) | 776 | 770 | 766 | 762 | 758 | 754 | 750 |
| Softening point (° C.) | 990 | 984 | 981 | 979 | 976 | 974 | 973 |
| $10^{4.0}$ dPa · s (° C.) | 1,294 | 1,280 | 1,272 | 1,266 | 1,259 | 1,253 | 1,247 |
| $10^{3.0}$ dPa · s (° C.) | 1,464 | 1,452 | 1,447 | 1,440 | 1,434 | 1,428 | 1,421 |
| $10^{2.5}$ dPa · s (° C.) | 1,552 | 1,536 | 1,530 | 1,522 | 1,516 | 1,511 | 1,505 |
| Young's modulus (GPa) | 83.2 | 83.5 | 83.3 | 83.6 | 83.5 | 83.5 | 83.6 |
| Specific Young's modulus (GPa/g · cm$^{-3}$) | 32.3 | 32.3 | 32.1 | 32.2 | 32.1 | 32.1 | 32.0 |

| (mol %) | No. 92 | No. 93 | No. 94 | No. 95 | No. 96 | No. 97 | No. 98 |
|---|---|---|---|---|---|---|---|
| $SiO_2$ | 64.8 | 64.5 | 64.1 | 63.8 | 68.0 | 67.7 | 67.0 |
| $Al_2O_3$ | 11.7 | 11.6 | 11.6 | 11.5 | 12.3 | 12.2 | 12.1 |
| $B_2O_3$ | 2.8 | 2.7 | 2.7 | 2.7 | 2.9 | 2.9 | 2.8 |
| MgO | 7.6 | 7.6 | 7.5 | 7.5 | 8.0 | 7.9 | 7.9 |
| CaO | 9.7 | 10.2 | 10.7 | 11.2 | 6.2 | 6.2 | 6.1 |
| SrO | 1.2 | 1.2 | 1.2 | 1.2 | 0.3 | 0.8 | 1.8 |
| BaO | 2.1 | 2.1 | 2.1 | 2.0 | 2.2 | 2.2 | 2.2 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 23.14 | 23.89 | 23.74 | 23.63 | 23.45 | 23.34 | 23.93 |
| SrO + BaO | 3.3 | 3.3 | 3.3 | 3.2 | 2.5 | 3.0 | 4.0 |
| $B_2O_3$/BaO | 1.3 | 1.3 | 1.3 | 1.4 | 1.3 | 1.3 | 1.3 |
| BaO/(SrO + BaO) | 0.6 | 0.6 | 0.6 | 0.6 | 0.9 | 0.7 | 0.6 |
| $(SiO_2 + Al_2O_3 + B_2O_3)$/(SrO + BaO) | 24.0 | 23.9 | 23.8 | 24.4 | 33.3 | 27.6 | 20.5 |
| (CaO + SrO + BaO) − $(Al_2O_3 + B_2O_3)$ | −1.5 | −0.8 | −0.3 | 0.2 | −6.5 | −5.9 | −4.8 |
| Thermal expansion coefficient ($10^{-7}$/° C.) | 44.4 | 45.2 | 46.0 | 46.5 | 37.2 | 38.2 | 40.0 |
| Density (g/cm$^3$) | 2.62 | 2.62 | 2.63 | 2.63 | 2.56 | 2.57 | 2.59 |
| Strain point (° C.) | 683 | 681 | 678 | 674 | 716 | 712 | 707 |

TABLE 7-continued

| | | | | | | | |
|---|---|---|---|---|---|---|---|
| Annealing point (° C.) | 746 | 742 | 739 | 735 | 780 | 776 | 770 |
| Softening point (° C.) | 971 | 970 | 969 | 969 | 996 | 991 | 983 |
| $10^{4.0}$ dPa·s (° C.) | 1,240 | 1,235 | 1,229 | 1,224 | 1,296 | 1,292 | 1,282 |
| $10^{3.0}$ dPa·s (° C.) | 1,414 | 1,407 | 1,400 | 1,394 | 1,464 | 1,462 | 1,455 |
| $10^{2.5}$ dPa·s (° C.) | 1,499 | 1,495 | 1,490 | 1,486 | 1,554 | 1,549 | 1,539 |
| Young's modulus (GPa) | 83.6 | 83.7 | 83.8 | 83.8 | 83.5 | 83.3 | 83.2 |
| Specific Young's modulus (GPa/g·cm$^{-3}$) | 32.0 | 31.9 | 31.9 | 31.9 | 32.6 | 32.4 | 32.1 |

TABLE 8

| (mol %) | No. 99 | No. 100 | No. 101 | No. 102 | No. 103 | No. 104 | No. 105 |
|---|---|---|---|---|---|---|---|
| SiO$_2$ | 66.7 | 66.3 | 66.0 | 65.6 | 65.3 | 65.0 | 64.6 |
| Al$_2$O$_3$ | 12.0 | 12.0 | 11.9 | 11.9 | 11.8 | 11.7 | 11.7 |
| B$_2$O$_3$ | 2.8 | 2.8 | 2.8 | 2.8 | 2.8 | 2.8 | 2.7 |
| MgO | 7.8 | 7.8 | 7.7 | 7.7 | 7.7 | 7.6 | 7.6 |
| CaO | 6.1 | 6.1 | 6.0 | 6.0 | 6.0 | 5.9 | 5.9 |
| SrO | 2.3 | 2.8 | 3.3 | 3.8 | 4.3 | 4.8 | 5.3 |
| BaO | 2.1 | 2.1 | 2.1 | 2.1 | 2.1 | 2.1 | 2.1 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.82 | 23.68 | 23.57 | 23.43 | 23.32 | 23.21 | 23.93 |
| SrO + BaO | 4.4 | 4.9 | 5.4 | 5.9 | 6.4 | 6.9 | 7.4 |
| B$_2$O$_3$/BaO | 1.3 | 1.3 | 1.3 | 1.3 | 1.3 | 1.3 | 1.3 |
| BaO/(SrO + BaO) | 0.5 | 0.4 | 0.4 | 0.4 | 0.3 | 0.3 | 0.3 |
| (SiO$_2$ + Al$_2$O$_3$ + B$_2$O$_3$)/(SrO + BaO) | 18.5 | 16.6 | 14.9 | 13.6 | 12.5 | 11.5 | 10.7 |
| (CaO + SrO + BaO) − (Al$_2$O$_3$ + B$_2$O$_3$) | −4.3 | −3.8 | −3.3 | −2.8 | −2.2 | −1.7 | −1.1 |
| Thermal expansion coefficient ($10^{-7}$/° C.) | 40.9 | 41.8 | 42.7 | 43.6 | 44.5 | 45.4 | 46.3 |
| Density (g/cm$^3$) | 2.60 | 2.62 | 2.63 | 2.64 | 2.65 | 2.66 | 2.67 |
| Strain point (° C.) | 705 | 702 | 701 | 699 | 697 | 697 | 698 |
| Annealing point (° C.) | 767 | 763 | 760 | 757 | 753 | 751 | 749 |
| Softening point (° C.) | 980 | 977 | 974 | 972 | 970 | 969 | 968 |
| $10^{4.0}$ dPa·s (° C.) | 1,278 | 1,273 | 1,269 | 1,264 | 1,260 | 1,257 | 1,252 |
| $10^{3.0}$ dPa·s (° C.) | 1,451 | 1,446 | 1,442 | 1,436 | 1,431 | 1,427 | 1,420 |
| $10^{2.5}$ dPa·s (° C.) | 1,536 | 1,530 | 1,528 | 1,522 | 1,519 | 1,518 | 1,514 |
| Young's modulus (GPa) | 82.9 | 83.0 | 82.6 | 82.7 | 82.7 | 82.3 | 82.4 |
| Specific Young's modulus (GPa/g·cm$^{-3}$) | 31.9 | 31.7 | 31.5 | 31.3 | 31.2 | 30.9 | 30.8 |

| (mol %) | No. 106 | No. 107 | No. 108 | No. 109 | No. 110 | No. 111 | No. 112 |
|---|---|---|---|---|---|---|---|
| SiO$_2$ | 64.3 | 63.9 | 68.7 | 68.4 | 68.0 | 67.7 | 67.0 |
| Al$_2$O$_3$ | 11.6 | 11.5 | 12.4 | 12.4 | 12.3 | 12.2 | 12.1 |
| B$_2$O$_3$ | 2.7 | 2.7 | 2.9 | 2.9 | 2.9 | 2.9 | 2.8 |
| MgO | 7.5 | 7.5 | 8.1 | 8.0 | 8.0 | 7.9 | 7.9 |
| CaO | 5.9 | 5.8 | 6.3 | 6.2 | 6.2 | 6.2 | 6.1 |
| SrO | 5.8 | 6.3 | 1.3 | 1.3 | 1.3 | 1.3 | 1.3 |
| BaO | 2.1 | 2.1 | 0.2 | 0.7 | 1.2 | 1.7 | 2.7 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.81 | 23.67 | 23.69 | 23.59 | 23.45 | 23.34 | 23.93 |
| SrO + BaO | 7.9 | 8.4 | 1.5 | 2.0 | 2.5 | 3.0 | 4.0 |
| B$_2$O$_3$/BaO | 1.3 | 1.3 | 14.5 | 4.1 | 2.4 | 1.7 | 1.0 |
| BaO/(SrO + BaO) | 0.3 | 0.3 | 0.1 | 0.4 | 0.5 | 0.6 | 0.7 |
| (SiO$_2$ + Al$_2$O$_3$ + B$_2$O$_3$)/(SrO + BaO) | 9.9 | 9.3 | 56.0 | 41.9 | 33.3 | 27.6 | 20.5 |
| (CaO + SrO + BaO) − (Al$_2$O$_3$ + B$_2$O$_3$) | −0.5 | 0.0 | −7.5 | −7.1 | −6.5 | −5.9 | −4.8 |
| Thermal expansion coefficient ($10^{-7}$/° C.) | 47.2 | 48.1 | 35.1 | 35.9 | 37.0 | 38.1 | 40.2 |

TABLE 8-continued

| | | | | | | | |
|---|---|---|---|---|---|---|---|
| Density (g/cm$^3$) | 2.69 | 2.70 | 2.51 | 2.53 | 2.54 | 2.56 | 2.60 |
| Strain point (° C.) | 697 | 698 | 721 | 719 | 715 | 712 | 708 |
| Annealing point (° C.) | 747 | 745 | 788 | 785 | 781 | 777 | 770 |
| Softening point (° C.) | 968 | 967 | 1,002 | 1,000 | 995 | 991 | 984 |
| $10^{4.0}$ dPa · s (° C.) | 1,249 | 1,244 | 1,300 | 1,298 | 1,293 | 1,290 | 1,284 |
| $10^{3.0}$ dPa · s (° C.) | 1,415 | 1,409 | 1,464 | 1,464 | 1,462 | 1,461 | 1,456 |
| $10^{2.5}$ dPa · s (° C.) | 1,512 | 1,510 | 1,558 | 1,555 | 1,550 | 1,548 | 1,541 |
| Young's modulus (GPa) | 82.2 | 81.9 | 84.4 | 84.1 | 83.8 | 83.5 | 83.1 |
| Specific Young's modulus (GPa/g · cm$^{-3}$) | 30.6 | 30.3 | 33.7 | 33.3 | 32.9 | 32.6 | 31.9 |

TABLE 9

| (mol %) | No. 113 | No. 114 | No. 115 | No. 116 | No. 117 | No. 118 | No. 119 |
|---|---|---|---|---|---|---|---|
| SiO$_2$ | 66.7 | 66.3 | 66.0 | 65.6 | 65.3 | 64.9 | 64.6 |
| Al$_2$O$_3$ | 12.0 | 12.0 | 11.9 | 11.9 | 11.8 | 11.7 | 11.7 |
| B$_2$O$_3$ | 2.8 | 2.8 | 2.8 | 2.8 | 2.8 | 2.8 | 2.7 |
| MgO | 7.8 | 7.8 | 7.7 | 7.7 | 7.7 | 7.6 | 7.6 |
| CaO | 6.1 | 6.1 | 6.0 | 6.0 | 6.0 | 5.9 | 5.9 |
| SrO | 1.3 | 1.3 | 1.3 | 1.2 | 1.2 | 1.2 | 1.2 |
| BaO | 3.2 | 3.7 | 4.2 | 4.7 | 5.2 | 5.7 | 6.2 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 23.82 | 23.68 | 23.57 | 23.43 | 23.32 | 23.18 | 23.93 |
| SrO + BaO | 4.5 | 5.0 | 55 | 5.9 | 6.4 | 6.9 | 7.4 |
| B$_2$O$_3$/BaO | 0.9 | 0.8 | 0.7 | 0.6 | 0.5 | 0.5 | 0.4 |
| BaO/(SrO + BaO) | 0.7 | 0.7 | 0.8 | 0.8 | 0.8 | 0.8 | 0.8 |
| (SiO$_2$ + Al$_2$O$_3$ + B$_2$O$_3$)/(SrO + BaO) | 18.1 | 16.2 | 14.7 | 13.6 | 12.5 | 11.5 | 10.7 |
| (CaO + SrO + BaO) − (Al$_2$O$_3$ + B$_2$O$_3$) | −4.2 | −3.7 | −3.2 | −2.8 | −2.2 | −1.7 | −1.1 |
| Thermal expansion coefficient ($10^{-7}$/° C.) | 41.2 | 42.2 | 43.3 | 44.2 | 45.1 | 46.3 | 47.2 |
| Density (g/cm$^3$) | 2.62 | 2.64 | 2.66 | 2.68 | 2.69 | 2.71 | 2.73 |
| Strain point (° C.) | 705 | 703 | 702 | 701 | 700 | 701 | 702 |
| Annealing point (° C.) | 766 | 763 | 760 | 757 | 754 | 753 | 752 |
| Softening point (° C.) | 980 | 977 | 975 | 973 | 972 | 971 | 971 |
| $10^{4.0}$ dPa · s (° C.) | 1,281 | 1,277 | 1,275 | 1,271 | 1,268 | 1,265 | 1,263 |
| $10^{3.0}$ dPa · s (° C.) | 1,453 | 1,448 | 1,446 | 1,441 | 1,436 | 1,431 | 1,427 |
| $10^{2.5}$ dPa · s (° C.) | 1,539 | 1,534 | 1,534 | 1,530 | 1,528 | 1,527 | 1,525 |
| Young's modulus (GPa) | 82.7 | 82.6 | 82.1 | 81.9 | 81.7 | 81.2 | 81.2 |
| Specific Young's modulus (GPa/g · cm$^{-3}$) | 31.6 | 31.3 | 30.9 | 30.6 | 30.4 | 29.9 | 29.7 |

| (mol %) | No. 120 | No. 121 | No. 122 | No. 123 | No. 124 | No. 125 | No. 126 |
|---|---|---|---|---|---|---|---|
| SiO$_2$ | 64.2 | 63.9 | 67.2 | 67.1 | 66.9 | 66.8 | 66.7 |
| Al$_2$O$_3$ | 11.6 | 11.5 | 12.1 | 12.1 | 12.1 | 12.1 | 12.0 |
| B$_2$O$_3$ | 2.7 | 2.7 | 2.9 | 2.8 | 2.8 | 2.8 | 2.8 |
| MgO | 7.5 | 7.5 | 7.9 | 7.9 | 7.9 | 7.8 | 7.8 |
| CaO | 5.9 | 5.8 | 6.1 | 6.1 | 6.1 | 6.1 | 6.1 |
| SrO | 1.2 | 1.2 | 1.3 | 1.3 | 1.3 | 1.3 | 1.3 |
| BaO | 6.7 | 7.2 | 2.2 | 2.2 | 2.2 | 2.1 | 2.1 |
| ZnO | 0.0 | 0.0 | 0.0 | 0.0 | 0.0 | 0.0 | 0.0 |
| P$_2$O$_5$ | 0.0 | 0.0 | 0.2 | 0.4 | 0.6 | 0.8 | 1.0 |
| SnO$_2$ | 0.1 | 0.1 | 0.1 | 0.1 | 0.1 | 0.1 | 0.1 |
| SiO$_2$/B$_2$O$_3$ | 23.78 | 23.67 | 23.17 | 23.96 | 23.89 | 23.86 | 23.82 |
| SrO + BaO | 7.9 | 8.4 | 3.5 | 3.5 | 3.5 | 3.4 | 3.4 |
| B$_2$O$_3$/BaO | 0.4 | 0.4 | 1.3 | 1.3 | 1.3 | 1.3 | 1.3 |
| BaO/(SrO + BaO) | 0.8 | 0.9 | 0.6 | 0.6 | 0.6 | 0.6 | 0.6 |
| (SiO$_2$ + Al$_2$O$_3$ + B$_2$O$_3$)/(SrO + BaO) | 9.9 | 9.3 | 23.5 | 23.4 | 23.4 | 24.0 | 24.0 |
| (CaO + SrO + BaO) − (Al$_2$O$_3$ + B$_2$O$_3$) | −0.5 | 0.0 | −5.4 | −5.3 | −5.3 | −5.4 | −5.3 |

TABLE 9-continued

|  |  |  |  |  |  |  |  |
|---|---|---|---|---|---|---|---|
| Thermal expansion coefficient ($10^{-7}$/° C.) | 48.3 | 49.1 | 39.0 | 39.0 | 39.0 | 38.9 | 38.9 |
| Density (g/cm³) | 2.75 | 2.77 | 2.58 | 2.58 | 2.58 | 2.57 | 2.57 |
| Strain point (° C.) | 703 | 704 | 708 | 709 | 708 | 708 | 707 |
| Annealing point (° C.) | 750 | 750 | 771 | 771 | 769 | 769 | 767 |
| Softening point (° C.) | 971 | 971 | 985 | 985 | 983 | 983 | 981 |
| $10^{4.0}$ dPa · s (° C.) | 1,260 | 1,258 | 1,287 | 1,289 | 1,289 | 1,290 | 1,291 |
| $10^{3.0}$ dPa · s (° C.) | 1,421 | 1,416 | 1,459 | 1,461 | 1,461 | 1,463 | 1,463 |
| $10^{2.5}$ dPa · s (° C.) | 1,524 | 1,523 | 1,545 | 1,548 | 1,548 | 1,551 | 1,553 |
| Young's modulus (GPa) | 80.7 | 80.4 | 82.9 | 82.7 | 82.4 | 82.0 | 81.7 |
| Specific Young's modulus (GPa/g · cm⁻³) | 29.3 | 29.0 | 32.1 | 32.1 | 32.0 | 31.9 | 31.8 |

TABLE 10

| (mol %) | No. 127 | No. 128 | No. 129 | No. 130 | No. 131 | No. 132 | No. 133 |
|---|---|---|---|---|---|---|---|
| $SiO_2$ | 66.5 | 66.4 | 66.3 | 66.1 | 66.0 | 65.9 | 65.7 |
| $Al_2O_3$ | 12.0 | 12.0 | 12.0 | 11.9 | 11.9 | 11.9 | 11.9 |
| $B_2O_3$ | 2.8 | 2.8 | 2.8 | 2.8 | 2.8 | 2.8 | 2.8 |
| MgO | 7.8 | 7.8 | 7.8 | 7.8 | 7.7 | 7.7 | 7.7 |
| CaO | 6.1 | 6.1 | 6.1 | 6.0 | 6.0 | 6.0 | 6.0 |
| SrO | 1.3 | 1.3 | 1.3 | 1.3 | 1.3 | 1.3 | 1.2 |
| BaO | 2.1 | 2.1 | 2.1 | 2.1 | 2.1 | 2.1 | 2.1 |
| ZnO | 0.0 | 0.0 | 0.0 | 0.0 | 0.0 | 0.0 | 0.0 |
| $P_2O_5$ | 1.2 | 1.4 | 1.6 | 1.8 | 2.0 | 2.2 | 2.4 |
| $SnO_2$ | 0.1 | 0.1 | 0.1 | 0.1 | 0.1 | 0.1 | 0.1 |
| $SiO_2/B_2O_3$ | 23.75 | 23.71 | 23.68 | 23.61 | 23.57 | 23.54 | 23.46 |
| SrO + BaO | 3.4 | 3.4 | 3.4 | 3.4 | 3.4 | 3.4 | 3.3 |
| $B_2O_3$/BaO | 1.3 | 1.3 | 1.3 | 1.3 | 1.3 | 1.3 | 1.3 |
| BaO/(SrO + BaO) | 0.6 | 0.6 | 0.6 | 0.6 | 0.6 | 0.6 | 0.6 |
| ($SiO_2 + Al_2O_3 + B_2O_3$)/(SrO + BaO) | 23.9 | 23.9 | 23.9 | 23.8 | 23.7 | 23.7 | 24.4 |
| (CaO + SrO + BaO) − ($Al_2O_3 + B_2O_3$) | −5.3 | −5.3 | −5.3 | −5.3 | −5.3 | −5.3 | −5.4 |
| Thermal expansion coefficient ($10^{-7}$/° C.) | 38.9 | 38.7 | 38.6 | 38.8 | 38.7 | 38.5 | 38.5 |
| Density (g/cm³) | 2.57 | 2.56 | 2.56 | 2.56 | 2.55 | 2.55 | 2.55 |
| Strain point (° C.) | 706 | 706 | 705 | 704 | 704 | 704 | 703 |
| Annealing point (° C.) | 765 | 764 | 762 | 761 | 759 | 758 | 757 |
| Softening point (° C.) | 979 | 978 | 977 | 975 | 974 | 974 | 972 |
| $10^{4.0}$ dPa · s (° C.) | 1,291 | 1,292 | 1,293 | 1,293 | 1,294 | 1,296 | 1,295 |
| $10^{3.0}$ dPa · s (° C.) | 1,463 | 1,464 | 1,465 | 1,465 | 1,467 | 1,467 | 1,467 |
| $10^{2.5}$ dPa · s (° C.) | 1,553 | 1,554 | 1,554 | 1,557 | 1,559 | 1,560 | 1,561 |
| Young's modulus (GPa) | 81.4 | 81.2 | 81.1 | 80.5 | 80.1 | 80.0 | 79.6 |
| Specific Young's modulus (GPa/g · cm⁻³) | 31.7 | 31.7 | 31.7 | 31.5 | 31.4 | 31.3 | 31.2 |

| (mol %) | No. 134 | No. 135 | No. 136 | No. 137 | No. 138 | No. 139 | No. 140 |
|---|---|---|---|---|---|---|---|
| $SiO_2$ | 65.6 | 65.5 | 65.3 | 65.2 | 65.1 | 64.9 | 64.8 |
| $Al_2O_3$ | 11.8 | 11.8 | 11.8 | 11.8 | 11.8 | 11.7 | 11.7 |
| $B_2O_3$ | 2.8 | 2.8 | 2.8 | 2.8 | 2.8 | 2.8 | 2.7 |
| MgO | 7.7 | 7.7 | 7.7 | 7.6 | 7.6 | 7.6 | 7.6 |
| CaO | 6.0 | 6.0 | 6.0 | 6.0 | 5.9 | 5.9 | 5.9 |
| SrO | 1.2 | 1.2 | 1.2 | 1.2 | 1.2 | 1.2 | 1.2 |
| BaO | 2.1 | 2.1 | 2.1 | 2.1 | 2.1 | 2.1 | 2.1 |
| ZnO | 0.0 | 0.0 | 0.0 | 0.0 | 0.0 | 0.0 | 0.0 |
| $P_2O_5$ | 2.6 | 2.8 | 3.0 | 3.2 | 3.4 | 3.6 | 3.8 |
| $SnO_2$ | 0.1 | 0.1 | 0.1 | 0.1 | 0.1 | 0.1 | 0.1 |
| $SiO_2/B_2O_3$ | 23.43 | 23.39 | 23.32 | 23.29 | 23.25 | 23.18 | 24.00 |
| SrO + BaO | 3.3 | 3.3 | 3.3 | 3.3 | 3.3 | 3.3 | 3.3 |
| $B_2O_3$/BaO | 1.3 | 1.3 | 1.3 | 1.3 | 1.3 | 1.3 | 1.3 |
| BaO/(SrO + BaO) | 0.6 | 0.6 | 0.6 | 0.6 | 0.6 | 0.6 | 0.6 |
| ($SiO_2 + Al_2O_3 + B_2O_3$)/(SrO + BaO) | 24.3 | 24.3 | 24.2 | 24.2 | 24.2 | 24.1 | 24.0 |

TABLE 10-continued

| | | | | | | | |
|---|---|---|---|---|---|---|---|
| (CaO + SrO + BaO) − (Al$_2$O$_3$ + B$_2$O$_3$) | −5.3 | −5.3 | −5.3 | −5.3 | −5.4 | −5.3 | −5.2 |
| Thermal expansion coefficient (10$^{-7}$/° C.) | 38.5 | 38.3 | 38.4 | 38.3 | 38.1 | 38.3 | 38.3 |
| Density (g/cm$^3$) | 2.55 | 2.54 | 2.54 | 2.54 | 2.53 | 2.53 | 2.53 |
| Strain point (° C.) | 702 | 702 | 701 | 701 | 701 | 699 | 700 |
| Annealing point (° C.) | 755 | 754 | 752 | 751 | 750 | 748 | 748 |
| Softening point (° C.) | 971 | 970 | 969 | 969 | 968 | 966 | 967 |
| 10$^{4.0}$ dPa · s (° C.) | 1,296 | 1,297 | 1,297 | 1,299 | 1,300 | 1,299 | 1,301 |
| 10$^{3.0}$ dPa · s (° C.) | 1,468 | 1,468 | 1,467 | 1,469 | 1,470 | 1,469 | 1,470 |
| 10$^{2.5}$ dPa · s (° C.) | 1,562 | 1,563 | 1,563 | 1,565 | 1,567 | 1,567 | 1,569 |
| Young's modulus (GPa) | 79.2 | 79.1 | 78.8 | 78.4 | 78.1 | 77.7 | 77.5 |
| Specific Young's modulus (GPa/g · cm$^{-3}$) | 31.1 | 31.1 | 31.0 | 30.9 | 30.9 | 30.7 | 30.6 |

TABLE 11

| (mol %) | No. 141 | No. 142 | No. 143 | No. 144 | No. 145 | No. 146 | No. 147 |
|---|---|---|---|---|---|---|---|
| SiO$_2$ | 64.7 | 60.9 | 61.4 | 61.9 | 62.4 | 62.9 | 63.4 |
| Al$_2$O$_3$ | 11.7 | 15.3 | 15.1 | 14.9 | 14.7 | 14.5 | 14.3 |
| B$_2$O$_3$ | 2.7 | 3.3 | 3.3 | 3.2 | 3.2 | 3.1 | 3.1 |
| MgO | 7.6 | 9.2 | 9.1 | 8.9 | 8.8 | 8.7 | 8.6 |
| CaO | 5.9 | 7.1 | 7.1 | 7.0 | 6.9 | 6.8 | 6.7 |
| SrO | 1.2 | 0.7 | 0.7 | 0.7 | 0.7 | 0.7 | 0.7 |
| BaO | 2.1 | 3.0 | 3.0 | 2.9 | 2.9 | 2.9 | 2.8 |
| ZnO | 0.0 | 0.0 | 0.0 | 0.0 | 0.0 | 0.0 | 0.0 |
| P$_2$O$_5$ | 4.0 | 0.3 | 0.3 | 0.3 | 0.3 | 0.3 | 0.3 |
| SnO$_2$ | 0.1 | 0.1 | 0.1 | 0.1 | 0.1 | 0.1 | 0.1 |
| SiO$_2$/B$_2$O$_3$ | 23.96 | 18.45 | 18.61 | 19.34 | 19.50 | 20.29 | 20.45 |
| SrO + BaO | 3.3 | 3.7 | 3.7 | 3.6 | 3.6 | 3.6 | 3.5 |
| B$_2$O$_3$/BaO | 1.3 | 1.1 | 1.1 | 1.1 | 1.1 | 1.1 | 1.1 |
| BaO/(SrO + BaO) | 0.6 | 0.8 | 0.8 | 0.8 | 0.8 | 0.8 | 0.8 |
| (SiO$_2$ + Al$_2$O$_3$ + B$_2$O$_3$)/(SrO + BaO) | 24.0 | 21.5 | 21.6 | 22.2 | 22.3 | 22.4 | 23.1 |
| (CaO + SrO + BaO) − (Al$_2$O$_3$ + B$_2$O$_3$) | −5.2 | −7.8 | −7.6 | −7.5 | −7.4 | −7.2 | −7.2 |
| Thermal expansion coefficient (10$^{-7}$/° C.) | 38.1 | 42.3 | 42.0 | 41.8 | 41.5 | 41.3 | 40.8 |
| Density (g/cm$^3$) | 2.53 | 2.65 | 2.64 | 2.64 | 2.63 | 2.63 | 2.62 |
| Strain point (° C.) | 700 | 711 | 711 | 712 | 712 | 713 | 713 |
| Annealing point (° C.) | 747 | 772 | 771 | 773 | 773 | 773 | 774 |
| Softening point (° C.) | 967 | 971 | 972 | 973 | 975 | 976 | 978 |
| 10$^{4.0}$ dPa · s (° C.) | 1,302 | 1,216 | 1,221 | 1,227 | 1,233 | 1,239 | 1,245 |
| 10$^{3.0}$ dPa · s (° C.) | 1,470 | 1,392 | 1,395 | 1,402 | 1,406 | 1,412 | 1,417 |
| 10$^{2.5}$ dPa · s (° C.) | 1,569 | 1,439 | 1,445 | 1,455 | 1,463 | 1,472 | 1,480 |
| Young's modulus (GPa) | 77.3 | 85.7 | 85.7 | 85.3 | 85.1 | 85.0 | 84.8 |
| Specific Young's modulus (GPa/g · cm$^{-3}$) | 30.6 | 32.4 | 32.5 | 32.4 | 32.4 | 32.4 | 32.4 |

| (mol %) | No. 148 | No. 149 | No. 150 | No. 151 | No. 152 | No. 153 | No. 154 |
|---|---|---|---|---|---|---|---|
| SiO$_2$ | 63.9 | 64.4 | 64.9 | 65.4 | 66.4 | 66.9 | 67.4 |
| Al$_2$O$_3$ | 14.1 | 13.9 | 13.7 | 13.5 | 13.1 | 12.9 | 12.7 |
| B$_2$O$_3$ | 3.1 | 3.0 | 3.0 | 2.9 | 2.9 | 2.8 | 2.8 |
| MgO | 8.5 | 8.4 | 8.2 | 8.1 | 7.9 | 7.8 | 7.6 |
| CaO | 6.6 | 6.5 | 6.4 | 6.3 | 6.1 | 6.0 | 6.0 |
| SrO | 0.7 | 0.7 | 0.7 | 0.7 | 0.6 | 0.6 | 0.6 |
| BaO | 2.8 | 2.7 | 2.7 | 2.7 | 2.6 | 2.6 | 2.5 |
| ZnO | 0.0 | 0.0 | 0.0 | 0.0 | 0.0 | 0.0 | 0.0 |
| P$_2$O$_5$ | 0.3 | 0.2 | 0.2 | 0.2 | 0.2 | 0.2 | 0.2 |
| SnO$_2$ | 0.1 | 0.1 | 0.1 | 0.1 | 0.1 | 0.1 | 0.1 |
| SiO$_2$/B$_2$O$_3$ | 20.61 | 21.47 | 21.63 | 22.55 | 22.90 | 23.89 | 24.07 |
| SrO + BaO | 3.5 | 3.4 | 3.4 | 3.4 | 3.2 | 3.2 | 3.1 |
| B$_2$O$_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |

TABLE 11-continued

| | | | | | | | |
|---|---|---|---|---|---|---|---|
| $(SiO_2 + Al_2O_3 + B_2O_3)/(SrO + BaO)$ | 23.2 | 23.9 | 24.0 | 24.1 | 25.8 | 25.8 | 26.7 |
| $(CaO + SrO + BaO) - (Al_2O_3 + B_2O_3)$ | -7.1 | -7.0 | -6.9 | -6.7 | -6.7 | -6.5 | -6.4 |
| Thermal expansion coefficient ($10^{-7}/°C$) | 40.4 | 40.2 | 39.9 | 39.6 | 38.7 | 38.4 | 38.0 |
| Density (g/cm³) | 2.61 | 2.61 | 2.60 | 2.60 | 2.59 | 2.58 | 2.58 |
| Strain point (°C.) | 714 | 715 | 715 | 716 | 717 | 718 | 719 |
| Annealing point (°C.) | 774 | 776 | 776 | 777 | 779 | 780 | 780 |
| Softening point (°C.) | 980 | 982 | 984 | 986 | 990 | 993 | 995 |
| $10^{4.0}$ dPa · s (°C.) | 1,252 | 1,257 | 1,264 | 1,271 | 1,284 | 1,291 | 1,297 |
| $10^{3.0}$ dPa · s (°C.) | 1,422 | 1,427 | 1,433 | 1,440 | 1,452 | 1,458 | 1,465 |
| $10^{2.5}$ dPa · s (°C.) | 1,488 | 1,497 | 1,507 | 1,517 | 1,535 | 1,545 | 1,554 |
| Young's modulus (GPa) | 84.6 | 84.4 | 84.1 | 84.0 | 83.5 | 83.3 | 83.1 |
| Specific Young's modulus (GPa/g · cm⁻³) | 32.4 | 32.4 | 32.3 | 32.3 | 32.3 | 32.3 | 32.3 |

TABLE 12

| (mol %) | No. 155 | No. 156 | No. 157 | No. 158 | No. 159 | No. 160 | No. 161 |
|---|---|---|---|---|---|---|---|
| $SiO_2$ | 67.9 | 68.4 | 68.9 | 69.4 | 69.9 | 70.4 | 70.9 |
| $Al_2O_3$ | 12.5 | 12.3 | 12.1 | 11.9 | 11.7 | 11.5 | 11.3 |
| $B_2O_3$ | 2.7 | 2.7 | 2.6 | 2.6 | 2.6 | 2.5 | 2.5 |
| MgO | 7.5 | 7.4 | 7.3 | 7.2 | 7.1 | 6.9 | 6.8 |
| CaO | 5.9 | 5.8 | 5.7 | 5.6 | 5.5 | 5.4 | 5.3 |
| SrO | 0.6 | 0.6 | 0.6 | 0.6 | 0.6 | 0.6 | 0.6 |
| BaO | 2.5 | 2.4 | 2.4 | 2.4 | 2.3 | 2.3 | 2.2 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 25.15 | 25.33 | 26.50 | 26.69 | 26.88 | 28.16 | 28.36 |
| SrO + BaO | 3.1 | 3.0 | 3.0 | 3.0 | 2.9 | 2.9 | 2.8 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| $(SiO_2 + Al_2O_3 + B_2O_3)/(SrO + BaO)$ | 26.8 | 27.8 | 27.9 | 28.0 | 29.0 | 29.1 | 30.3 |
| $(CaO + SrO + BaO) - (Al_2O_3 + B_2O_3)$ | -6.2 | -6.2 | -6.0 | -5.9 | -5.9 | -5.7 | -5.7 |
| Thermal expansion coefficient ($10^{-7}/°C$) | 37.7 | 37.2 | 36.9 | 36.6 | 36.1 | 36.0 | 35.6 |
| Density (g/cm³) | 2.57 | 2.56 | 2.56 | 2.55 | 2.55 | 2.54 | 2.54 |
| Strain point (°C.) | 720 | 720 | 721 | 722 | 722 | 724 | 724 |
| Annealing point (°C.) | 781 | 782 | 784 | 784 | 785 | 786 | 787 |
| Softening point (°C.) | 998 | 1,000 | 1,003 | 1,005 | 1,007 | 1,010 | 1,013 |
| $10^{4.0}$ dPa · s (°C.) | 1,304 | 1,311 | 1,318 | 1,324 | 1,330 | 1,338 | 1,344 |
| $10^{3.0}$ dPa · s (°C.) | 1,472 | 1,478 | 1,486 | 1,492 | 1,499 | 1,508 | 1,515 |
| $10^{2.5}$ dPa · s (°C.) | 1,564 | 1,573 | 1,582 | 1,590 | 1,599 | 1,610 | 1,619 |
| Young's modulus (GPa) | 82.9 | 82.7 | 82.6 | 82.4 | 82.2 | 81.9 | 81.7 |
| Specific Young's modulus (GPa/g · cm⁻³) | 32.2 | 32.3 | 32.2 | 32.3 | 32.3 | 32.2 | 32.2 |

| (mol %) | No. 162 | No. 163 | No. 164 | No. 165 | No. 166 | No. 167 | No. 168 |
|---|---|---|---|---|---|---|---|
| $SiO_2$ | 69.7 | 69.4 | 69.0 | 68.6 | 68.2 | 67.8 | 67.5 |
| $Al_2O_3$ | 8.3 | 8.8 | 9.3 | 9.8 | 10.3 | 10.8 | 11.3 |
| $B_2O_3$ | 3.1 | 3.0 | 3.0 | 3.0 | 3.0 | 3.0 | 3.0 |
| MgO | 8.5 | 8.4 | 8.4 | 8.3 | 8.3 | 8.2 | 8.2 |
| CaO | 6.6 | 6.6 | 6.5 | 6.5 | 6.4 | 6.4 | 6.4 |
| SrO | 0.7 | 0.7 | 0.7 | 0.7 | 0.7 | 0.7 | 0.7 |
| BaO | 2.8 | 2.8 | 2.7 | 2.7 | 2.7 | 2.7 | 2.7 |
| ZnO | 0.0 | 0.0 | 0.0 | 0.0 | 0.0 | 0.0 | 0.0 |
| $P_2O_5$ | 0.3 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.48 | 23.13 | 23.00 | 22.87 | 22.73 | 22.60 | 22.50 |
| SrO + BaO | 3.5 | 3.5 | 3.4 | 3.4 | 3.4 | 3.4 | 3.4 |

TABLE 12-continued

|  |  |  |  |  |  |  |  |
|---|---|---|---|---|---|---|---|
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| ($SiO_2$ + $Al_2O_3$ + $B_2O_3$)/(SrO + BaO) | 23.2 | 23.2 | 23.9 | 23.9 | 24.0 | 24.0 | 24.1 |
| (CaO + SrO + BaO) − ($Al_2O_3$ + $B_2O_3$) | −1.3 | −1.7 | −2.4 | −2.9 | −3.5 | −4.0 | −4.5 |
| Thermal expansion coefficient ($10^{-7}$/° C.) | 40.7 | 40.6 | 40.4 | 40.2 | 40.0 | 39.9 | 39.6 |
| Density (g/cm³) | 2.57 | 2.57 | 2.57 | 2.58 | 2.58 | 2.58 | 2.58 |
| Strain point (° C.) | 696 | 695 | 695 | 694 | 695 | 697 | 700 |
| Annealing point (° C.) | 756 | 757 | 757 | 758 | 759 | 761 | 763 |
| Softening point (° C.) | 974 | 975 | 975 | 975 | 976 | 977 | 979 |
| $10^{4.0}$ dPa · s (° C.) | 1,295 | 1,294 | 1,292 | 1,290 | 1,288 | 1,286 | 1,285 |
| $10^{3.0}$ dPa · s (° C.) | 1,465 | 1,465 | 1,465 | 1,464 | 1,462 | 1,461 | 1,458 |
| $10^{2.5}$ dPa · s (° C.) | 1,570 | 1,568 | 1,566 | 1,562 | 1,558 | 1,553 | 1,547 |
| Young's modulus (GPa) | 79.9 | 80.4 | 80.7 | 81.1 | 81.4 | 81.8 | 82.4 |
| Specific Young's modulus (GPa/g · cm⁻³) | 31.2 | 31.3 | 31.4 | 31.5 | 31.6 | 31.7 | 31.9 |

TABLE 13

| (mol %) | No. 169 | No. 170 | No. 171 | No. 172 | No. 173 | No. 174 | No. 175 |
|---|---|---|---|---|---|---|---|
| $SiO_2$ | 67.1 | 66.7 | 66.3 | 65.6 | 65.2 | 64.8 | 64.4 |
| $Al_2O_3$ | 11.8 | 12.3 | 12.8 | 13.8 | 14.3 | 14.8 | 15.3 |
| $B_2O_3$ | 2.9 | 2.9 | 2.9 | 2.9 | 2.9 | 2.8 | 2.8 |
| MgO | 8.1 | 8.1 | 8.0 | 8.0 | 7.9 | 7.9 | 7.8 |
| CaO | 6.3 | 6.3 | 6.3 | 6.2 | 6.2 | 6.1 | 6.1 |
| SrO | 0.7 | 0.7 | 0.7 | 0.6 | 0.6 | 0.6 | 0.6 |
| BaO | 2.7 | 2.7 | 2.6 | 2.6 | 2.6 | 2.6 | 2.6 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2$/$B_2O_3$ | 23.14 | 23.00 | 22.86 | 22.62 | 22.48 | 23.14 | 23.00 |
| SrO + BaO | 3.4 | 3.4 | 3.3 | 3.2 | 3.2 | 3.2 | 3.2 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| ($SiO_2$ + $Al_2O_3$ + $B_2O_3$)/(SrO + BaO) | 24.1 | 24.1 | 24.8 | 25.7 | 25.8 | 25.8 | 25.8 |
| (CaO + SrO + BaO) − ($Al_2O_3$ + $B_2O_3$) | −5.0 | −5.5 | −6.1 | −7.3 | −7.8 | −8.3 | −8.8 |
| Thermal expansion coefficient ($10^{-7}$/° C.) | 39.6 | 39.5 | 39.3 | 38.8 | 38.7 | 38.6 | 38.5 |
| Density (g/cm³) | 2.59 | 2.59 | 2.59 | 2.59 | 2.60 | 2.60 | 2.60 |
| Strain point (° C.) | 704 | 708 | 712 | 721 | 726 | 730 | 734 |
| Annealing point (° C.) | 768 | 771 | 774 | 781 | 784 | 787 | 789 |
| Softening point (° C.) | 982 | 984 | 986 | 991 | 994 | 996 | 998 |
| $10^{4.0}$ dPa · s (° C.) | 1,283 | 1,281 | 1,279 | 1,276 | 1,275 | 1,275 | 1,274 |
| $10^{3.0}$ dPa · s (° C.) | 1,457 | 1,453 | 1,450 | 1,441 | 1,436 | 1,432 | 1,428 |
| $10^{2.5}$ dPa · s (° C.) | 1,544 | 1,537 | 1,532 | 1,520 | 1,515 | 1,511 | 1,506 |
| Young's modulus (GPa) | 82.6 | 83.1 | 83.4 | 84.3 | 84.6 | 85.0 | 85.3 |
| Specific Young's modulus (GPa/g · cm⁻³) | 31.9 | 32.1 | 32.2 | 32.5 | 32.6 | 32.7 | 32.8 |

| (mol %) | No. 176 | No. 177 | No. 178 | No. 179 | No. 180 | No. 181 | No. 182 |
|---|---|---|---|---|---|---|---|
| $SiO_2$ | 64.0 | 63.6 | 63.3 | 62.9 | 62.5 | 62.1 | 67.6 |
| $Al_2O_3$ | 15.8 | 16.3 | 16.8 | 17.3 | 17.8 | 18.3 | 13.6 |
| $B_2O_3$ | 2.8 | 2.8 | 2.8 | 2.8 | 2.7 | 2.7 | 0.4 |
| MgO | 7.8 | 7.7 | 7.7 | 7.6 | 7.6 | 7.5 | 8.2 |
| CaO | 6.0 | 6.0 | 6.0 | 5.9 | 5.9 | 5.9 | 6.4 |
| SrO | 0.6 | 0.6 | 0.6 | 0.6 | 0.6 | 0.6 | 0.7 |
| BaO | 2.6 | 2.5 | 2.5 | 2.5 | 2.5 | 2.5 | 2.7 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2$/$B_2O_3$ | 22.86 | 22.71 | 22.61 | 22.46 | 23.15 | 23.00 | 169.00 |
| SrO + BaO | 3.2 | 3.1 | 3.1 | 3.1 | 3.1 | 3.1 | 3.4 |
| $B_2O_3$/BaO | 1.1 | 1.1 | 1.1 | 1.1 | 1.1 | 1.1 | 0.1 |
| BaO/(SrO + BaO) | 0.8 | 0.8 | 0.8 | 0.8 | 0.8 | 0.8 | 0.8 |
| ($SiO_2$ + $Al_2O_3$ + $B_2O_3$)/(SrO + BaO) | 25.8 | 26.7 | 26.7 | 26.8 | 26.8 | 26.8 | 24.0 |

TABLE 13-continued

| | | | | | | | |
|---|---|---|---|---|---|---|---|
| (CaO + SrO + BaO) − (Al$_2$O$_3$ + B$_2$O$_3$) | −9.4 | −10.0 | −10.5 | −11.1 | −11.5 | −12.0 | −4.2 |
| Thermal expansion coefficient (10$^{-7}$/° C.) | 38.4 | 38.2 | 37.9 | 37.7 | 37.7 | 37.5 | 39.5 |
| Density (g/cm$^3$) | 2.61 | 2.61 | 2.61 | 2.61 | 2.62 | 2.62 | 2.62 |
| Strain point (° C.) | 737 | 740 | 742 | 743 | 745 | 746 | 748 |
| Annealing point (° C.) | 790 | 791 | 791 | 791 | 791 | 790 | 805 |
| Softening point (° C.) | 999 | 1,001 | 1,002 | 1,003 | 1,005 | 1,006 | 1,024 |
| 10$^{4.0}$ dPa · s (° C.) | 1,273 | 1,273 | 1,274 | 1,275 | 1,276 | 1,277 | 1,312 |
| 10$^{3.0}$ dPa · s (° C.) | 1,422 | 1,418 | 1,413 | 1,410 | 1,406 | 1,402 | 1,473 |
| 10$^{2.5}$ dPa · s (° C.) | 1,502 | 1,500 | 1,496 | 1,495 | 1,494 | 1,493 | 1,560 |
| Young's modulus (GPa) | 85.7 | 86.0 | 86.6 | 86.8 | 87.3 | 87.6 | 86.5 |
| Specific Young's modulus (GPa/g · cm$^{-3}$) | 32.9 | 33.0 | 33.2 | 33.2 | 33.4 | 33.5 | 33.0 |

TABLE 14

| (mol %) | No. 183 | No. 184 | No. 185 | No. 186 | No. 187 | No. 188 | No. 189 |
|---|---|---|---|---|---|---|---|
| SiO$_2$ | 67.3 | 67.0 | 66.6 | 66.3 | 65.6 | 65.3 | 64.9 |
| Al$_2$O$_3$ | 13.6 | 13.5 | 13.4 | 13.4 | 13.2 | 13.2 | 13.1 |
| B$_2$O$_3$ | 0.9 | 1.4 | 1.9 | 2.4 | 3.4 | 3.9 | 4.4 |
| MgO | 8.2 | 8.1 | 8.1 | 8.0 | 8.0 | 7.9 | 7.9 |
| CaO | 6.4 | 6.3 | 6.3 | 6.3 | 6.2 | 6.2 | 6.1 |
| SrO | 0.7 | 0.7 | 0.7 | 0.7 | 0.6 | 0.6 | 0.6 |
| BaO | 2.7 | 2.7 | 2.7 | 2.6 | 2.6 | 2.6 | 2.6 |
| ZnO | 0.0 | 0.0 | 0.0 | 0.0 | 0.0 | 0.0 | 0.0 |
| P$_2$O$_5$ | 0.2 | 0.2 | 0.2 | 0.2 | 0.2 | 0.2 | 0.2 |
| SnO$_2$ | 0.1 | 0.1 | 0.1 | 0.1 | 0.1 | 0.1 | 0.1 |
| SiO$_2$/B$_2$O$_3$ | 74.78 | 47.86 | 35.05 | 27.63 | 19.29 | 16.74 | 14.75 |
| SrO + BaO | 3.4 | 3.4 | 3.4 | 3.3 | 3.2 | 3.2 | 3.2 |
| B$_2$O$_3$/BaO | 0.3 | 0.5 | 0.7 | 0.9 | 1.3 | 1.5 | 1.7 |
| BaO/(SrO + BaO) | 0.8 | 0.8 | 0.8 | 0.8 | 0.8 | 0.8 | 0.8 |
| (SiO$_2$ + Al$_2$O$_3$ + B$_2$O$_3$)/(SrO + BaO) | 24.1 | 24.1 | 24.1 | 24.9 | 25.7 | 25.8 | 25.8 |
| (CaO + SrO + BaO) − (Al$_2$O$_3$ + B$_2$O$_3$) | −4.7 | −5.2 | −5.6 | −6.2 | −7.2 | −7.7 | −8.2 |
| Thermal expansion coefficient (10$^{-7}$/° C.) | 39.2 | 39.2 | 39.3 | 39.1 | 39.0 | 38.8 | 38.9 |
| Density (g/cm$^3$) | 2.61 | 2.61 | 2.61 | 2.60 | 2.59 | 2.58 | 2.58 |
| Strain point (° C.) | 742 | 735 | 728 | 723 | 711 | 706 | 699 |
| Annealing point (° C.) | 799 | 794 | 788 | 783 | 773 | 768 | 763 |
| Softening point (° C.) | 1,016 | 1,009 | 1,001 | 995 | 982 | 978 | 972 |
| 10$^{4.0}$ dPa · s (° C.) | 1,305 | 1,299 | 1,291 | 1,285 | 1,270 | 1,265 | 1,257 |
| 10$^{3.0}$ dPa · s (° C.) | 1,467 | 1,463 | 1,457 | 1,451 | 1,440 | 1,434 | 1,428 |
| 10$^{2.5}$ dPa · s (° C.) | 1,551 | 1,546 | 1,538 | 1,532 | 1,520 | 1,515 | 1,510 |
| Young's modulus (GPa) | 86.3 | 85.5 | 84.9 | 84.4 | 83.2 | 82.8 | 82.1 |
| Specific Young's modulus (GPa/g · cm$^{-3}$) | 33.0 | 32.8 | 32.6 | 32.5 | 32.2 | 32.1 | 31.9 |

| (mol %) | No. 190 | No. 191 | No. 192 | No. 193 | No. 194 | No. 195 | No. 196 |
|---|---|---|---|---|---|---|---|
| SiO$_2$ | 64.6 | 64.2 | 63.9 | 63.6 | 63.2 | 62.9 | 62.5 |
| Al$_2$O$_3$ | 13.0 | 13.0 | 12.9 | 12.8 | 12.8 | 12.7 | 12.6 |
| B$_2$O$_3$ | 4.9 | 5.4 | 5.9 | 6.4 | 6.9 | 7.4 | 7.9 |
| MgO | 7.8 | 7.8 | 7.7 | 7.7 | 7.7 | 7.6 | 7.6 |
| CaO | 6.1 | 6.1 | 6.0 | 6.0 | 6.0 | 5.9 | 5.9 |
| SrO | 0.6 | 0.6 | 0.6 | 0.6 | 0.6 | 0.6 | 0.6 |
| BaO | 2.6 | 2.6 | 2.5 | 2.5 | 2.5 | 2.5 | 2.5 |
| ZnO | 0.0 | 0.0 | 0.0 | 0.0 | 0.0 | 0.0 | 0.0 |
| P$_2$O$_5$ | 0.2 | 0.2 | 0.2 | 0.2 | 0.2 | 0.2 | 0.2 |
| SnO$_2$ | 0.1 | 0.1 | 0.1 | 0.1 | 0.1 | 0.1 | 0.1 |
| SiO$_2$/B$_2$O$_3$ | 13.18 | 11.89 | 10.83 | 9.94 | 9.16 | 8.50 | 7.91 |
| SrO+BaO | 3.2 | 3.2 | 3.1 | 3.1 | 3.1 | 3.1 | 3.1 |
| B$_2$O$_3$/BaO | 1.9 | 2.1 | 2.4 | 2.6 | 2.8 | 3.0 | 3.2 |
| BaO/(SrO + BaO) | 0.8 | 0.8 | 0.8 | 0.8 | 0.8 | 0.8 | 0.8 |
| (SiO$_2$ + Al$_2$O$_3$ + B$_2$O$_3$)/(SrO + BaO) | 25.8 | 25.8 | 26.7 | 26.7 | 26.7 | 26.8 | 26.8 |
| (CaO + SrO + BaO) − (Al$_2$O$_3$ + B$_2$O$_3$) | −8.6 | −9.1 | −9.7 | −10.1 | −10.6 | −11.1 | −11.5 |
| Thermal expansion coefficient (10$^{-7}$/° C.) | 38.9 | 38.8 | 38.7 | 38.7 | 38.6 | 38.6 | 38.7 |
| Density (g/cm$^3$) | 2.57 | 2.57 | 2.56 | 2.55 | 2.55 | 2.54 | 2.54 |
| Strain point (° C.) | 693 | 688 | 683 | 677 | 672 | 667 | 661 |
| Annealing point (° C.) | 758 | 754 | 750 | 745 | 740 | 736 | 731 |
| Softening point (° C.) | 967 | 963 | 960 | 957 | 954 | 952 | 950 |
| 10$^{4.0}$ dPa · s (° C.) | 1,251 | 1,244 | 1,238 | 1,232 | 1,226 | 1,221 | 1,215 |
| 10$^{3.0}$ dPa · s (° C.) | 1,423 | 1,415 | 1,410 | 1,404 | 1,397 | 1,392 | 1,386 |

TABLE 14-continued

| | | | | | | | |
|---|---|---|---|---|---|---|---|
| $10^{2.5}$ dPa · s (° C.) | 1,507 | 1,501 | 1,501 | 1,498 | 1,494 | 1,495 | 1,493 |
| Young's modulus (GPa) | 81.4 | 81.1 | 80.2 | 79.8 | 79.4 | 78.7 | 78.1 |
| Specific Young's modulus (GPa/g · cm$^{-3}$) | 31.7 | 31.6 | 31.4 | 31.3 | 31.2 | 30.9 | 30.8 |

TABLE 15

| (mol %) | No. 197 | No. 198 | No. 199 | No. 200 | No. 201 | No. 202 | No. 203 |
|---|---|---|---|---|---|---|---|
| $SiO_2$ | 69.5 | 69.2 | 68.8 | 68.4 | 68.1 | 67.7 | 67.4 |
| $Al_2O_3$ | 14.0 | 14.0 | 13.9 | 13.8 | 13.7 | 13.7 | 13.6 |
| $B_2O_3$ | 3.1 | 3.0 | 3.0 | 3.0 | 3.0 | 3.0 | 3.0 |
| MgO | 3.0 | 3.5 | 4.0 | 4.5 | 5.0 | 5.5 | 6.0 |
| CaO | 6.6 | 6.5 | 6.5 | 6.5 | 6.4 | 6.4 | 6.4 |
| SrO | 0.7 | 0.7 | 0.7 | 0.7 | 0.7 | 0.7 | 0.7 |
| BaO | 2.8 | 2.8 | 2.7 | 2.7 | 2.7 | 2.7 | 2.7 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.42 | 23.07 | 22.93 | 22.80 | 22.70 | 22.57 | 22.47 |
| SrO + BaO | 3.5 | 3.5 | 3.4 | 3.4 | 3.4 | 3.4 | 3.4 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 24.7 | 24.6 | 25.2 | 25.1 | 24.9 | 24.8 | 24.7 |
| (CaO + SrO + BaO) − $(Al_2O_3 + B_2O_3)$ | −7.0 | −7.0 | −7.0 | −6.9 | −6.9 | −6.9 | −6.8 |
| Thermal expansion coefficient ($10^{-7}$/° C.) | 35.6 | 35.8 | 36.2 | 36.7 | 37.0 | 37.3 | 37.6 |
| Density (g/cm$^3$) | 2.56 | 2.56 | 2.56 | 2.57 | 2.57 | 2.57 | 2.58 |
| Strain point (° C.) | 739 | 738 | 736 | 734 | 732 | 730 | 728 |
| Annealing point (° C.) | 798 | 796 | 794 | 791 | 788 | 786 | 784 |
| Softening point (° C.) | 1,035 | 1,031 | 1,026 | 1,020 | 1,016 | 1,011 | 1,006 |
| $10^{4.0}$ dPa · s (° C.) | 1,359 | 1,353 | 1,344 | 1,335 | 1,327 | 1,319 | 1,311 |
| $10^{3.0}$ dPa · s (° C.) | 1,518 | 1,510 | 1,501 | 1,492 | 1,486 | 1,477 | 1,470 |
| $10^{2.5}$ dPa · s (° C.) | 1,624 | 1,616 | 1,606 | 1,595 | 1,586 | 1,574 | 1,564 |
| Young's modulus (GPa) | 80.8 | 81.2 | 81.4 | 81.7 | 81.9 | 82.4 | 82.7 |
| Specific Young's modulus (GPa/g · cm$^{-3}$) | 31.6 | 31.7 | 31.8 | 31.8 | 31.9 | 32.0 | 32.1 |

| (mol %) | No. 204 | No. 205 | No. 206 | No. 207 | No. 208 | No. 209 | No. 210 |
|---|---|---|---|---|---|---|---|
| $SiO_2$ | 67.0 | 66.7 | 66.3 | 65.6 | 65.2 | 64.9 | 64.5 |
| $Al_2O_3$ | 13.5 | 13.4 | 13.4 | 13.2 | 13.2 | 13.1 | 13.0 |
| $B_2O_3$ | 2.9 | 2.9 | 2.9 | 2.9 | 2.9 | 2.8 | 2.8 |
| MgO | 6.5 | 7.0 | 7.5 | 8.5 | 9.0 | 9.5 | 10.0 |
| CaO | 6.3 | 6.3 | 6.3 | 6.2 | 6.2 | 6.1 | 6.1 |
| SrO | 0.7 | 0.7 | 0.7 | 0.6 | 0.6 | 0.6 | 0.6 |
| BaO | 2.7 | 2.7 | 2.6 | 2.6 | 2.6 | 2.6 | 2.6 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 23.10 | 23.00 | 22.86 | 22.62 | 22.48 | 23.18 | 23.04 |
| SrO + BaO | 3.4 | 3.4 | 3.3 | 3.2 | 3.2 | 3.2 | 3.2 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 24.5 | 24.4 | 25.0 | 25.5 | 25.4 | 25.3 | 25.1 |
| (CaO + SrO + BaO) − $(Al_2O_3 + B_2O_3)$ | −6.7 | −6.6 | −6.7 | −6.7 | −6.7 | −6.6 | −6.5 |
| Thermal expansion coefficient ($10^{-7}$/° C.) | 38.1 | 38.5 | 38.7 | 39.4 | 39.7 | 40.1 | 40.6 |
| Density (g/cm$^3$) | 2.58 | 2.59 | 2.59 | 2.59 | 2.60 | 2.60 | 2.61 |
| Strain point (° C.) | 725 | 722 | 720 | 714 | 711 | 709 | 705 |
| Annealing point (° C.) | 783 | 781 | 780 | 776 | 774 | 774 | 771 |
| Softening point (° C.) | 1,002 | 997 | 993 | 984 | 980 | 977 | 972 |
| $10^{4.0}$ dPa · s (° C.) | 1,302 | 1,295 | 1,286 | 1,269 | 1,261 | 1,254 | 1,245 |
| $10^{3.0}$ dPa · s (° C.) | 1,465 | 1,459 | 1,451 | 1,440 | 1,433 | 1,429 | 1,422 |
| $10^{2.5}$ dPa · s (° C.) | 1,556 | 1,546 | 1,535 | 1,517 | 1,506 | 1,499 | 1,489 |
| Young's modulus (GPa) | 82.9 | 83.2 | 83.6 | 84.0 | 84.5 | 84.7 | 84.9 |
| Specific Young's modulus (GPa/g · cm$^{-3}$) | 32.1 | 32.2 | 32.3 | 32.4 | 32.5 | 32.5 | 32.6 |

TABLE 16

| (mol %) | No. 211 | No. 212 | No. 213 | No. 214 | No. 215 | No. 216 | No. 217 |
|---|---|---|---|---|---|---|---|
| $SiO_2$ | 64.1 | 63.8 | 63.4 | 63.1 | 62.7 | 62.3 | 69.5 |
| $Al_2O_3$ | 12.9 | 12.9 | 12.8 | 12.7 | 12.7 | 12.6 | 14.0 |
| $B_2O_3$ | 2.8 | 2.8 | 2.8 | 2.8 | 2.8 | 2.7 | 3.0 |
| MgO | 10.5 | 11.0 | 11.5 | 12.0 | 12.5 | 13.0 | 8.4 |
| CaO | 6.1 | 6.0 | 6.0 | 6.0 | 5.9 | 5.9 | 1.2 |
| SrO | 0.6 | 0.6 | 0.6 | 0.6 | 0.6 | 0.6 | 0.7 |
| BaO | 2.6 | 2.5 | 2.5 | 2.5 | 2.5 | 2.5 | 2.8 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.89 | 22.79 | 22.64 | 22.54 | 22.39 | 23.07 | 23.17 |
| SrO + BaO | 3.2 | 3.1 | 3.1 | 3.1 | 3.1 | 3.1 | 3.5 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 24.9 | 25.6 | 25.5 | 25.4 | 25.2 | 25.0 | 24.7 |
| (CaO + SrO + BaO) − ($Al_2O_3 + B_2O_3$) | −6.4 | −6.6 | −6.5 | −6.4 | −6.5 | −6.3 | −12.3 |
| Thermal expansion coefficient ($10^{-7}$/° C.) | 41.0 | 41.1 | 41.5 | 41.8 | 42.1 | 42.7 | 31.9 |
| Density (g/cm$^3$) | 2.61 | 2.61 | 2.62 | 2.62 | 2.62 | 2.63 | 2.55 |
| Strain point (° C.) | 702 | 700 | 698 | 695 | 694 | 694 | 745 |
| Annealing point (° C.) | 768 | 768 | 765 | 762 | 760 | 758 | 801 |
| Softening point (° C.) | 968 | 966 | 962 | 959 | 957 | 955 | 1,019 |
| $10^{4.0}$ dPa · s (° C.) | 1,236 | 1,229 | 1,221 | 1,213 | 1,206 | 1,198 | 1,348 |
| $10^{3.0}$ dPa · s (° C.) | 1,415 | 1,410 | 1,404 | 1,398 | 1,392 | 1,386 | 1,509 |
| $10^{2.5}$ dPa · s (° C.) | 1,480 | 1,471 | 1,462 | 1,454 | 1,445 | 1,438 | 1,611 |
| Young's modulus (GPa) | 85.2 | 85.6 | 85.8 | 86.2 | 86.5 | 86.8 | 83.3 |
| Specific Young's modulus (GPa/g · cm$^{-3}$) | 32.6 | 32.7 | 32.8 | 32.9 | 33.0 | 33.0 | 32.7 |

| (mol %) | No. 218 | No. 219 | No. 220 | No. 221 | No. 222 | No. 223 | No. 224 |
|---|---|---|---|---|---|---|---|
| $SiO_2$ | 69.1 | 68.8 | 68.4 | 68.0 | 67.7 | 67.3 | 67.0 |
| $Al_2O_3$ | 13.9 | 13.9 | 13.8 | 13.7 | 13.7 | 13.6 | 13.5 |
| $B_2O_3$ | 3.0 | 3.0 | 3.0 | 3.0 | 3.0 | 3.0 | 2.9 |
| MgO | 8.4 | 8.3 | 8.3 | 8.3 | 8.2 | 8.2 | 8.1 |
| CaO | 1.7 | 2.2 | 2.7 | 3.2 | 3.7 | 4.2 | 4.7 |
| SrO | 0.7 | 0.7 | 0.7 | 0.7 | 0.7 | 0.7 | 0.7 |
| BaO | 2.8 | 2.7 | 2.7 | 2.7 | 2.7 | 2.7 | 2.7 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 23.03 | 22.93 | 22.80 | 22.67 | 22.57 | 22.43 | 23.10 |
| SrO + BaO | 3.5 | 3.4 | 3.4 | 3.4 | 3.4 | 3.4 | 3.4 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 24.6 | 25.2 | 25.1 | 24.9 | 24.8 | 24.7 | 24.5 |
| (CaO + SrO + BaO) − ($Al_2O_3 + B_2O_3$) | −11.7 | −11.3 | −10.7 | −10.1 | −9.6 | −9.0 | −8.3 |
| Thermal expansion coefficient ($10^{-7}$/° C.) | 32.6 | 33.1 | 33.9 | 34.6 | 35.2 | 36.0 | 36.9 |
| Density (g/cm$^3$) | 2.55 | 2.55 | 2.56 | 2.56 | 2.57 | 2.57 | 2.58 |
| Strain point (° C.) | 743 | 741 | 738 | 735 | 733 | 730 | 727 |
| Annealing point (° C.) | 800 | 798 | 796 | 794 | 792 | 789 | 787 |
| Softening point (° C.) | 1,015 | 1,013 | 1,009 | 1,006 | 1,004 | 1,000 | 998 |
| $10^{4.0}$ dPa · s (° C.) | 1,341 | 1,335 | 1,327 | 1,319 | 1,314 | 1,306 | 1,300 |
| $10^{3.0}$ dPa · s (° C.) | 1,498 | 1,491 | 1,482 | 1,474 | 1,469 | 1,463 | 1,460 |
| $10^{2.5}$ dPa · s (° C.) | 1,601 | 1,594 | 1,585 | 1,575 | 1,567 | 1,557 | 1,551 |
| Young's modulus (GPa) | 83.3 | 83.4 | 83.4 | 83.5 | 83.6 | 83.6 | 83.6 |
| Specific Young's modulus (GPa/g · cm$^{-3}$) | 32.7 | 32.7 | 32.6 | 32.6 | 32.6 | 32.5 | 32.4 |

TABLE 17

| (mol %) | No. 225 | No. 226 | No. 227 | No. 228 | No. 229 | No. 230 | No. 231 |
|---|---|---|---|---|---|---|---|
| $SiO_2$ | 66.6 | 66.3 | 65.6 | 65.2 | 64.9 | 64.5 | 64.2 |
| $Al_2O_3$ | 13.4 | 13.4 | 13.2 | 13.2 | 13.1 | 13.0 | 12.9 |
| $B_2O_3$ | 2.9 | 2.9 | 2.9 | 2.9 | 2.8 | 2.8 | 2.8 |
| MgO | 8.1 | 8.0 | 8.0 | 7.9 | 7.9 | 7.8 | 7.8 |
| CaO | 5.2 | 5.7 | 6.7 | 7.2 | 7.7 | 8.2 | 8.7 |
| SrO | 0.7 | 0.7 | 0.6 | 0.6 | 0.6 | 0.6 | 0.6 |
| BaO | 2.7 | 2.6 | 2.6 | 2.6 | 2.6 | 2.6 | 2.6 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.97 | 22.86 | 22.62 | 22.48 | 23.18 | 23.04 | 22.93 |
| SrO + BaO | 3.4 | 3.3 | 3.2 | 3.2 | 3.2 | 3.2 | 3.2 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 24.4 | 25.0 | 25.5 | 25.4 | 25.3 | 25.1 | 25.0 |
| $(CaO + SrO + BaO) - (Al_2O_3 + B_2O_3)$ | -7.7 | -7.3 | -6.2 | -5.7 | -5.0 | -4.4 | -3.8 |
| Thermal expansion coefficient ($10^{-7}/°C$) | 37.7 | 38.3 | 39.8 | 40.5 | 41.4 | 42.3 | 43.0 |
| Density (g/cm³) | 2.59 | 2.59 | 2.60 | 2.60 | 2.61 | 2.61 | 2.62 |
| Strain point (°C) | 723 | 721 | 713 | 710 | 707 | 702 | 698 |
| Annealing point (°C) | 784 | 782 | 775 | 771 | 768 | 764 | 759 |
| Softening point (°C) | 994 | 992 | 985 | 982 | 980 | 977 | 974 |
| $10^{4.0}$ dPa·s (°C) | 1,291 | 1,285 | 1,270 | 1,263 | 1,257 | 1,250 | 1,243 |
| $10^{3.0}$ dPa·s (°C) | 1,455 | 1,451 | 1,441 | 1,436 | 1,432 | 1,426 | 1,420 |
| $10^{2.5}$ dPa·s (°C) | 1,542 | 1,535 | 1,519 | 1,511 | 1,505 | 1,499 | 1,493 |
| Young's modulus (GPa) | 83.6 | 83.7 | 83.8 | 83.8 | 84.0 | 83.8 | 83.9 |
| Specific Young's modulus (GPa/g·cm⁻³) | 32.3 | 32.4 | 32.3 | 32.2 | 32.2 | 32.1 | 32.1 |

| (mol %) | No. 232 | No. 233 | No. 234 | No. 235 | No. 236 | No. 237 | No. 238 |
|---|---|---|---|---|---|---|---|
| $SiO_2$ | 63.8 | 63.5 | 63.1 | 62.8 | 62.4 | 66.3 | 65.6 |
| $Al_2O_3$ | 12.9 | 12.8 | 12.7 | 12.7 | 12.6 | 13.4 | 13.2 |
| $B_2O_3$ | 2.8 | 2.8 | 2.8 | 2.8 | 2.7 | 2.9 | 2.9 |
| MgO | 7.7 | 7.7 | 7.7 | 7.6 | 7.6 | 8.0 | 8.0 |
| CaO | 9.2 | 9.7 | 10.2 | 10.7 | 11.2 | 6.3 | 6.2 |
| SrO | 0.6 | 0.6 | 0.6 | 0.6 | 0.6 | 0.1 | 1.1 |
| BaO | 2.5 | 2.5 | 2.5 | 2.5 | 2.5 | 2.6 | 2.6 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.79 | 22.68 | 22.54 | 22.43 | 23.11 | 22.86 | 22.62 |
| SrO + BaO | 3.1 | 3.1 | 3.1 | 3.1 | 3.1 | 2.7 | 3.7 |
| $B_2O_3$/BaO | 1.1 | 1.1 | 1.1 | 1.1 | 1.1 | 1.1 | 1.1 |
| BaO/(SrO + BaO) | 0.8 | 0.8 | 0.8 | 0.8 | 0.8 | 1.0 | 0.7 |
| $(SiO_2 + Al_2O_3 + B_2O_3)$/(SrO + BaO) | 25.6 | 25.5 | 25.4 | 25.3 | 25.1 | 30.6 | 22.1 |
| $(CaO + SrO + BaO) - (Al_2O_3 + B_2O_3)$ | -3.4 | -2.8 | -2.2 | -1.7 | -1.0 | -7.3 | -6.2 |
| Thermal expansion coefficient ($10^{-7}/°C$) | 43.6 | 44.3 | 45.1 | 45.6 | 46.5 | 38.1 | 40.0 |
| Density (g/cm³) | 2.62 | 2.63 | 2.63 | 2.64 | 2.64 | 2.58 | 2.60 |
| Strain point (°C) | 695 | 691 | 686 | 683 | 680 | 721 | 713 |
| Annealing point (°C) | 757 | 752 | 747 | 744 | 740 | 782 | 774 |
| Softening point (°C) | 972 | 970 | 968 | 967 | 966 | 993 | 984 |
| $10^{4.0}$ dPa·s (°C) | 1,236 | 1,230 | 1,223 | 1,218 | 1,212 | 1,283 | 1,272 |
| $10^{3.0}$ dPa·s (°C) | 1,415 | 1,408 | 1,401 | 1,396 | 1,389 | 1,449 | 1,443 |
| $10^{2.5}$ dPa·s (°C) | 1,487 | 1,481 | 1,476 | 1,471 | 1,467 | 1,532 | 1,521 |
| Young's modulus (GPa) | 83.9 | 84.1 | 84.1 | 84.2 | 84.3 | 83.9 | 83.6 |
| Specific Young's modulus (GPa/g·cm⁻³) | 32.0 | 32.0 | 32.0 | 32.0 | 31.9 | 32.5 | 32.1 |

TABLE 18

| (mol %) | No. 239 | No. 240 | No. 241 | No. 242 | No. 243 | No. 244 | No. 245 |
|---|---|---|---|---|---|---|---|
| $SiO_2$ | 65.3 | 64.9 | 64.6 | 64.3 | 63.9 | 63.6 | 63.3 |
| $Al_2O_3$ | 13.2 | 13.1 | 13.0 | 13.0 | 12.9 | 12.8 | 12.8 |
| $B_2O_3$ | 2.9 | 2.8 | 2.8 | 2.8 | 2.8 | 2.8 | 2.8 |
| MgO | 7.9 | 7.9 | 7.8 | 7.8 | 7.8 | 7.7 | 7.7 |
| CaO | 6.2 | 6.1 | 6.1 | 6.1 | 6.0 | 6.0 | 6.0 |
| SrO | 1.6 | 2.1 | 2.6 | 3.1 | 3.6 | 4.1 | 4.6 |
| BaO | 2.6 | 2.6 | 2.6 | 2.6 | 2.5 | 2.5 | 2.5 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.52 | 23.18 | 23.07 | 22.96 | 22.82 | 22.71 | 22.61 |
| SrO + BaO | 4.2 | 4.7 | 5.2 | 5.7 | 6.1 | 6.6 | 7.1 |
| $B_2O_3$/BaO | 1.1 | 1.1 | 1.1 | 1.1 | 1.1 | 1.1 | 1.1 |
| BaO/(SrO + BaO) | 0.6 | 0.6 | 0.5 | 0.5 | 0.4 | 0.4 | 0.4 |
| $(SiO_2 + Al_2O_3 + B_2O_3)$/(SrO + BaO) | 19.4 | 17.2 | 15.5 | 14.1 | 13.0 | 12.0 | 11.1 |
| (CaO + SrO + BaO) − $(Al_2O_3 + B_2O_3)$ | −5.7 | −5.1 | −4.5 | −4.0 | −3.6 | −3.0 | −2.5 |
| Thermal expansion coefficient $(10^{-7}/°C.)$ | 40.7 | 41.9 | 42.8 | 43.5 | 44.4 | 45.3 | 45.9 |
| Density (g/cm³) | 2.61 | 2.63 | 2.64 | 2.65 | 2.66 | 2.67 | 2.68 |
| Strain point (° C.) | 711 | 708 | 705 | 703 | 700 | 698 | 697 |
| Annealing point (° C.) | 771 | 768 | 764 | 760 | 757 | 754 | 750 |
| Softening point (° C.) | 981 | 977 | 973 | 971 | 968 | 966 | 965 |
| $10^{4.0}$ dPa · s (° C.) | 1,269 | 1,263 | 1,259 | 1,255 | 1,249 | 1,246 | 1,242 |
| $10^{3.0}$ dPa · s (° C.) | 1,440 | 1,437 | 1,434 | 1,429 | 1,424 | 1,420 | 1,415 |
| $10^{2.5}$ dPa · s (° C.) | 1,517 | 1,513 | 1,510 | 1,505 | 1,502 | 1,500 | 1,495 |
| Young's modulus (GPa) | 83.6 | 83.3 | 83.1 | 83.3 | 82.9 | 82.7 | 82.9 |
| Specific Young's modulus (GPa/g · cm⁻³) | 32.0 | 31.7 | 31.5 | 31.4 | 31.2 | 31.0 | 30.9 |

| (mol %) | No. 246 | No. 247 | No. 248 | No. 249 | No. 250 | No. 251 | No. 252 |
|---|---|---|---|---|---|---|---|
| $SiO_2$ | 62.9 | 62.6 | 67.6 | 67.3 | 67.0 | 66.6 | 66.3 |
| $Al_2O_3$ | 12.7 | 12.6 | 13.6 | 13.6 | 13.5 | 13.4 | 13.4 |
| $B_2O_3$ | 2.8 | 2.7 | 3.0 | 3.0 | 2.9 | 2.9 | 2.9 |
| MgO | 7.6 | 7.6 | 8.2 | 8.2 | 8.1 | 8.1 | 8.0 |
| CaO | 5.9 | 5.9 | 6.4 | 6.4 | 6.3 | 6.3 | 6.3 |
| SrO | 5.1 | 5.6 | 0.7 | 0.7 | 0.7 | 0.7 | 0.7 |
| BaO | 2.5 | 2.5 | 0.1 | 0.6 | 1.1 | 1.6 | 2.1 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.46 | 23.19 | 22.53 | 22.43 | 23.10 | 22.97 | 22.86 |
| SrO + BaO | 7.6 | 8.1 | 0.8 | 1.3 | 1.8 | 2.3 | 2.8 |
| $B_2O_3$/BaO | 1.1 | 1.1 | 30.0 | 5.0 | 2.6 | 1.8 | 1.4 |
| BaO/(SrO + BaO) | 0.3 | 0.3 | 0.1 | 0.5 | 0.6 | 0.7 | 0.8 |
| $(SiO_2 + Al_2O_3 + B_2O_3)$/(SrO + BaO) | 10.3 | 9.6 | 105.3 | 64.5 | 46.3 | 36.0 | 29.5 |
| (CaO + SrO + BaO) − $(Al_2O_3 + B_2O_3)$ | −2.0 | −1.3 | −9.4 | −8.9 | −8.3 | −7.7 | −7.2 |
| Thermal expansion coefficient $(10^{-7}/°C.)$ | 46.9 | 47.8 | 34.1 | 34.9 | 36.0 | 37.1 | 38.0 |
| Density (g/cm³) | 2.69 | 2.71 | 2.50 | 2.52 | 2.54 | 2.56 | 2.57 |
| Strain point (° C.) | 696 | 696 | 732 | 729 | 727 | 723 | 720 |
| Annealing point (° C.) | 747 | 745 | 795 | 792 | 789 | 785 | 782 |
| Softening point (° C.) | 964 | 963 | 1,003 | 1,002 | 1,000 | 996 | 993 |
| $10^{4.0}$ dPa · s (° C.) | 1,237 | 1,234 | 1,294 | 1,291 | 1,289 | 1,284 | 1,282 |
| $10^{3.0}$ dPa · s (° C.) | 1,410 | 1,405 | 1,451 | 1,448 | 1,450 | 1,448 | 1,447 |
| $10^{2.5}$ dPa · s (° C.) | 1,495 | 1,493 | 1,544 | 1,538 | 1,538 | 1,533 | 1,529 |
| Young's modulus (GPa) | 82.5 | 82.4 | 85.1 | 85.1 | 84.6 | 84.3 | 84.2 |
| Specific Young's modulus (GPa/g · cm⁻³) | 30.6 | 30.4 | 34.1 | 33.8 | 33.4 | 33.0 | 32.7 |

TABLE 19

| (mol %) | No. 253 | No. 254 | No. 255 | No. 256 | No. 257 | No. 258 | No. 259 |
|---|---|---|---|---|---|---|---|
| $SiO_2$ | 65.6 | 65.3 | 64.9 | 64.6 | 64.2 | 63.9 | 63.6 |
| $Al_2O_3$ | 13.2 | 13.2 | 13.1 | 13.0 | 13.0 | 12.9 | 12.8 |
| $B_2O_3$ | 2.9 | 2.9 | 2.8 | 2.8 | 2.8 | 2.8 | 2.8 |
| MgO | 8.0 | 7.9 | 7.9 | 7.8 | 7.8 | 7.8 | 7.7 |
| CaO | 6.2 | 6.2 | 6.1 | 6.1 | 6.1 | 6.0 | 6.0 |
| SrO | 0.6 | 0.6 | 0.6 | 0.6 | 0.6 | 0.6 | 0.6 |
| BaO | 3.1 | 3.6 | 4.1 | 4.6 | 5.1 | 5.6 | 6.1 |
| ZnO | 0.0 | 0.0 | 0.0 | 0.0 | 0.0 | 0.0 | 0.0 |
| $P_2O_5$ | 0.2 | 0.2 | 0.2 | 0.2 | 0.2 | 0.2 | 0.2 |
| $SnO_2$ | 0.1 | 0.1 | 0.1 | 0.1 | 0.1 | 0.1 | 0.1 |
| $SiO_2/B_2O_3$ | 22.62 | 22.52 | 23.18 | 23.07 | 22.93 | 22.82 | 22.71 |
| SrO + BaO | 3.7 | 4.2 | 4.7 | 5.2 | 5.7 | 6.2 | 6.7 |
| $B_2O_3$/BaO | 0.9 | 0.8 | 0.7 | 0.6 | 0.5 | 0.5 | 0.5 |
| BaO/(SrO + BaO) | 0.8 | 0.9 | 0.9 | 0.9 | 0.9 | 0.9 | 0.9 |
| $(SiO_2 + Al_2O_3 + B_2O_3)$/(SrO + BaO) | 22.1 | 19.4 | 17.2 | 15.5 | 14.0 | 12.8 | 11.8 |
| (CaO + SrO + BaO) − $(Al_2O_3 + B_2O_3)$ | −6.2 | −5.7 | −5.1 | −4.5 | −4.0 | −3.5 | −2.9 |
| Thermal expansion coefficient ($10^{-7}$/° C.) | 40.1 | 41.0 | 42.2 | 43.3 | 44.2 | 45.1 | 46.1 |
| Density (g/cm³) | 2.61 | 2.63 | 2.65 | 2.67 | 2.69 | 2.70 | 2.72 |
| Strain point (° C.) | 713 | 711 | 709 | 706 | 704 | 703 | 701 |
| Annealing point (° C.) | 774 | 771 | 768 | 764 | 760 | 757 | 754 |
| Softening point (° C.) | 984 | 981 | 977 | 974 | 972 | 970 | 968 |
| $10^{4.0}$ dPa · s (° C.) | 1,274 | 1,271 | 1,267 | 1,265 | 1,261 | 1,258 | 1,256 |
| $10^{3.0}$ dPa · s (° C.) | 1,444 | 1,442 | 1,440 | 1,437 | 1,433 | 1,429 | 1,425 |
| $10^{2.5}$ dPa · s (° C.) | 1,523 | 1,520 | 1,518 | 1,517 | 1,512 | 1,511 | 1,510 |
| Young's modulus (GPa) | 83.5 | 83.3 | 82.9 | 82.5 | 82.4 | 82.1 | 81.8 |
| Specific Young's modulus (GPa/g · cm⁻³) | 32.0 | 31.7 | 31.3 | 30.9 | 30.7 | 30.4 | 30.0 |

| (mol %) | No. 260 | No. 261 | No. 262 | No. 263 | No. 264 | No. 265 | No. 266 |
|---|---|---|---|---|---|---|---|
| $SiO_2$ | 63.2 | 62.9 | 62.5 | 65.6 | 65.3 | 64.9 | 64.6 |
| $Al_2O_3$ | 12.8 | 12.7 | 12.6 | 13.2 | 13.2 | 13.1 | 13.0 |
| $B_2O_3$ | 2.8 | 2.8 | 2.7 | 2.9 | 2.9 | 2.8 | 2.8 |
| MgO | 7.7 | 7.6 | 7.6 | 8.0 | 7.9 | 7.9 | 7.8 |
| CaO | 6.0 | 5.9 | 5.9 | 6.2 | 6.2 | 6.1 | 6.1 |
| SrO | 0.6 | 0.6 | 0.6 | 0.6 | 0.6 | 0.6 | 0.6 |
| BaO | 6.6 | 7.1 | 7.6 | 2.6 | 2.6 | 2.6 | 2.6 |
| ZnO | 0.0 | 0.0 | 0.0 | 0.0 | 0.0 | 0.0 | 0.0 |
| $P_2O_5$ | 0.2 | 0.2 | 0.2 | 0.7 | 1.2 | 1.7 | 2.2 |
| $SnO_2$ | 0.1 | 0.1 | 0.1 | 0.1 | 0.1 | 0.1 | 0.1 |
| $SiO_2/B_2O_3$ | 22.57 | 22.46 | 23.15 | 22.62 | 22.52 | 23.18 | 23.07 |
| SrO + BaO | 7.2 | 7.7 | 8.2 | 3.2 | 3.2 | 3.2 | 3.2 |
| $B_2O_3$/BaO | 0.4 | 0.4 | 0.4 | 1.1 | 1.1 | 1.1 | 1.1 |
| BaO/(SrO + BaO) | 0.9 | 0.9 | 0.9 | 0.8 | 0.8 | 0.8 | 0.8 |
| $(SiO_2 + Al_2O_3 + B_2O_3)$/(SrO + BaO) | 10.9 | 10.2 | 9.5 | 25.5 | 25.4 | 25.3 | 25.1 |
| (CaO + SrO + BaO) − $(Al_2O_3 + B_2O_3)$ | −2.4 | −1.9 | −1.2 | −6.7 | −6.7 | −6.6 | −6.5 |
| Thermal expansion coefficient ($10^{-7}$/° C.) | 47.0 | 47.9 | 49.0 | 38.9 | 38.7 | 38.9 | 38.8 |
| Density (g/cm³) | 2.74 | 2.76 | 2.78 | 2.58 | 2.58 | 2.57 | 2.57 |
| Strain point (° C.) | 700 | 700 | 701 | 715 | 714 | 713 | 711 |
| Annealing point (° C.) | 751 | 749 | 747 | 774 | 771 | 768 | 764 |
| Softening point (° C.) | 967 | 967 | 967 | 985 | 982 | 979 | 976 |
| $10^{4.0}$ dPa · s (° C.) | 1,252 | 1,250 | 1,247 | 1,279 | 1,281 | 1,283 | 1,285 |
| $10^{3.0}$ dPa · s (° C.) | 1,420 | 1,417 | 1,410 | 1,449 | 1,451 | 1,454 | 1,457 |
| $10^{2.5}$ dPa · s (° C.) | 1,506 | 1,507 | 1,506 | 1,530 | 1,534 | 1,539 | 1,544 |
| Young's modulus (GPa) | 81.7 | 81.2 | 80.9 | 83.0 | 82.3 | 81.4 | 80.6 |
| Specific Young's modulus (GPa/g · cm⁻³) | 29.8 | 29.4 | 29.1 | 32.1 | 32.0 | 31.6 | 31.4 |

TABLE 20

| (mol %) | No. 267 | No. 268 | No. 269 | No. 270 | No. 271 | No. 272 | No. 273 |
|---|---|---|---|---|---|---|---|
| $SiO_2$ | 64.3 | 63.9 | 63.6 | 63.3 | 63.0 | 62.6 | 63.7 |
| $Al_2O_3$ | 13.0 | 12.9 | 12.8 | 12.8 | 12.7 | 12.6 | 13.5 |
| $B_2O_3$ | 2.8 | 2.8 | 2.8 | 2.8 | 2.8 | 2.7 | 3.7 |
| MgO | 7.8 | 7.8 | 7.7 | 7.7 | 7.6 | 7.6 | 8.0 |
| CaO | 6.1 | 6.0 | 6.0 | 6.0 | 5.9 | 5.9 | 8.8 |
| SrO | 0.6 | 0.6 | 0.6 | 0.6 | 0.6 | 0.6 | 0.4 |
| BaO | 2.6 | 2.5 | 2.5 | 2.5 | 2.5 | 2.5 | 1.9 |
| ZnO | 0.0 | 0.0 | 0.0 | 0.0 | 0.0 | 0.0 | 0.0 |
| $P_2O_5$ | 2.7 | 3.2 | 3.7 | 4.2 | 4.7 | 5.2 | 0.0 |
| $SnO_2$ | 0.1 | 0.1 | 0.1 | 0.1 | 0.1 | 0.1 | 0.1 |
| $SiO_2/B_2O_3$ | 22.96 | 22.82 | 22.71 | 22.61 | 22.50 | 23.19 | 17.22 |
| SrO + BaO | 3.2 | 3.1 | 3.1 | 3.1 | 3.1 | 3.1 | 2.3 |
| $B_2O_3$/BaO | 1.1 | 1.1 | 1.1 | 1.1 | 1.1 | 1.1 | 1.9 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 25.0 | 25.7 | 25.5 | 25.5 | 25.3 | 25.1 | 35.2 |
| (CaO + SrO + BaO) − $(Al_2O_3 + B_2O_3)$ | −6.5 | −6.6 | −6.5 | −6.5 | −6.5 | −6.3 | −6.1 |
| Thermal expansion coefficient ($10^{-7}$/° C.) | 38.5 | 38.4 | 38.4 | 38.1 | 38.0 | 38.2 | 41.1 |
| Density (g/cm³) | 2.56 | 2.55 | 2.54 | 2.54 | 2.53 | 2.53 | 2.59 |
| Strain point (° C.) | 711 | 709 | 707 | 706 | 705 | 704 | 699 |
| Annealing point (° C.) | 760 | 757 | 753 | 749 | 746 | 743 | 763 |
| Softening point (° C.) | 974 | 971 | 969 | 968 | 966 | 965 | 973 |
| $10^{4.0}$ dPa·s (° C.) | 1,287 | 1,288 | 1,290 | 1,292 | 1,295 | 1,296 | 1,230 |
| $10^{3.0}$ dPa·s (° C.) | 1,458 | 1,459 | 1,461 | 1,461 | 1,463 | 1,462 | 1,409 |
| $10^{2.5}$ dPa·s (° C.) | 1,545 | 1,550 | 1,554 | 1,555 | 1,560 | 1,562 | 1,473 |
| Young's modulus (GPa) | 80.1 | 79.1 | 78.3 | 77.8 | 76.9 | 76.1 | 84.5 |
| Specific Young's modulus (GPa/g·cm⁻³) | 31.3 | 31.0 | 30.8 | 30.7 | 30.4 | 30.1 | 32.7 |

| (mol %) | No. 274 | No. 275 | No. 276 | No. 277 | No. 278 | No. 279 | No. 280 |
|---|---|---|---|---|---|---|---|
| $SiO_2$ | 64.2 | 64.7 | 65.2 | 65.7 | 66.2 | 66.7 | 67.2 |
| $Al_2O_3$ | 13.3 | 13.1 | 12.9 | 12.7 | 12.5 | 12.3 | 12.2 |
| $B_2O_3$ | 3.7 | 3.6 | 3.6 | 3.5 | 3.5 | 3.4 | 3.4 |
| MgO | 7.9 | 7.8 | 7.7 | 7.6 | 7.5 | 7.3 | 7.2 |
| CaO | 8.7 | 8.6 | 8.5 | 8.3 | 8.2 | 8.1 | 8.0 |
| SrO | 0.4 | 0.4 | 0.4 | 0.4 | 0.4 | 0.4 | 0.4 |
| BaO | 1.8 | 1.8 | 1.8 | 1.8 | 1.7 | 1.7 | 1.7 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 17.35 | 17.97 | 18.11 | 18.77 | 18.91 | 19.62 | 19.76 |
| SrO + BaO | 2.2 | 2.2 | 2.2 | 2.2 | 2.1 | 2.1 | 2.1 |
| $B_2O_3$/BaO | 2.1 | 2.0 | 2.0 | 1.9 | 2.1 | 2.0 | 2.0 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 36.9 | 37.0 | 37.1 | 37.2 | 39.1 | 39.2 | 39.4 |
| (CaO + SrO + BaO) − $(Al_2O_3 + B_2O_3)$ | −6.1 | −5.9 | −5.8 | −5.7 | −5.7 | −5.5 | −5.5 |
| Thermal expansion coefficient ($10^{-7}$/° C.) | 40.7 | 40.4 | 40.0 | 39.7 | 39.2 | 39.0 | 38.4 |
| Density (g/cm³) | 2.58 | 2.57 | 2.57 | 2.57 | 2.56 | 2.55 | 2.55 |
| Strain point (° C.) | 699 | 700 | 700 | 701 | 701 | 703 | 704 |
| Annealing point (° C.) | 764 | 764 | 764 | 766 | 766 | 767 | 768 |
| Softening point (° C.) | 975 | 977 | 979 | 981 | 983 | 985 | 988 |
| $10^{4.0}$ dPa·s (° C.) | 1,236 | 1,243 | 1,250 | 1,257 | 1,264 | 1,271 | 1,279 |
| $10^{3.0}$ dPa·s (° C.) | 1,414 | 1,420 | 1,425 | 1,432 | 1,438 | 1,445 | 1,450 |
| $10^{2.5}$ dPa·s (° C.) | 1,481 | 1,490 | 1,498 | 1,508 | 1,517 | 1,527 | 1,534 |
| Young's modulus (GPa) | 84.3 | 84.2 | 84.0 | 83.7 | 83.5 | 83.2 | 83.2 |
| Specific Young's modulus (GPa/g·cm⁻³) | 32.7 | 32.7 | 32.7 | 32.6 | 32.7 | 32.6 | 32.7 |

TABLE 21

| (mol %) | No. 281 | No. 282 | No. 283 | No. 284 | No. 285 | No. 286 | No. 287 |
| --- | --- | --- | --- | --- | --- | --- | --- |
| $SiO_2$ | 67.7 | 68.2 | 69.2 | 69.7 | 70.2 | 70.7 | 71.2 |
| $Al_2O_3$ | 12.0 | 11.8 | 11.4 | 11.2 | 11.0 | 10.9 | 10.7 |
| $B_2O_3$ | 3.3 | 3.3 | 3.1 | 3.1 | 3.0 | 3.0 | 2.9 |
| MgO | 7.1 | 7.0 | 6.8 | 6.7 | 6.6 | 6.5 | 6.3 |
| CaO | 7.8 | 7.7 | 7.5 | 7.4 | 7.2 | 7.1 | 7.0 |
| SrO | 0.4 | 0.4 | 0.3 | 0.3 | 0.3 | 0.3 | 0.3 |
| BaO | 1.7 | 1.6 | 1.6 | 1.5 | 1.5 | 1.5 | 1.5 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 20.52 | 20.67 | 22.32 | 22.48 | 23.40 | 23.57 | 24.55 |
| SrO + BaO | 2.1 | 2.0 | 1.9 | 1.8 | 1.8 | 1.8 | 1.8 |
| $B_2O_3$/BaO | 1.9 | 2.1 | 1.9 | 2.1 | 2.0 | 2.0 | 1.9 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 39.5 | 41.7 | 44.1 | 46.7 | 46.8 | 47.0 | 47.1 |
| (CaO + SrO + BaO) − $(Al_2O_3 + B_2O_3)$ | −5.4 | −5.4 | −5.1 | −5.1 | −5.0 | −5.0 | −4.8 |
| Thermal expansion coefficient ($10^{-7}$/° C.) | 38.1 | 37.6 | 37.1 | 36.6 | 36.4 | 35.9 | 35.8 |
| Density (g/cm³) | 2.55 | 2.54 | 2.53 | 2.52 | 2.52 | 2.51 | 2.51 |
| Strain point (° C.) | 705 | 706 | 708 | 709 | 710 | 711 | 713 |
| Annealing point (° C.) | 770 | 771 | 774 | 774 | 776 | 777 | 779 |
| Softening point (° C.) | 990 | 992 | 997 | 999 | 1,001 | 1,004 | 1,006 |
| $10^{4.0}$ dPa · s (° C.) | 1,286 | 1,292 | 1,306 | 1,312 | 1,319 | 1,326 | 1,333 |
| $10^{3.0}$ dPa · s (° C.) | 1,458 | 1,464 | 1,478 | 1,485 | 1,493 | 1,499 | 1,508 |
| $10^{2.5}$ dPa · s (° C.) | 1,545 | 1,553 | 1,572 | 1,580 | 1,591 | 1,597 | 1,608 |
| Young's modulus (GPa) | 83.0 | 82.7 | 82.3 | 82.1 | 81.8 | 81.9 | 81.5 |
| Specific Young's modulus (GPa/g · cm⁻³) | 32.6 | 32.6 | 32.5 | 32.6 | 32.5 | 32.6 | 32.5 |

| (mol %) | No. 288 | No. 289 | No. 290 | No. 291 | No. 292 | No. 293 | No. 294 |
| --- | --- | --- | --- | --- | --- | --- | --- |
| $SiO_2$ | 71.7 | 72.2 | 72.7 | 73.2 | 73.7 | 72.6 | 72.2 |
| $Al_2O_3$ | 10.5 | 10.3 | 10.1 | 9.9 | 9.7 | 6.6 | 7.1 |
| $B_2O_3$ | 2.9 | 2.8 | 2.8 | 2.7 | 2.7 | 3.4 | 3.4 |
| MgO | 6.2 | 6.1 | 6.0 | 5.9 | 5.8 | 7.3 | 7.3 |
| CaO | 6.9 | 6.7 | 6.6 | 6.5 | 6.4 | 8.0 | 8.0 |
| SrO | 0.3 | 0.3 | 0.3 | 0.3 | 0.3 | 0.4 | 0.4 |
| BaO | 1.4 | 1.4 | 1.4 | 1.4 | 1.3 | 1.7 | 1.7 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 24.72 | 25.79 | 25.96 | 27.11 | 27.30 | 21.35 | 21.24 |
| SrO + BaO | 1.7 | 1.7 | 1.7 | 1.7 | 1.6 | 2.1 | 2.1 |
| $B_2O_3$/BaO | 2.1 | 2.0 | 2.0 | 1.9 | 2.1 | 2.0 | 2.0 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 50.1 | 50.2 | 50.4 | 50.5 | 53.8 | 39.3 | 39.4 |
| (CaO + SrO + BaO) − $(Al_2O_3 + B_2O_3)$ | −4.8 | −4.7 | −4.6 | −4.4 | −4.4 | 0.1 | −0.4 |
| Thermal expansion coefficient ($10^{-7}$/° C.) | 35.4 | 35.2 | 34.9 | 34.8 | 34.5 | 39.6 | 39.3 |
| Density (g/cm³) | 2.50 | 2.50 | 2.49 | 2.49 | 2.48 | 2.51 | 2.51 |
| Strain point (° C.) | 713 | 715 | 715 | 717 | 717 | 689 | 687 |
| Annealing point (° C.) | 780 | 782 | 782 | 784 | 785 | 755 | 753 |
| Softening point (° C.) | 1,008 | 1,010 | 1,011 | 1,014 | 1,016 | 975 | 976 |
| $10^{4.0}$ dPa · s (° C.) | 1,339 | 1,345 | 1,351 | 1,357 | 1,362 | 1,309 | 1,309 |
| $10^{3.0}$ dPa · s (° C.) | 1,515 | 1,524 | 1,532 | 1,540 | 1,548 | 1,492 | 1,490 |
| $10^{2.5}$ dPa · s (° C.) | 1,616 | 1,626 | 1,633 | 1,641 | 1,648 | 1,587 | 1,585 |
| Young's modulus (GPa) | 81.3 | 81.0 | 80.9 | 80.7 | 80.5 | 78.7 | 79.2 |
| Specific Young's modulus (GPa/g · cm⁻³) | 32.5 | 32.4 | 32.4 | 32.4 | 32.4 | 31.4 | 31.6 |

TABLE 22

| (mol %) | No. 295 | No. 296 | No. 297 | No. 298 | No. 299 | No. 300 | No. 301 |
|---|---|---|---|---|---|---|---|
| $SiO_2$ | 71.8 | 71.4 | 71.0 | 70.6 | 70.2 | 69.8 | 69.4 |
| $Al_2O_3$ | 7.6 | 8.1 | 8.6 | 9.1 | 9.6 | 10.1 | 10.6 |
| $B_2O_3$ | 3.3 | 3.3 | 3.3 | 3.3 | 3.3 | 3.3 | 3.2 |
| MgO | 7.2 | 7.2 | 7.1 | 7.1 | 7.1 | 7.0 | 7.0 |
| CaO | 7.9 | 7.9 | 7.9 | 7.8 | 7.8 | 7.7 | 7.7 |
| SrO | 0.4 | 0.4 | 0.4 | 0.4 | 0.4 | 0.4 | 0.4 |
| BaO | 1.7 | 1.7 | 1.7 | 1.6 | 1.6 | 1.6 | 1.6 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.76 | 21.64 | 21.52 | 21.39 | 21.27 | 21.15 | 21.69 |
| SrO + BaO | 2.1 | 2.1 | 2.1 | 2.0 | 2.0 | 2.0 | 2.0 |
| $B_2O_3$/BaO | 1.9 | 1.9 | 1.9 | 2.1 | 2.1 | 2.1 | 2.0 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 39.4 | 39.4 | 39.5 | 41.5 | 41.6 | 41.6 | 41.6 |
| (CaO + SrO + BaO) − $(Al_2O_3 + B_2O_3)$ | −0.9 | −1.4 | −1.9 | −2.6 | −3.1 | −3.7 | −4.1 |
| Thermal expansion coefficient ($10^{-7}$/° C.) | 39.2 | 38.9 | 38.7 | 38.4 | 38.1 | 37.9 | 37.9 |
| Density (g/cm³) | 2.51 | 2.52 | 2.52 | 2.52 | 2.52 | 2.53 | 2.53 |
| Strain point (° C.) | 687 | 686 | 686 | 687 | 689 | 693 | 697 |
| Annealing point (° C.) | 754 | 753 | 753 | 755 | 757 | 760 | 764 |
| Softening point (° C.) | 976 | 977 | 979 | 981 | 983 | 985 | 988 |
| $10^{4.0}$ dPa · s (° C.) | 1,309 | 1,308 | 1,307 | 1,306 | 1,304 | 1,303 | 1,301 |
| $10^{3.0}$ dPa · s (° C.) | 1,491 | 1,489 | 1,487 | 1,486 | 1,483 | 1,481 | 1,477 |
| $10^{2.5}$ dPa · s (° C.) | 1,587 | 1,584 | 1,583 | 1,581 | 1,577 | 1,575 | 1,571 |
| Young's modulus (GPa) | 79.4 | 79.9 | 80.2 | 80.5 | 81.1 | 81.3 | 81.8 |
| Specific Young's modulus (GPa/g · cm⁻³) | 31.6 | 31.7 | 31.8 | 32.0 | 32.1 | 32.2 | 32.3 |

| (mol %) | No. 302 | No. 303 | No. 304 | No. 305 | No. 306 | No. 307 | No. 308 |
|---|---|---|---|---|---|---|---|
| $SiO_2$ | 69.1 | 68.3 | 67.9 | 67.5 | 67.1 | 66.7 | 66.3 |
| $Al_2O_3$ | 11.1 | 12.1 | 12.6 | 13.1 | 13.6 | 14.1 | 14.6 |
| $B_2O_3$ | 3.2 | 3.2 | 3.2 | 3.1 | 3.1 | 3.1 | 3.1 |
| MgO | 6.9 | 6.9 | 6.8 | 6.8 | 6.7 | 6.7 | 6.7 |
| CaO | 7.6 | 7.6 | 7.5 | 7.5 | 7.4 | 7.4 | 7.3 |
| SrO | 0.4 | 0.3 | 0.3 | 0.3 | 0.3 | 0.3 | 0.3 |
| BaO | 1.6 | 1.6 | 1.6 | 1.6 | 1.6 | 1.6 | 1.5 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.59 | 21.34 | 21.22 | 21.77 | 21.65 | 21.52 | 21.39 |
| SrO + BaO | 2.0 | 1.9 | 1.9 | 1.9 | 1.9 | 1.9 | 1.8 |
| $B_2O_3$/BaO | 2.0 | 2.0 | 2.0 | 1.9 | 1.9 | 1.9 | 2.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 41.7 | 44.0 | 44.1 | 44.1 | 44.1 | 44.2 | 46.7 |
| (CaO + SrO + BaO) − $(Al_2O_3 + B_2O_3)$ | −4.7 | −5.8 | −6.4 | −6.8 | −7.4 | −7.9 | −8.6 |
| Thermal expansion coefficient ($10^{-7}$/° C.) | 37.6 | 37.1 | 37.0 | 37.0 | 36.9 | 36.8 | 36.5 |
| Density (g/cm³) | 2.53 | 2.54 | 2.54 | 2.54 | 2.55 | 2.55 | 2.55 |
| Strain point (° C.) | 702 | 712 | 717 | 722 | 727 | 731 | 735 |
| Annealing point (° C.) | 768 | 776 | 780 | 784 | 787 | 789 | 792 |
| Softening point (° C.) | 992 | 997 | 1,000 | 1,002 | 1,003 | 1,004 | 1,005 |
| $10^{4.0}$ dPa · s (° C.) | 1,301 | 1,297 | 1,296 | 1,294 | 1,293 | 1,291 | 1,289 |
| $10^{3.0}$ dPa · s (° C.) | 1,476 | 1,466 | 1,462 | 1,457 | 1,453 | 1,447 | 1,442 |
| $10^{2.5}$ dPa · s (° C.) | 1,568 | 1,556 | 1,553 | 1,547 | 1,543 | 1,536 | 1,531 |
| Young's modulus (GPa) | 82.1 | 83.0 | 83.2 | 83.7 | 83.9 | 84.4 | 84.7 |
| Specific Young's modulus (GPa/g · cm⁻³) | 32.4 | 32.7 | 32.8 | 32.9 | 32.9 | 33.1 | 33.2 |

TABLE 23

| (mol %) | No. 309 | No. 310 | No. 311 | No. 312 | No. 313 | No. 314 | No. 315 |
|---|---|---|---|---|---|---|---|
| $SiO_2$ | 66.0 | 65.6 | 65.2 | 64.8 | 70.8 | 70.4 | 70.1 |
| $Al_2O_3$ | 15.1 | 15.6 | 16.1 | 16.6 | 12.0 | 11.9 | 11.8 |
| $B_2O_3$ | 3.1 | 3.1 | 3.0 | 3.0 | 0.2 | 0.7 | 1.2 |
| MgO | 6.6 | 6.6 | 6.5 | 6.5 | 7.1 | 7.1 | 7.0 |
| CaO | 7.3 | 7.3 | 7.2 | 7.2 | 7.8 | 7.8 | 7.8 |
| SrO | 0.3 | 0.3 | 0.3 | 0.3 | 0.4 | 0.4 | 0.4 |
| BaO | 1.5 | 1.5 | 1.5 | 1.5 | 1.6 | 1.6 | 1.6 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.29 | 21.16 | 21.73 | 21.60 | 354.00 | 100.57 | 58.42 |
| SrO + BaO | 1.8 | 1.8 | 1.8 | 1.8 | 2.0 | 2.0 | 2.0 |
| $B_2O_3$/BaO | 2.1 | 2.1 | 2.0 | 2.0 | 0.1 | 0.4 | 0.8 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 46.8 | 46.8 | 46.8 | 46.9 | 41.5 | 41.5 | 41.6 |
| (CaO + SrO + BaO) − $(Al_2O_3 + B_2O_3)$ | −9.1 | −9.6 | −10.1 | −10.6 | −2.4 | −2.8 | −3.2 |
| Thermal expansion coefficient ($10^{-7}$/° C.) | 36.3 | 36.2 | 36.2 | 36.1 | 37.5 | 37.6 | 37.6 |
| Density (g/cm³) | 2.55 | 2.55 | 2.56 | 2.56 | 2.56 | 2.56 | 2.55 |
| Strain point (° C.) | 738 | 741 | 744 | 745 | 748 | 740 | 733 |
| Annealing point (° C.) | 793 | 794 | 795 | 795 | 809 | 802 | 795 |
| Softening point (° C.) | 1,006 | 1,006 | 1,007 | 1,007 | 1,034 | 1,025 | 1,018 |
| $10^{4.0}$ dPa · s (° C.) | 1,289 | 1,288 | 1,288 | 1,287 | 1,342 | 1,333 | 1,327 |
| $10^{3.0}$ dPa · s (° C.) | 1,439 | 1,434 | 1,432 | 1,427 | 1,506 | 1,499 | 1,494 |
| $10^{2.5}$ dPa · s (° C.) | 1,527 | 1,521 | 1,520 | 1,515 | 1,606 | 1,597 | 1,591 |
| Young's modulus (GPa) | 85.2 | 85.7 | 85.9 | 86.4 | 85.9 | 85.3 | 84.7 |
| Specific Young's modulus (GPa/g · cm⁻³) | 33.4 | 33.6 | 33.6 | 33.7 | 33.5 | 33.3 | 33.1 |

| (mol %) | No. 316 | No. 317 | No. 318 | No. 319 | No. 320 | No. 321 | No. 322 |
|---|---|---|---|---|---|---|---|
| $SiO_2$ | 69.7 | 69.4 | 69.0 | 68.3 | 68.0 | 67.6 | 67.3 |
| $Al_2O_3$ | 11.8 | 11.7 | 11.7 | 11.5 | 11.5 | 11.4 | 11.4 |
| $B_2O_3$ | 1.7 | 2.2 | 2.7 | 3.7 | 4.2 | 4.7 | 5.2 |
| MgO | 7.0 | 7.0 | 6.9 | 6.9 | 6.8 | 6.8 | 6.8 |
| CaO | 7.7 | 7.7 | 7.6 | 7.6 | 7.5 | 7.5 | 7.4 |
| SrO | 0.4 | 0.4 | 0.4 | 0.3 | 0.3 | 0.3 | 0.3 |
| BaO | 1.6 | 1.6 | 1.6 | 1.6 | 1.6 | 1.6 | 1.6 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 41.00 | 31.55 | 25.56 | 18.46 | 16.19 | 14.38 | 12.94 |
| SrO + BaO | 2.0 | 2.0 | 2.0 | 1.9 | 1.9 | 1.9 | 1.9 |
| $B_2O_3$/BaO | 1.1 | 1.4 | 1.7 | 2.3 | 2.6 | 2.9 | 3.3 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 41.6 | 41.7 | 41.7 | 43.9 | 44.1 | 44.1 | 44.2 |
| (CaO + SrO + BaO) − $(Al_2O_3 + B_2O_3)$ | −3.8 | −4.2 | −4.8 | −5.7 | −6.3 | −6.7 | −7.3 |
| Thermal expansion coefficient ($10^{-7}$/° C.) | 37.5 | 37.5 | 37.4 | 37.4 | 37.2 | 37.3 | 37.1 |
| Density (g/cm³) | 2.55 | 2.54 | 2.54 | 2.53 | 2.52 | 2.52 | 2.51 |
| Strain point (° C.) | 726 | 719 | 714 | 700 | 695 | 689 | 684 |
| Annealing point (° C.) | 789 | 783 | 778 | 766 | 762 | 755 | 751 |
| Softening point (° C.) | 1,012 | 1,006 | 1,000 | 988 | 984 | 978 | 973 |
| $10^{4.0}$ dPa · s (° C.) | 1,319 | 1,313 | 1,306 | 1,291 | 1,286 | 1,279 | 1,274 |
| $10^{3.0}$ dPa · s (° C.) | 1,488 | 1,482 | 1,477 | 1,464 | 1,459 | 1,452 | 1,445 |
| $10^{2.5}$ dPa · s (° C.) | 1,583 | 1,575 | 1,569 | 1,556 | 1,552 | 1,545 | 1,540 |
| Young's modulus (GPa) | 84.2 | 83.7 | 83.0 | 81.9 | 81.4 | 80.8 | 80.4 |
| Specific Young's modulus (GPa/g · cm⁻³) | 33.0 | 32.9 | 32.7 | 32.4 | 32.2 | 32.1 | 32.0 |

TABLE 24

| (mol %) | No. 323 | No. 324 | No. 325 | No. 326 | No. 327 | No. 328 | No. 329 |
|---|---|---|---|---|---|---|---|
| $SiO_2$ | 66.9 | 66.5 | 66.2 | 65.8 | 65.5 | 65.1 | 72.4 |
| $Al_2O_3$ | 11.3 | 11.2 | 11.2 | 11.1 | 11.1 | 11.0 | 12.2 |
| $B_2O_3$ | 5.7 | 6.2 | 6.7 | 7.2 | 7.7 | 8.2 | 3.4 |
| MgO | 6.7 | 6.7 | 6.7 | 6.6 | 6.6 | 6.5 | 1.9 |
| CaO | 7.4 | 7.4 | 7.3 | 7.3 | 7.2 | 7.2 | 8.0 |
| SrO | 0.3 | 0.3 | 0.3 | 0.3 | 0.3 | 0.3 | 0.4 |
| BaO | 1.6 | 1.6 | 1.5 | 1.5 | 1.5 | 1.5 | 1.7 |

TABLE 24-continued

|  |  |  |  |  |  |  |  |
|---|---|---|---|---|---|---|---|
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 11.74 | 10.73 | 9.88 | 9.14 | 8.51 | 7.94 | 21.29 |
| SrO + BaO | 1.9 | 1.9 | 1.8 | 1.8 | 1.8 | 1.8 | 2.1 |
| $B_2O_3$/BaO | 3.6 | 3.9 | 4.5 | 4.8 | 5.1 | 5.5 | 2.0 |
| BaO/(SrO + BaO) | 0.8 | 0.8 | 0.8 | 0.8 | 0.8 | 0.8 | 0.8 |
| $(SiO_2 + Al_2O_3 + B_2O_3)/(SrO + BaO)$ | 44.2 | 44.2 | 46.7 | 46.7 | 46.8 | 46.8 | 41.9 |
| $(CaO + SrO + BaO) - (Al_2O_3 + B_2O_3)$ | −7.7 | −8.1 | −8.8 | −9.2 | −9.8 | −10.2 | −5.5 |
| Thermal expansion coefficient ($10^{-7}$/° C.) | 37.3 | 37.3 | 37.1 | 37.2 | 37.0 | 37.1 | 34.2 |
| Density (g/cm³) | 2.51 | 2.51 | 2.50 | 2.49 | 2.49 | 2.48 | 2.49 |
| Strain point (° C.) | 678 | 671 | 667 | 662 | 658 | 652 | 737 |
| Annealing point (° C.) | 745 | 739 | 736 | 730 | 727 | 721 | 798 |
| Softening point (° C.) | 968 | 963 | 960 | 956 | 953 | 951 | 1,041 |
| $10^{4.0}$ dPa · s (° C.) | 1,267 | 1,261 | 1,256 | 1,250 | 1,246 | 1,241 | 1,377 |
| $10^{3.0}$ dPa · s (° C.) | 1,439 | 1,432 | 1,426 | 1,420 | 1,413 | 1,408 | 1,552 |
| $10^{2.5}$ dPa · s (° C.) | 1,537 | 1,533 | 1,529 | 1,527 | 1,525 | 1,524 | 1,656 |
| Young's modulus (GPa) | 79.7 | 79.1 | 78.6 | 77.9 | 77.5 | 76.8 | 79.5 |
| Specific Young's modulus (GPa/g · cm⁻³) | 31.7 | 31.6 | 31.5 | 31.2 | 31.2 | 30.9 | 31.9 |

| (mol %) | No. 330 | No. 331 | No. 332 | No. 333 | No. 334 | No. 335 | No. 336 |
|---|---|---|---|---|---|---|---|
| $SiO_2$ | 72.0 | 71.6 | 71.3 | 70.9 | 70.5 | 70.1 | 69.8 |
| $Al_2O_3$ | 12.2 | 12.1 | 12.0 | 12.0 | 11.9 | 11.8 | 11.8 |
| $B_2O_3$ | 3.4 | 3.3 | 3.3 | 3.3 | 3.3 | 3.3 | 3.3 |
| MgO | 2.4 | 2.9 | 3.4 | 3.9 | 4.4 | 4.9 | 5.4 |
| CaO | 8.0 | 7.9 | 7.9 | 7.8 | 7.8 | 7.8 | 7.7 |
| SrO | 0.4 | 0.4 | 0.4 | 0.4 | 0.4 | 0.4 | 0.4 |
| BaO | 1.7 | 1.7 | 1.7 | 1.7 | 1.6 | 1.6 | 1.6 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.18 | 21.70 | 21.61 | 21.48 | 21.36 | 21.24 | 21.15 |
| SrO + BaO | 2.1 | 2.1 | 2.1 | 2.1 | 2.0 | 2.0 | 2.0 |
| $B_2O_3$/BaO | 2.0 | 1.9 | 1.9 | 1.9 | 2.1 | 2.1 | 2.1 |
| BaO/(SrO + BaO) | 0.8 | 0.8 | 0.8 | 0.8 | 0.8 | 0.8 | 0.8 |
| $(SiO_2 + Al_2O_3 + B_2O_3)/(SrO + BaO)$ | 41.7 | 41.4 | 41.2 | 41.0 | 42.9 | 42.6 | 42.5 |
| $(CaO + SrO + BaO) - (Al_2O_3 + B_2O_3)$ | −5.5 | −5.4 | −5.3 | −5.4 | −5.4 | −5.3 | −5.4 |
| Thermal expansion coefficient ($10^{-7}$/° C.) | 34.4 | 34.9 | 35.2 | 35.4 | 35.7 | 36.1 | 36.3 |
| Density (g/cm³) | 2.50 | 2.50 | 2.51 | 2.51 | 2.51 | 2.52 | 2.52 |
| Strain point (° C.) | 734 | 732 | 729 | 726 | 723 | 719 | 717 |
| Annealing point (° C.) | 795 | 792 | 789 | 786 | 783 | 780 | 779 |
| Softening point (° C.) | 1,035 | 1,030 | 1,025 | 1,021 | 1,016 | 1,010 | 1,007 |
| $10^{4.0}$ dPa · s (° C.) | 1,369 | 1,362 | 1,354 | 1,347 | 1,338 | 1,329 | 1,323 |
| $10^{3.0}$ dPa · s (° C.) | 1,541 | 1,533 | 1,524 | 1,515 | 1,507 | 1,499 | 1,492 |
| $10^{2.5}$ dPa · s (° C.) | 1,645 | 1,638 | 1,628 | 1,619 | 1,609 | 1,599 | 1,590 |
| Young's modulus (GPa) | 80.0 | 80.1 | 80.5 | 80.8 | 81.0 | 81.2 | 81.7 |
| Specific Young's modulus (GPa/g · cm⁻³) | 32.0 | 32.0 | 32.1 | 32.2 | 32.2 | 32.3 | 32.4 |

TABLE 25

| (mol %) | No. 337 | No. 338 | No. 339 | No. 340 | No. 341 | No. 342 | No. 343 |
|---|---|---|---|---|---|---|---|
| $SiO_2$ | 69.4 | 69.0 | 68.3 | 67.9 | 67.6 | 67.2 | 66.8 |
| $Al_2O_3$ | 11.7 | 11.7 | 11.5 | 11.5 | 11.4 | 11.4 | 11.3 |
| $B_2O_3$ | 3.2 | 3.2 | 3.2 | 3.2 | 3.1 | 3.1 | 3.1 |
| MgO | 5.9 | 6.4 | 7.4 | 7.9 | 8.4 | 8.9 | 9.4 |
| CaO | 7.7 | 7.6 | 7.6 | 7.5 | 7.5 | 7.4 | 7.4 |
| SrO | 0.4 | 0.4 | 0.3 | 0.3 | 0.3 | 0.3 | 0.3 |
| BaO | 1.6 | 1.6 | 1.6 | 1.6 | 1.6 | 1.6 | 1.6 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.69 | 21.56 | 21.34 | 21.22 | 21.81 | 21.68 | 21.55 |
| SrO + BaO | 2.0 | 2.0 | 1.9 | 1.9 | 1.9 | 1.9 | 1.9 |
| $B_2O_3$/BaO | 2.0 | 2.0 | 2.0 | 2.0 | 1.9 | 1.9 | 1.9 |
| BaO/(SrO + BaO) | 0.8 | 0.8 | 0.8 | 0.8 | 0.8 | 0.8 | 0.8 |
| $(SiO_2 + Al_2O_3 + B_2O_3)/(SrO + BaO)$ | 42.2 | 42.0 | 43.7 | 43.5 | 43.2 | 43.0 | 42.7 |
| $(CaO + SrO + BaO) - (Al_2O_3 + B_2O_3)$ | −5.2 | −5.3 | −5.2 | −5.3 | −5.1 | −5.2 | −5.1 |

TABLE 25-continued

| | | | | | | | |
|---|---|---|---|---|---|---|---|
| Thermal expansion coefficient ($10^{-7}/°$ C.) | 36.8 | 37.1 | 37.8 | 38.0 | 38.5 | 38.8 | 39.2 |
| Density (g/cm$^3$) | 2.53 | 2.53 | 2.54 | 2.54 | 2.55 | 2.55 | 2.56 |
| Strain point (° C.) | 713 | 711 | 703 | 700 | 698 | 695 | 692 |
| Annealing point (° C.) | 776 | 775 | 769 | 768 | 766 | 764 | 761 |
| Softening point (° C.) | 1,003 | 999 | 990 | 986 | 983 | 979 | 975 |
| $10^{4.0}$ dPa · s (° C.) | 1,315 | 1,307 | 1,290 | 1,282 | 1,275 | 1,267 | 1,258 |
| $10^{3.0}$ dPa · s (° C.) | 1,485 | 1,478 | 1,464 | 1,457 | 1,451 | 1,444 | 1,436 |
| $10^{2.5}$ dPa · s (° C.) | 1,581 | 1,572 | 1,553 | 1,544 | 1,536 | 1,527 | 1,517 |
| Young's modulus (GPa) | 81.9 | 82.2 | 82.7 | 83.1 | 83.4 | 83.7 | 84.0 |
| Specific Young's modulus (GPa/g · cm$^{-3}$) | 32.4 | 32.5 | 32.6 | 32.7 | 32.8 | 32.8 | 32.9 |

| (mol %) | No. 344 | No. 345 | No. 346 | No. 347 | No. 348 | No. 349 | No. 350 |
|---|---|---|---|---|---|---|---|
| SiO$_2$ | 66.5 | 66.1 | 65.7 | 65.3 | 65.0 | 72.4 | 72.0 |
| Al$_2$O$_3$ | 11.2 | 11.2 | 11.1 | 11.0 | 11.0 | 12.2 | 12.2 |
| B$_2$O$_3$ | 3.1 | 3.1 | 3.1 | 3.0 | 3.0 | 3.4 | 3.4 |
| MgO | 9.9 | 10.4 | 10.9 | 11.4 | 11.9 | 7.3 | 7.2 |
| CaO | 7.4 | 7.3 | 7.3 | 7.2 | 7.2 | 2.6 | 3.1 |
| SrO | 0.3 | 0.3 | 0.3 | 0.3 | 0.3 | 0.4 | 0.4 |
| BaO | 1.5 | 1.5 | 1.5 | 1.5 | 1.5 | 1.7 | 1.7 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 21.45 | 21.32 | 21.19 | 21.77 | 21.67 | 21.29 | 21.18 |
| SrO + BaO | 1.8 | 1.8 | 1.8 | 1.8 | 1.8 | 2.1 | 2.1 |
| B$_2$O$_3$/BaO | 2.1 | 2.1 | 2.1 | 2.0 | 2.0 | 2.0 | 2.0 |
| BaO/(SrO + BaO) | 0.8 | 0.8 | 0.8 | 0.8 | 0.8 | 0.8 | 0.8 |
| (SiO$_2$ + Al$_2$O$_3$ + B$_2$O$_3$)/(SrO + BaO) | 44.9 | 44.7 | 44.4 | 44.1 | 43.9 | 41.9 | 41.7 |
| (CaO + SrO + BaO) − (Al$_2$O$_3$ + B$_2$O$_3$) | −5.1 | −5.2 | −5.1 | −5.0 | −5.0 | −10.9 | −10.4 |
| Thermal expansion coefficient ($10^{-7}/°$ C.) | 39.5 | 39.8 | 40.2 | 40.8 | 41.0 | 30.7 | 31.2 |
| Density (g/cm$^3$) | 2.56 | 2.56 | 2.56 | 2.57 | 2.57 | 2.48 | 2.49 |
| Strain point (° C.) | 690 | 688 | 686 | 686 | 686 | 738 | 735 |
| Annealing point (° C.) | 759 | 757 | 754 | 753 | 751 | 800 | 798 |
| Softening point (° C.) | 972 | 969 | 966 | 964 | 962 | 1,025 | 1,022 |
| $10^{4.0}$ dPa · s (° C.) | 1,250 | 1,242 | 1,233 | 1,225 | 1,218 | 1,372 | 1,365 |
| $10^{3.0}$ dPa · s (° C.) | 1,430 | 1,424 | 1,416 | 1,410 | 1,404 | 1,543 | 1,533 |
| $10^{2.5}$ dPa · s (° C.) | 1,509 | 1,501 | 1,492 | 1,485 | 1,476 | 1,648 | 1,640 |
| Young's modulus (GPa) | 84.3 | 84.6 | 84.9 | 85.0 | 85.6 | 82.0 | 82.0 |
| Specific Young's modulus (GPa/g · cm$^{-3}$) | 33.0 | 33.1 | 33.1 | 33.0 | 33.2 | 33.0 | 33.0 |

TABLE 26

| (mol %) | No. 351 | No. 352 | No. 353 | No. 354 | No. 355 | No. 356 | No. 357 |
|---|---|---|---|---|---|---|---|
| SiO$_2$ | 71.6 | 71.3 | 70.9 | 70.5 | 70.2 | 69.8 | 69.4 |
| Al$_2$O$_3$ | 12.1 | 12.0 | 12.0 | 11.9 | 11.9 | 11.8 | 11.7 |
| B$_2$O$_3$ | 3.3 | 3.3 | 3.3 | 3.3 | 3.3 | 3.3 | 3.2 |
| MgO | 7.2 | 7.2 | 7.1 | 7.1 | 7.0 | 7.0 | 7.0 |
| CaO | 3.6 | 4.1 | 4.6 | 5.1 | 5.6 | 6.1 | 6.6 |
| SrO | 0.4 | 0.4 | 0.4 | 0.4 | 0.4 | 0.4 | 0.4 |
| BaO | 1.7 | 1.7 | 1.7 | 1.6 | 1.6 | 1.6 | 1.6 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 21.70 | 21.61 | 21.48 | 21.36 | 21.27 | 21.15 | 21.69 |
| SrO + BaO | 2.1 | 2.1 | 2.1 | 2.0 | 2.0 | 2.0 | 2.0 |
| B$_2$O$_3$/BaO | 1.9 | 1.9 | 1.9 | 2.1 | 2.1 | 2.1 | 2.0 |
| BaO/(SrO + BaO) | 0.8 | 0.8 | 0.8 | 0.8 | 0.8 | 0.8 | 0.8 |
| (SiO$_2$ + Al$_2$O$_3$ + B$_2$O$_3$)/(SrO + BaO) | 41.4 | 41.2 | 41.0 | 42.9 | 42.7 | 42.5 | 42.2 |
| (CaO + SrO + BaO) − (Al$_2$O$_3$ + B$_2$O$_3$) | −9.7 | −9.1 | −8.6 | −8.1 | −7.6 | −7.0 | −6.3 |
| Thermal expansion coefficient ($10^{-7}/°$ C.) | 32.0 | 32.6 | 33.2 | 33.8 | 34.3 | 35.1 | 36.0 |
| Density (g/cm$^3$) | 2.49 | 2.50 | 2.50 | 2.51 | 2.51 | 2.52 | 2.52 |
| Strain point (° C.) | 733 | 730 | 727 | 724 | 721 | 717 | 714 |
| Annealing point (° C.) | 796 | 793 | 791 | 788 | 786 | 782 | 779 |
| Softening point (° C.) | 1,019 | 1,016 | 1,014 | 1,010 | 1,008 | 1,004 | 1,001 |
| $10^{4.0}$ dPa · s (° C.) | 1,357 | 1,350 | 1,343 | 1,335 | 1,329 | 1,321 | 1,313 |
| $10^{3.0}$ dPa · s (° C.) | 1,522 | 1,514 | 1,506 | 1,499 | 1,493 | 1,486 | 1,482 |

TABLE 26-continued

| | | | | | | | |
|---|---|---|---|---|---|---|---|
| $10^{2.5}$ dPa·s (° C.) | 1,631 | 1,622 | 1,613 | 1,604 | 1,596 | 1,587 | 1,579 |
| Young's modulus (GPa) | 82.1 | 82.2 | 82.2 | 82.2 | 82.4 | 82.4 | 82.4 |
| Specific Young's modulus (GPa/g·cm⁻³) | 32.9 | 32.9 | 32.8 | 32.8 | 32.8 | 32.7 | 32.6 |

| (mol %) | No. 358 | No. 359 | No. 360 | No. 361 | No. 362 | No. 363 | No. 364 |
|---|---|---|---|---|---|---|---|
| $SiO_2$ | 69.0 | 68.3 | 67.9 | 67.6 | 67.2 | 66.8 | 66.4 |
| $Al_2O_3$ | 11.7 | 11.5 | 11.5 | 11.4 | 11.3 | 11.3 | 11.2 |
| $B_2O_3$ | 3.2 | 3.2 | 3.2 | 3.1 | 3.1 | 3.1 | 3.1 |
| MgO | 6.9 | 6.9 | 6.8 | 6.8 | 6.8 | 6.7 | 6.7 |
| CaO | 7.1 | 8.1 | 8.6 | 9.1 | 9.6 | 10.1 | 10.6 |
| SrO | 0.4 | 0.3 | 0.3 | 0.3 | 0.3 | 0.3 | 0.3 |
| BaO | 1.6 | 1.6 | 1.6 | 1.6 | 1.6 | 1.6 | 1.5 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.56 | 21.34 | 21.22 | 21.81 | 21.68 | 21.55 | 21.42 |
| SrO + BaO | 2.0 | 1.9 | 1.9 | 1.9 | 1.9 | 1.9 | 1.8 |
| $B_2O_3$/BaO | 2.0 | 2.0 | 2.0 | 1.9 | 1.9 | 1.9 | 2.1 |
| BaO/(SrO + BaO) | 0.8 | 0.8 | 0.8 | 0.8 | 0.8 | 0.8 | 0.8 |
| $(SiO_2 + Al_2O_3 + B_2O_3)$/(SrO + BaO) | 42.0 | 43.7 | 43.5 | 43.2 | 42.9 | 42.7 | 44.8 |
| (CaO + SrO + BaO) − $(Al_2O_3 + B_2O_3)$ | −5.8 | −4.7 | −4.2 | −3.5 | −2.9 | −2.4 | −1.9 |
| Thermal expansion coefficient ($10^{-7}$/° C.) | 36.7 | 38.2 | 38.9 | 39.7 | 40.6 | 41.4 | 42.2 |
| Density (g/cm³) | 2.53 | 2.54 | 2.54 | 2.55 | 2.56 | 2.56 | 2.57 |
| Strain point (° C.) | 711 | 702 | 699 | 696 | 691 | 688 | 684 |
| Annealing point (° C.) | 776 | 768 | 764 | 761 | 756 | 753 | 748 |
| Softening point (° C.) | 998 | 991 | 988 | 985 | 982 | 980 | 977 |
| $10^{4.0}$ dPa·s (° C.) | 1,306 | 1,291 | 1,285 | 1,279 | 1,271 | 1,265 | 1,258 |
| $10^{3.0}$ dPa·s (° C.) | 1,476 | 1,465 | 1,459 | 1,454 | 1,446 | 1,440 | 1,432 |
| $10^{2.5}$ dPa·s (° C.) | 1,570 | 1,555 | 1,547 | 1,541 | 1,534 | 1,528 | 1,522 |
| Young's modulus (GPa) | 82.4 | 82.5 | 82.6 | 82.7 | 82.7 | 82.8 | 82.7 |
| Specific Young's modulus (GPa/g·cm⁻³) | 32.6 | 32.5 | 32.4 | 32.4 | 32.4 | 32.3 | 32.2 |

TABLE 27

| (mol %) | No. 365 | No. 366 | No. 367 | No. 368 | No. 369 | No. 370 | No. 371 |
|---|---|---|---|---|---|---|---|
| $SiO_2$ | 66.1 | 65.7 | 65.3 | 65.0 | 68.3 | 68.0 | 67.6 |
| $Al_2O_3$ | 11.2 | 11.1 | 11.0 | 11.0 | 11.5 | 11.5 | 11.4 |
| $B_2O_3$ | 3.1 | 3.1 | 3.0 | 3.0 | 3.2 | 3.2 | 3.2 |
| MgO | 6.6 | 6.6 | 6.6 | 6.5 | 6.9 | 6.8 | 6.8 |
| CaO | 11.1 | 11.6 | 12.1 | 12.6 | 7.6 | 7.5 | 7.5 |
| SrO | 0.3 | 0.3 | 0.3 | 0.3 | 0.9 | 1.4 | 1.9 |
| BaO | 1.5 | 1.5 | 1.5 | 1.5 | 1.6 | 1.6 | 1.6 |
| ZnO | 0.0 | 0.0 | 0.0 | 0.0 | 0.0 | 0.0 | 0.0 |
| $P_2O_5$ | 0.0 | 0.0 | 0.0 | 0.0 | 0.0 | 0.0 | 0.0 |
| $SnO_2$ | 0.1 | 0.1 | 0.1 | 0.1 | 0.1 | 0.1 | 0.1 |
| $SiO_2/B_2O_3$ | 21.32 | 21.19 | 21.77 | 21.67 | 21.34 | 21.25 | 21.13 |
| SrO + BaO | 1.8 | 1.8 | 1.8 | 1.8 | 2.5 | 3.0 | 3.5 |
| $B_2O_3$/BaO | 2.1 | 2.1 | 2.0 | 2.0 | 2.0 | 2.0 | 2.0 |
| BaO/(SrO + BaO) | 0.8 | 0.8 | 0.8 | 0.8 | 0.6 | 0.5 | 0.5 |
| $(SiO_2 + Al_2O_3 + B_2O_3)$/(SrO + BaO) | 44.7 | 44.4 | 44.1 | 43.9 | 33.2 | 27.6 | 23.5 |
| (CaO + SrO + BaO) − $(Al_2O_3 + B_2O_3)$ | −1.4 | −0.8 | −0.1 | 0.4 | −4.6 | −4.2 | −3.6 |
| Thermal expansion coefficient ($10^{-7}$/° C.) | 42.8 | 43.6 | 44.6 | 45.2 | 38.4 | 39.1 | 40.2 |
| Density (g/cm³) | 2.57 | 2.57 | 2.58 | 2.59 | 2.55 | 2.56 | 2.57 |
| Strain point (° C.) | 681 | 676 | 673 | 670 | 702 | 700 | 696 |
| Annealing point (° C.) | 745 | 740 | 736 | 733 | 767 | 764 | 760 |
| Softening point (° C.) | 976 | 974 | 973 | 972 | 989 | 986 | 981 |
| $10^{4.0}$ dPa·s (° C.) | 1,254 | 1,247 | 1,241 | 1,237 | 1,293 | 1,290 | 1,285 |
| $10^{3.0}$ dPa·s (° C.) | 1,427 | 1,419 | 1,411 | 1,405 | 1,466 | 1,464 | 1,458 |
| $10^{2.5}$ dPa·s (° C.) | 1,517 | 1,511 | 1,507 | 1,503 | 1,556 | 1,553 | 1,547 |
| Young's modulus (GPa) | 82.9 | 82.9 | 82.9 | 83.1 | 82.4 | 82.3 | 82.2 |

TABLE 27-continued

| | | | | | | | |
|---|---|---|---|---|---|---|---|
| Specific Young's modulus (GPa/g · cm$^{-3}$) | 32.3 | 32.2 | 32.1 | 32.1 | 32.4 | 32.2 | 32.0 |

| (mol %) | No. 372 | No. 373 | No. 374 | No. 375 | No. 376 | No. 377 | No. 378 |
|---|---|---|---|---|---|---|---|
| SiO$_2$ | 67.3 | 66.9 | 66.6 | 66.3 | 65.9 | 65.6 | 65.2 |
| Al$_2$O$_3$ | 11.4 | 11.3 | 11.3 | 11.2 | 11.1 | 11.1 | 11.0 |
| B$_2$O$_3$ | 3.1 | 3.1 | 3.1 | 3.1 | 3.1 | 3.1 | 3.0 |
| MgO | 6.8 | 6.7 | 6.7 | 6.7 | 6.6 | 6.6 | 6.6 |
| CaO | 7.4 | 7.4 | 7.4 | 7.3 | 7.3 | 7.3 | 7.2 |
| SrO | 2.4 | 2.9 | 3.4 | 3.9 | 4.4 | 4.9 | 5.4 |
| BaO | 1.6 | 1.6 | 1.6 | 1.5 | 1.5 | 1.5 | 1.5 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 21.71 | 21.58 | 21.48 | 21.39 | 21.26 | 21.16 | 21.73 |
| SrO + BaO | 4.0 | 4.5 | 5.0 | 5.4 | 5.9 | 6.4 | 6.9 |
| B$_2$O$_3$/BaO | 1.9 | 1.9 | 1.9 | 2.1 | 2.1 | 2.1 | 2.0 |
| BaO/(SrO + BaO) | 0.4 | 0.4 | 0.3 | 0.3 | 0.3 | 0.2 | 0.2 |
| (SiO$_2$ + Al$_2$O$_3$ + B$_2$O$_3$)/(SrO + BaO) | 20.5 | 18.1 | 16.2 | 14.9 | 13.6 | 12.5 | 11.5 |
| (CaO + SrO + BaO) − (Al$_2$O$_3$ + B$_2$O$_3$) | −3.1 | −2.5 | −2.0 | −1.6 | −1.0 | −0.5 | 0.1 |
| Thermal expansion coefficient (10$^{-7}$/° C.) | 41.0 | 42.1 | 42.9 | 43.6 | 44.7 | 45.4 | 46.5 |
| Density (g/cm$^3$) | 2.58 | 2.59 | 2.60 | 2.61 | 2.63 | 2.64 | 2.65 |
| Strain point (° C.) | 695 | 692 | 690 | 689 | 687 | 687 | 688 |
| Annealing point (° C.) | 758 | 754 | 751 | 748 | 745 | 742 | 741 |
| Softening point (° C.) | 979 | 976 | 974 | 972 | 971 | 970 | 969 |
| 10$^{4.0}$ dPa · s (° C.) | 1,281 | 1,277 | 1,273 | 1,269 | 1,264 | 1,261 | 1,257 |
| 10$^{3.0}$ dPa · s (° C.) | 1,455 | 1,449 | 1,444 | 1,440 | 1,434 | 1,428 | 1,422 |
| 10$^{2.5}$ dPa · s (° C.) | 1,544 | 1,540 | 1,535 | 1,533 | 1,530 | 1,526 | 1,525 |
| Young's modulus (GPa) | 82.2 | 81.9 | 82.0 | 81.8 | 81.5 | 81.7 | 81.4 |
| Specific Young's modulus (GPa/g · cm$^{-3}$) | 31.8 | 31.5 | 31.5 | 31.3 | 31.0 | 31.0 | 30.7 |

TABLE 28

| (mol %) | No. 379 | No. 380 | No. 381 | No. 382 | No. 383 | No. 384 | No. 385 |
|---|---|---|---|---|---|---|---|
| SiO$_2$ | 69.7 | 69.4 | 69.0 | 68.3 | 68.0 | 67.6 | 67.3 |
| Al$_2$O$_3$ | 11.8 | 11.7 | 11.7 | 11.5 | 11.5 | 11.4 | 11.4 |
| B$_2$O$_3$ | 3.2 | 3.2 | 3.2 | 3.2 | 3.2 | 3.2 | 3.1 |
| MgO | 7.0 | 7.0 | 6.9 | 6.9 | 6.8 | 6.8 | 6.8 |
| CaO | 7.7 | 7.7 | 7.6 | 7.6 | 7.5 | 7.5 | 7.4 |
| SrO | 0.4 | 0.4 | 0.4 | 0.3 | 0.3 | 0.3 | 0.3 |
| BaO | 0.1 | 0.6 | 1.1 | 2.1 | 2.6 | 3.1 | 3.6 |
| ZnO | 0.0 | 0.0 | 0.0 | 0.0 | 0.0 | 0.0 | 0.0 |
| P$_2$O$_5$ | 0.0 | 0.0 | 0.0 | 0.0 | 0.0 | 0.0 | 0.0 |
| SnO$_2$ | 0.1 | 0.1 | 0.1 | 0.1 | 0.1 | 0.1 | 0.1 |
| SiO$_2$/B$_2$O$_3$ | 21.78 | 21.69 | 21.56 | 21.34 | 21.25 | 21.13 | 21.71 |
| SrO + BaO | 0.5 | 1.0 | 1.5 | 2.4 | 2.9 | 3.4 | 3.9 |
| B$_2$O$_3$/BaO | 32.0 | 5.3 | 2.9 | 1.5 | 1.2 | 1.0 | 0.9 |
| BaO/(SrO + BaO) | 0.2 | 0.6 | 0.7 | 0.9 | 0.9 | 0.9 | 0.9 |
| (SiO$_2$ + Al$_2$O$_3$ + B$_2$O$_3$)/(SrO + BaO) | 169.4 | 84.3 | 55.9 | 34.6 | 28.5 | 24.2 | 21.0 |
| (CaO + SrO + BaO) − (Al$_2$O$_3$ + B$_2$O$_3$) | −6.8 | −6.2 | −5.8 | −4.7 | −4.3 | −3.7 | −3.2 |
| Thermal expansion coefficient (10$^{-7}$/° C.) | 34.6 | 35.5 | 36.4 | 38.4 | 39.3 | 40.5 | 41.4 |
| Density (g/cm$^3$) | 2.48 | 2.50 | 2.52 | 2.55 | 2.57 | 2.59 | 2.61 |
| Strain point (° C.) | 718 | 714 | 711 | 703 | 701 | 697 | 697 |
| Annealing point (° C.) | 785 | 780 | 777 | 767 | 765 | 760 | 758 |
| Softening point (° C.) | 1,006 | 1,002 | 999 | 990 | 987 | 982 | 980 |
| 10$^{4.0}$ dPa · s (° C.) | 1,309 | 1,306 | 1,303 | 1,295 | 1,293 | 1,288 | 1,287 |
| 10$^{3.0}$ dPa · s (° C.) | 1,476 | 1,474 | 1,473 | 1,468 | 1,466 | 1,462 | 1,459 |
| 10$^{2.5}$ dPa · s (° C.) | 1,574 | 1,569 | 1,567 | 1,558 | 1,557 | 1,552 | 1,550 |
| Young's modulus (GPa) | 83.3 | 83.2 | 82.8 | 82.2 | 81.9 | 81.6 | 81.5 |
| Specific Young's modulus (GPa/g · cm$^{-3}$) | 33.6 | 33.3 | 32.9 | 32.2 | 31.9 | 31.5 | 31.2 |

TABLE 28-continued

| (mol %) | No. 386 | No. 387 | No. 388 | No. 389 | No. 390 | No. 391 |
|---|---|---|---|---|---|---|
| $SiO_2$ | 66.9 | 66.6 | 66.2 | 65.9 | 65.5 | 65.2 |
| $Al_2O_3$ | 11.3 | 11.2 | 11.2 | 11.1 | 11.1 | 11.0 |
| $B_2O_3$ | 3.1 | 3.1 | 3.1 | 3.1 | 3.1 | 3.0 |
| MgO | 6.7 | 6.7 | 6.7 | 6.6 | 6.6 | 6.5 |
| CaO | 7.4 | 7.4 | 7.3 | 7.3 | 7.3 | 7.2 |
| SrO | 0.3 | 0.3 | 0.3 | 0.3 | 0.3 | 0.3 |
| BaO | 4.1 | 4.6 | 5.1 | 5.6 | 6.1 | 6.6 |
| ZnO | 0.0 | 0.0 | 0.0 | 0.0 | 0.0 | 0.0 |
| $P_2O_5$ | 0.0 | 0.0 | 0.0 | 0.0 | 0.0 | 0.0 |
| $SnO_2$ | 0.1 | 0.1 | 0.1 | 0.1 | 0.1 | 0.1 |
| $SiO_2/B_2O_3$ | 21.58 | 21.48 | 21.35 | 21.26 | 21.13 | 21.73 |
| SrO + BaO | 4.4 | 4.9 | 5.4 | 5.9 | 6.4 | 6.9 |
| $B_2O_3$/BaO | 0.8 | 0.7 | 0.6 | 0.6 | 0.5 | 0.5 |
| BaO/(SrO + BaO) | 0.9 | 0.9 | 0.9 | 0.9 | 1.0 | 1.0 |
| $(SiO_2 + Al_2O_3 + B_2O_3)/(SrO + BaO)$ | 18.5 | 16.5 | 14.9 | 13.6 | 12.5 | 11.5 |
| $(CaO + SrO + BaO) - (Al_2O_3 + B_2O_3)$ | −2.6 | −2.0 | −1.6 | −1.0 | −0.5 | 0.1 |
| Thermal expansion coefficient ($10^{-7}$/° C.) | 42.6 | 43.6 | 44.6 | 45.6 | 46.6 | 47.7 |
| Density (g/cm³) | 2.63 | 2.65 | 2.67 | 2.68 | 2.70 | 2.72 |
| Strain point (° C.) | 694 | 692 | 692 | 692 | 692 | 694 |
| Annealing point (° C.) | 755 | 751 | 749 | 747 | 745 | 745 |
| Softening point (° C.) | 977 | 975 | 973 | 972 | 972 | 972 |
| $10^{4.0}$ dPa · s (° C.) | 1,283 | 1,280 | 1,277 | 1,275 | 1,272 | 1,271 |
| $10^{3.0}$ dPa · s (° C.) | 1,455 | 1,450 | 1,445 | 1,440 | 1,434 | 1,430 |
| $10^{2.5}$ dPa · s (° C.) | 1,548 | 1,545 | 1,542 | 1,541 | 1,537 | 1,538 |
| Young's modulus (GPa) | 81.0 | 80.8 | 80.6 | 80.3 | 80.2 | 79.7 |
| Specific Young's modulus (GPa/g · cm⁻³) | 30.8 | 30.5 | 30.2 | 29.9 | 29.7 | 29.2 |

First, a glass batch prepared by blending glass raw materials so as to achieve the glass composition shown in each table was loaded in a platinum crucible, and then melted at from 1,600° C. to 1,650° C. for 24 hours. In melting the glass batch, molten glass was stirred to be homogenized by using a platinum stirrer. Next, the molten glass was poured on a carbon sheet and formed into a sheet shape, followed by being annealed at a temperature around an annealing point for 30 minutes. Each of the resultant samples was evaluated for its thermal expansion coefficient, density, strain point, annealing point, softening point, temperature at a viscosity at high temperature of $10^{4.0}$ dPa·s, temperature at a viscosity at high temperature of $10^{3.0}$ dPa·s, temperature at a viscosity at high temperature of $10^{2.5}$ dPa·s, Young's modulus, and specific Young's modulus. Part of the glass characteristics are not actually measured values but estimate values calculated from the previous data.

The thermal expansion coefficient is a value obtained by measuring an average thermal expansion coefficient within a temperature range of from 30° C. to 380° C. with a dilatometer.

The density is a value measured by a well-known Archimedes method.

The strain point, the annealing point, and the softening point are values measured in accordance with methods specified in ASTM C336 and C338.

The temperatures at viscosities at high temperature of $10^{4.0}$ dPa·s, $10^{3.0}$ dPa·s, and $10^{2.5}$ dPa·s are values measured by a platinum sphere pull up method.

The Young's modulus is a value measured by a flexural resonance method.

The specific Young's modulus is a value obtained by dividing the Young's modulus by the density.

As apparent from the tables, each of Sample Nos. 1 to 391, which was free of $Y_2O_3$ and $La_2O_3$ in its glass composition, had a strain point of 650° C. or more. Accordingly, each of Sample Nos. 1 to 391 may be suitable as a substrate for forming a TFT circuit in a flat panel display, such as a liquid crystal display or an OLED display, or as a carrier glass for holding a resin substrate for forming the TFT circuit.

The invention claimed is:

1. An alkali-free glass sheet, comprising as a glass composition, in terms of mol %, 60% to 74% of $SiO_2$, 11% to 20% of $Al_2O_3$, 0.7 to 2.4% of B2O3, 6.6% to 13% of MgO, 1% to 13% of CaO, 0% to 4.4% of SrO, 0.5% to 4.7% of BaO, 0% to less than 1.0% of $Y_2O_3+La_2O_3$, and 0.5 to 5.0% of SrO+BaO,
    wherein a molar ratio $SiO_2/B_2O_3$ is 100.57 or less, and
    wherein the alkali-free glass sheet is substantially free of an alkali metal oxide, and has a strain point of 650° C. or more.

2. The alkali-free glass sheet according to claim 1, wherein the alkali-free glass sheet has a content of SrO+BaO of from 0.5 mol % to 3 mol %.

3. The alkali-free glass sheet according to claim 1, wherein the molar ratio $SiO_2/B_2O_3$ is 50 or less.

4. The alkali-free glass sheet according to claim 1, wherein the alkali-free glass sheet has a strain point of 700° C. or more.

5. The alkali-free glass sheet according to claim 1, wherein the alkali-free glass sheet has a Young's modulus of 79 GPa or more.

6. The alkali-free glass sheet according to claim 1, wherein the alkali-free glass sheet has a thermal expansion coefficient of from $30\times10^{-7}$/° C. to $45\times10^{-7}$/° C.

7. The alkali-free glass sheet according to claim 1, wherein the alkali-free glass sheet has a temperature at a viscosity of $10^{2.5}$ dPa's of 1,600° C. or less.

* * * * *